United States Patent
Fujisaki

(10) Patent No.: US 9,396,594 B1
(45) Date of Patent: *Jul. 19, 2016

(54) COMMUNICATION DEVICE

(71) Applicant: Iwao Fujisaki, Tokyo (JP)

(72) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,495

(22) Filed: Jul. 22, 2015

Related U.S. Application Data

(63) Continuation of application No. 14/337,224, filed on Jul. 22, 2014, now Pat. No. 9,092,917, which is a continuation of application No. 13/872,257, filed on Apr. 29, 2013, now Pat. No. 8,825,026, which is a continuation of application No. 12/979,530, filed on Dec. 28, 2010, now Pat. No. 8,433,300, which is a continuation of application No. 11/743,768, filed on May 3, 2007, now Pat. No. 7,890,089.

(51) Int. Cl.
*H04M 3/42* (2006.01)
*G07C 9/00* (2006.01)
*H04L 29/06* (2006.01)

(52) U.S. Cl.
CPC ........ *G07C 9/00007* (2013.01); *G07C 9/00309* (2013.01); *G07C 2009/00769* (2013.01)

(58) Field of Classification Search
CPC ........................... H04W 4/02; H04L 29/08657
USPC ................................. 455/414.2, 456.1, 457
See application file for complete search history.

(56) References Cited

U.S. PATENT DOCUMENTS

| | | |
|---|---|---|
| 4,934,773 A | 6/1990 | Becker |
| 5,173,881 A | 12/1992 | Sindle |
| 5,272,638 A | 12/1993 | Martin et al. |
| 5,345,272 A | 9/1994 | Ersoz et al. |
| 5,353,376 A | 10/1994 | Oh et al. |
| 5,388,147 A | 2/1995 | Grimes |
| 5,405,152 A | 4/1995 | Katanics et al. |
| 5,414,461 A | 5/1995 | Kishi et al. |
| 5,418,837 A | 5/1995 | Johansson et al. |
| 5,438,357 A | 8/1995 | McNelley |
| 5,442,453 A | 8/1995 | Takagi et al. |
| 5,446,904 A | 8/1995 | Belt et al. |
| 5,479,476 A | 12/1995 | Finke-Anlauff |

(Continued)

FOREIGN PATENT DOCUMENTS

| | | |
|---|---|---|
| GB | 2386027 A1 | 9/2003 |
| JP | 2196373 A1 | 8/1990 |

(Continued)

OTHER PUBLICATIONS

Fehily "Windows XP: Visual QuickStart Guide" published by Peachpit Press in 2003.

(Continued)

*Primary Examiner* — Lee Nguyen

(57) ABSTRACT

The system comprising a first communication device and a second communication device, wherein when the door is locked by the first communication device, a door locked message is displayed on the first communication device and/or the second communication device, wherein when the door is unlocked by the first communication device, a door unlocked message is displayed on the first communication device and/or the second communication device, and wherein the first communication device comprises a moving picture replaying implementer.

18 Claims, 1 Drawing Sheet

(56) References Cited

U.S. PATENT DOCUMENTS

| | | |
|---|---|---|
| 5,530,472 A | 6/1996 | Bregman et al. |
| 5,539,810 A | 7/1996 | Kennedy et al. |
| 5,550,754 A | 8/1996 | McNelley et al. |
| 5,559,554 A | 9/1996 | Uekane et al. |
| 5,566,073 A | 10/1996 | Margolin |
| 5,625,675 A | 4/1997 | Katsumaru et al. |
| 5,629,741 A | 5/1997 | Hopper |
| 5,687,331 A | 11/1997 | Volk et al. |
| 5,758,280 A | 5/1998 | Kimura |
| 5,772,586 A | 6/1998 | Heinonen et al. |
| 5,778,304 A | 7/1998 | Grube et al. |
| 5,786,846 A | 7/1998 | Hiroaki |
| 5,796,338 A | 8/1998 | Mardirossian |
| 5,825,408 A | 10/1998 | Yuyama et al. |
| 5,844,824 A | 12/1998 | Newman et al. |
| 5,902,349 A | 5/1999 | Endo et al. |
| 5,903,706 A | 5/1999 | Wakabayashi et al. |
| 5,918,180 A | 6/1999 | Dimino |
| 5,924,040 A | 7/1999 | Trompower |
| 5,936,610 A | 8/1999 | Endo |
| 5,940,139 A | 8/1999 | Smoot |
| 5,959,661 A | 9/1999 | Isono |
| 6,009,336 A | 12/1999 | Harris et al. |
| 6,034,715 A | 3/2000 | Ishida et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt et al. |
| 6,094,237 A | 7/2000 | Hashimoto |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,195,089 B1 | 2/2001 | Chaney et al. |
| 6,198,942 B1 | 3/2001 | Hayashi et al. |
| 6,202,060 B1 | 3/2001 | Tran |
| 6,202,212 B1 | 3/2001 | Sturgeon et al. |
| 6,216,013 B1 | 4/2001 | Moore et al. |
| 6,216,158 B1 | 4/2001 | Luo et al. |
| 6,222,482 B1 | 4/2001 | Gueziec |
| 6,225,944 B1 | 5/2001 | Hayes |
| 6,226,500 B1 | 5/2001 | Nonami |
| 6,241,612 B1 | 6/2001 | Heredia |
| 6,243,039 B1 | 6/2001 | Elliot |
| 6,253,075 B1 | 6/2001 | Beghtol et al. |
| 6,265,988 B1 | 7/2001 | LeMense et al. |
| 6,282,435 B1 | 8/2001 | Wagner et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,311,077 B1 | 10/2001 | Bien |
| 6,366,651 B1 | 4/2002 | Griffith et al. |
| 6,385,465 B1 | 5/2002 | Yoshioka |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,421,470 B1 | 7/2002 | Nozaki et al. |
| 6,421,602 B1 | 7/2002 | Bullock et al. |
| 6,438,380 B1 | 8/2002 | Bi et al. |
| 6,442,404 B1 | 8/2002 | Sakajiri |
| 6,445,802 B1 | 9/2002 | Dan |
| 6,487,422 B1 | 11/2002 | Lee |
| 6,507,643 B1 | 1/2003 | Groner |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,542,750 B2 | 4/2003 | Hendrey et al. |
| 6,549,215 B2 | 4/2003 | Jouppi |
| 6,549,756 B1 | 4/2003 | Engstrom |
| 6,553,309 B2 | 4/2003 | Uchida et al. |
| 6,587,547 B1 | 7/2003 | Zirngibl et al. |
| 6,615,186 B1 | 9/2003 | Kolls |
| 6,618,704 B2 | 9/2003 | Kanevsky et al. |
| 6,630,958 B2 | 10/2003 | Tanaka et al. |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,668,177 B2 | 12/2003 | Salmimaa et al. |
| 6,678,366 B1 | 1/2004 | Burger et al. |
| 6,681,120 B1 | 1/2004 | Kim |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,701,162 B1 | 3/2004 | Everett |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,533 B2 | 4/2004 | Ishii |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,332 B1 | 9/2004 | Cook |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,259 B1 | 5/2005 | Blank nee Keller et al. |
| 6,898,321 B1 | 5/2005 | Knee et al. |
| 6,901,383 B1 | 5/2005 | Ricketts et al. |
| 6,905,414 B2 | 6/2005 | Danieli et al. |
| 6,912,544 B1 | 6/2005 | Weiner |
| 6,922,212 B2 | 7/2005 | Nakakubo et al. |
| 6,937,868 B2 | 8/2005 | Himmel et al. |
| 6,947,527 B2 | 9/2005 | Clark et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,970,178 B2 | 11/2005 | Tanioka et al. |
| 6,970,703 B2 | 11/2005 | Fuchs et al. |
| 6,973,628 B2 | 12/2005 | Asami |
| 6,992,699 B1 | 1/2006 | Vance et al. |
| 6,993,362 B1 | 1/2006 | Aberg |
| 6,999,757 B2 | 2/2006 | Bates et al. |
| 7,003,598 B2 | 2/2006 | Kavanagh |
| 7,007,239 B1 | 2/2006 | Hawkins et al. |
| 7,012,999 B2 | 3/2006 | Ruckart |
| 7,019,770 B1 | 3/2006 | Katz |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,065,525 B2 | 6/2006 | Sasaki et al. |
| 7,076,052 B2 | 7/2006 | Yoshimura |
| 7,081,832 B2 | 7/2006 | Nelson et al. |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |

(56) References Cited

U.S. PATENT DOCUMENTS

| | | |
|---|---|---|
| 7,113,981 B2 | 9/2006 | Slate |
| 7,117,152 B1 | 10/2006 | Mukherji et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Moton, Jr. et al. |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 | 12/2006 | Parulski et al. |
| 7,148,911 B1 | 12/2006 | Mitsui et al. |
| 7,174,171 B2 | 2/2007 | Jones |
| 7,224,792 B2 | 5/2007 | Fusco |
| 7,224,851 B2 | 5/2007 | Kinjo |
| 7,224,987 B1 | 5/2007 | Bhela et al. |
| 7,231,231 B2 | 6/2007 | Kokko et al. |
| 7,233,781 B2 | 6/2007 | Hunter et al. |
| 7,233,795 B1 | 6/2007 | Ryden |
| 7,240,093 B1 | 7/2007 | Danieli et al. |
| 7,245,293 B2 | 7/2007 | Hoshino et al. |
| 7,251,255 B1 | 7/2007 | Young |
| 7,254,408 B2 | 8/2007 | Kim |
| 7,260,416 B2 | 8/2007 | Shippee |
| 7,266,186 B1 | 9/2007 | Henderson |
| 7,269,413 B2 | 9/2007 | Kraft |
| 7,277,711 B2 | 10/2007 | Nyu |
| 7,321,783 B2 | 1/2008 | Kim |
| 7,324,823 B1 | 1/2008 | Rosen et al. |
| 7,346,373 B2 | 3/2008 | Kim |
| 7,372,447 B1 | 5/2008 | Jacobsen et al. |
| 7,383,067 B2 | 6/2008 | Phillips et al. |
| 7,418,346 B2 | 8/2008 | Breed et al. |
| 7,433,845 B1 | 10/2008 | Flitcroft et al. |
| 7,444,168 B2 | 10/2008 | Nakagawa et al. |
| 7,450,709 B2 | 11/2008 | Gonzalez et al. |
| 7,451,084 B2 | 11/2008 | Funakura |
| 7,532,879 B1 | 5/2009 | Fujisaki |
| 7,551,899 B1 | 6/2009 | Nicolas et al. |
| 7,642,929 B1 | 1/2010 | Pinkus et al. |
| 7,643,037 B1 | 1/2010 | Langmacher et al. |
| 7,657,252 B2 | 2/2010 | Futami |
| 7,686,693 B2 | 3/2010 | Danieli et al. |
| 7,707,592 B2 | 4/2010 | Wesslen et al. |
| 7,707,602 B2 | 4/2010 | Cragun et al. |
| 7,725,077 B2 | 5/2010 | Jung et al. |
| 7,752,188 B2 | 7/2010 | Lagerstedt et al. |
| 7,769,364 B2 | 8/2010 | Logan et al. |
| 7,787,857 B2 | 8/2010 | Peterman |
| 7,787,887 B2 | 8/2010 | Gupta et al. |
| 7,853,295 B1 | 12/2010 | Fujisaki |
| 7,853,297 B1 | 12/2010 | Fujisaki |
| 7,865,567 B1 | 1/2011 | Hendricks et al. |
| 7,873,349 B1 | 1/2011 | Smith et al. |
| 7,890,089 B1 | 2/2011 | Fujisaki |
| 7,899,410 B2 | 3/2011 | Rakshani et al. |
| 7,922,086 B2 | 4/2011 | Jung et al. |
| 7,941,141 B2 | 5/2011 | Shoykhet et al. |
| 7,953,439 B2 | 5/2011 | Rofougaran |
| 7,970,414 B1 | 6/2011 | Werden et al. |
| 8,099,108 B2 | 1/2012 | Camp et al. |
| 8,117,266 B2 | 2/2012 | Moore |
| 8,126,400 B2 | 2/2012 | Jung et al. |
| 8,145,040 B2 | 3/2012 | Toyoshima |
| 8,175,655 B1 | 5/2012 | Fujisaki |
| 8,208,954 B1 | 6/2012 | Fujisaki |
| 8,229,504 B1 | 7/2012 | Fujisaki |
| 8,260,313 B1 | 9/2012 | Wick et al. |
| 8,311,578 B1 | 11/2012 | Fujisaki |
| 8,364,201 B1 * | 1/2013 | Fujisaki ............ H04M 1/575 455/414.1 |
| 8,433,300 B1 * | 4/2013 | Fujisaki ............ H04M 1/56 455/414.2 |
| 8,433,364 B1 | 4/2013 | Fujisaki |
| 8,452,307 B1 | 5/2013 | Fujisaki |
| 8,472,935 B1 | 6/2013 | Fujisaki |
| 8,559,983 B1 | 10/2013 | Fujisaki |
| 8,620,384 B1 | 12/2013 | Fujisaki |
| 8,747,222 B2 | 6/2014 | Yamashita |
| 8,755,838 B1 | 6/2014 | Fujisaki |
| 8,825,026 B1 | 9/2014 | Fujisaki |
| 8,825,090 B1 | 9/2014 | Fujisaki |
| 9,049,556 B1 | 6/2015 | Fujisaki |
| 2001/0005826 A1 | 6/2001 | Shibuya |
| 2001/0011293 A1 | 8/2001 | Murakami et al. |
| 2001/0028350 A1 | 10/2001 | Matsuoka et al. |
| 2001/0029425 A1 | 10/2001 | Myr |
| 2001/0035829 A1 | 11/2001 | Yu et al. |
| 2001/0048364 A1 | 12/2001 | Kalthoff et al. |
| 2001/0049470 A1 | 12/2001 | Mault et al. |
| 2002/0002044 A1 | 1/2002 | Naruse et al. |
| 2002/0002705 A1 | 1/2002 | Byrnes et al. |
| 2002/0006804 A1 | 1/2002 | Mukai et al. |
| 2002/0009978 A1 | 1/2002 | Dukach et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036231 A1 | 3/2002 | Monaghan et al. |
| 2002/0037738 A1 | 3/2002 | Wycherley et al. |
| 2002/0038219 A1 | 3/2002 | Yanay et al. |
| 2002/0039914 A1 | 4/2002 | Hama et al. |
| 2002/0041262 A1 | 4/2002 | Mukai et al. |
| 2002/0047787 A1 | 4/2002 | Mikkola et al. |
| 2002/0049630 A1 | 4/2002 | Furuta et al. |
| 2002/0052754 A1 | 5/2002 | Joyce et al. |
| 2002/0054068 A1 | 5/2002 | Ellis et al. |
| 2002/0055872 A1 | 5/2002 | LaBrie et al. |
| 2002/0061767 A1 | 5/2002 | Sladen et al. |
| 2002/0065037 A1 | 5/2002 | Messina et al. |
| 2002/0066115 A1 | 5/2002 | Wendelrup |
| 2002/0068558 A1 | 6/2002 | Janik |
| 2002/0068585 A1 | 6/2002 | Chan et al. |
| 2002/0068599 A1 | 6/2002 | Rodriguez et al. |
| 2002/0072395 A1 | 6/2002 | Miramontes |
| 2002/0077808 A1 | 6/2002 | Liu et al. |
| 2002/0080163 A1 | 6/2002 | Morey |
| 2002/0085700 A1 | 7/2002 | Metcalf |
| 2002/0094806 A1 | 7/2002 | Kamimura |
| 2002/0097984 A1 | 7/2002 | Abecassis |
| 2002/0098857 A1 | 7/2002 | Ishii |
| 2002/0102960 A1 | 8/2002 | Lechner |
| 2002/0103872 A1 | 8/2002 | Watanabe |
| 2002/0104095 A1 | 8/2002 | Nguyen et al. |
| 2002/0110246 A1 | 8/2002 | Gosior et al. |
| 2002/0115469 A1 | 8/2002 | Rekimoto et al. |
| 2002/0120718 A1 | 8/2002 | Lee |
| 2002/0123336 A1 | 9/2002 | Kamada |
| 2002/0127997 A1 | 9/2002 | Karlstedt et al. |
| 2002/0128000 A1 | 9/2002 | do Nascimento |
| 2002/0133342 A1 | 9/2002 | McKenna |
| 2002/0137470 A1 | 9/2002 | Baron et al. |
| 2002/0137503 A1 | 9/2002 | Roderique |
| 2002/0137526 A1 | 9/2002 | Shinohara |
| 2002/0141086 A1 | 10/2002 | Lang et al. |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0160724 A1 | 10/2002 | Arai et al. |
| 2002/0164975 A1 | 11/2002 | Lu |
| 2002/0164996 A1 | 11/2002 | Dorenbosch |
| 2002/0165850 A1 | 11/2002 | Roberts et al. |
| 2002/0173344 A1 | 11/2002 | Cupps et al. |
| 2002/0177407 A1 | 11/2002 | Mitsumoto |
| 2002/0178225 A1 | 11/2002 | Madenberg et al. |
| 2002/0183045 A1 | 12/2002 | Emmerson et al. |
| 2002/0183098 A1 | 12/2002 | Lee et al. |
| 2002/0191951 A1 | 12/2002 | Sodeyama et al. |
| 2002/0193997 A1 | 12/2002 | Fitzpatrick et al. |
| 2002/0198017 A1 | 12/2002 | Babasaki et al. |
| 2002/0198813 A1 | 12/2002 | Patterson, Jr. et al. |
| 2002/0198936 A1 | 12/2002 | McIntyre et al. |

(56) References Cited

U.S. PATENT DOCUMENTS

| | | |
|---|---|---|
| 2003/0003967 A1 | 1/2003 | Ito |
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0025788 A1 | 2/2003 | Beardsley |
| 2003/0032406 A1 | 2/2003 | Minear et al. |
| 2003/0037265 A1 | 2/2003 | Sameshima et al. |
| 2003/0038800 A1 | 2/2003 | Kawahara |
| 2003/0038893 A1 | 2/2003 | Rajamaki et al. |
| 2003/0045311 A1 | 3/2003 | Larikka et al. |
| 2003/0045329 A1 | 3/2003 | Kinoshita |
| 2003/0052964 A1 | 3/2003 | Priestman et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0074398 A1 | 4/2003 | Matsuo |
| 2003/0083055 A1 | 5/2003 | Riordan et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0107580 A1 | 6/2003 | Egawa et al. |
| 2003/0110450 A1 | 6/2003 | Sakai |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0149662 A1 | 8/2003 | Shore |
| 2003/0153355 A1 | 8/2003 | Warren |
| 2003/0156208 A1 | 8/2003 | Obradovich |
| 2003/0166399 A1 | 9/2003 | Tokkonen et al. |
| 2003/0169329 A1 | 9/2003 | Parker et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0004616 A1 | 1/2004 | Konya et al. |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0060061 A1 | 3/2004 | Parker |
| 2004/0067751 A1 | 4/2004 | Vandermeijden et al. |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203520 A1 | 10/2004 | Schirtzinger et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0223049 A1 | 11/2004 | Taniguchi et al. |
| 2004/0235520 A1 | 11/2004 | Cadiz et al. |
| 2004/0242240 A1 | 12/2004 | Lin |
| 2004/0248586 A1 | 12/2004 | Patel et al. |
| 2004/0252197 A1 | 12/2004 | Fraley et al. |
| 2004/0259537 A1 | 12/2004 | Ackley |
| 2004/0264662 A1 | 12/2004 | Silver |
| 2004/0266418 A1 | 12/2004 | Kotzin |
| 2004/0267628 A1 | 12/2004 | Stillman |
| 2005/0004749 A1 | 1/2005 | Park |
| 2005/0032527 A1 | 2/2005 | Sheha et al. |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0075097 A1 | 4/2005 | Lehikoinen et al. |
| 2005/0090768 A1 | 4/2005 | Brattesani et al. |
| 2005/0113080 A1 | 5/2005 | Nishimura |
| 2005/0113113 A1 | 5/2005 | Reed |
| 2005/0120225 A1 | 6/2005 | Kirsch et al. |
| 2005/0136949 A1 | 6/2005 | Barnes, Jr. |
| 2005/0144560 A1 | 6/2005 | Gruen et al. |
| 2005/0151877 A1 | 7/2005 | Fisher |
| 2005/0159189 A1 | 7/2005 | Iyer |
| 2005/0163289 A1 | 7/2005 | Caspi et al. |
| 2005/0164684 A1 | 7/2005 | Chen et al. |
| 2005/0165871 A1 | 7/2005 | Barrs et al. |
| 2005/0166242 A1 | 7/2005 | Matsumoto et al. |
| 2005/0186954 A1 | 8/2005 | Kenney |
| 2005/0192030 A1 | 9/2005 | Asthana et al. |
| 2005/0207555 A1 | 9/2005 | Lee et al. |
| 2005/0227731 A1 | 10/2005 | Kall |
| 2005/0235312 A1 | 10/2005 | Karaoguz et al. |
| 2005/0261945 A1 | 11/2005 | Mougin et al. |
| 2005/0272448 A1 | 12/2005 | Tran et al. |
| 2005/0272504 A1 | 12/2005 | Eguchi et al. |
| 2005/0282582 A1 | 12/2005 | Slotznick et al. |
| 2006/0003813 A1 | 1/2006 | Seligmann et al. |
| 2006/0031407 A1 | 2/2006 | Dispensa et al. |
| 2006/0033809 A1 | 2/2006 | Farley |
| 2006/0035628 A1 | 2/2006 | Miller et al. |
| 2006/0041923 A1 | 2/2006 | McQuaide, Jr. |
| 2006/0052100 A1 | 3/2006 | Almgren |
| 2006/0059038 A1 | 3/2006 | Iuchi et al. |
| 2006/0084413 A1 | 4/2006 | Myoung |
| 2006/0114100 A1 | 6/2006 | Ghabra et al. |
| 2006/0121986 A1 | 6/2006 | Pelkey et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |

(56) References Cited

U.S. PATENT DOCUMENTS

| | | |
|---|---|---|
| 2006/0143655 A1 | 6/2006 | Ellis et al. |
| 2006/0166650 A1 | 7/2006 | Berger et al. |
| 2006/0167677 A1 | 7/2006 | Bitzer |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0258396 A1 | 11/2006 | Matsuoka |
| 2006/0262911 A1 | 11/2006 | Chin et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015550 A1 | 1/2007 | Kayanuma |
| 2007/0032255 A1 | 2/2007 | Koo et al. |
| 2007/0037605 A1 | 2/2007 | Logan et al. |
| 2007/0050832 A1 | 3/2007 | Wright et al. |
| 2007/0061845 A1 | 3/2007 | Barnes |
| 2007/0097879 A1 | 5/2007 | Bleckert et al. |
| 2007/0099703 A1 | 5/2007 | Terebilo |
| 2007/0109262 A1 | 5/2007 | Oshima et al. |
| 2007/0135145 A1 | 6/2007 | Lee et al. |
| 2007/0135150 A1 | 6/2007 | Ushiki et al. |
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0262848 A1 | 11/2007 | Berstis et al. |
| 2007/0293240 A1 | 12/2007 | Drennan |
| 2008/0006762 A1 | 1/2008 | Fadell et al. |
| 2008/0014917 A1 | 1/2008 | Rhoads et al. |
| 2008/0016534 A1 | 1/2008 | Ortiz et al. |
| 2008/0039125 A1 | 2/2008 | Fan et al. |
| 2008/0058005 A1 | 3/2008 | Zicker et al. |
| 2008/0070561 A1 | 3/2008 | Keum et al. |
| 2008/0070588 A1 | 3/2008 | Morin |
| 2008/0082930 A1 | 4/2008 | Omernick et al. |
| 2008/0104544 A1 | 5/2008 | Collins et al. |
| 2008/0109840 A1 | 5/2008 | Walter et al. |
| 2008/0139222 A1 | 6/2008 | Falvo et al. |
| 2008/0140686 A1 | 6/2008 | Hong et al. |
| 2008/0146272 A1 | 6/2008 | Rao et al. |
| 2008/0151696 A1 | 6/2008 | Giroud et al. |
| 2008/0167078 A1 | 7/2008 | Eibye |
| 2008/0172173 A1 | 7/2008 | Chang et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0254811 A1 | 10/2008 | Stewart |
| 2008/0299989 A1 | 12/2008 | King et al. |
| 2009/0017812 A1 | 1/2009 | Chan et al. |
| 2009/0047972 A1 | 2/2009 | Neeraj |
| 2009/0111486 A1 | 4/2009 | Burstrom |
| 2009/0124243 A1 | 5/2009 | Routley et al. |
| 2009/0150807 A1 | 6/2009 | George et al. |
| 2009/0153490 A1 | 6/2009 | Nymark et al. |
| 2009/0186628 A1 | 7/2009 | Yonker et al. |
| 2009/0221330 A1 | 9/2009 | Tomimori |
| 2009/0290369 A1 | 11/2009 | Schofield et al. |
| 2009/0319947 A1 | 12/2009 | Wang et al. |
| 2010/0030557 A1 | 2/2010 | Molloy et al. |
| 2010/0062740 A1 | 3/2010 | Ellis et al. |
| 2010/0079267 A1 | 4/2010 | Lin |
| 2010/0145700 A1 | 6/2010 | Kennewick et al. |
| 2012/0059545 A1 | 3/2012 | Furuno et al. |
| 2012/0064874 A1 | 3/2012 | Pierce et al. |
| 2013/0298059 A1 | 11/2013 | Raskin |
| 2015/0018091 A1 | 1/2015 | Suzuki et al. |

FOREIGN PATENT DOCUMENTS

| | | |
|---|---|---|
| JP | H10155141 A1 | 6/1998 |
| JP | H11/195137 A1 | 7/1999 |
| JP | 2002/252691 A1 | 9/2002 |
| JP | 2003/078977 A1 | 3/2003 |
| JP | 2003/228726 A1 | 8/2003 |
| JP | 2003/263656 A1 | 9/2003 |
| JP | 2005/216149 A1 | 8/2005 |
| LB | 01/31893 A1 | 5/2001 |
| WO | 03001457 A1 | 1/2003 |
| WO | 03096660 A1 | 11/2003 |

OTHER PUBLICATIONS

Casio, "Pocket PC User's Guide" published on Feb. 3, 2000.
Audiovox, "Pocket PC Phone User Manual" published on Mar. 19, 2004.
Palm, "Using your Treo" published in Feb. 2004.
Palm, "Palm Treo 600 Support Knowledge Library, Solution ID 29492" published in Jan. 2004.
Dataviz, "Documents to Go included on Treo 600 Smartphone from palmOne" published in Nov. 2003.
Palm, "Treo 600 smartphone" published in 2003.
FCC's wireless Enhanced 911 (E911) rules, Phase I and Phase II.
HI Corporation's company history (http://www.hicorp.co.jp/english/corporate/history.html) Copyright notice on the web: (c) 2007-2011 HI Corporation. All Rights Reserved.
HI Corporation to Offer 3D Graphics to Motorola Mobile Phone Platform Customers (http://www.wirelessdevnet.com/news/2003/203/news7.html) Published on the web on: Jul. 21, 2003.
Development of NTT docomo Mova N504i—NEC Gi-Ho (Technology Magazine) vol. 56 No. May 2003, p. 144 Published in: May 2003.
Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

* cited by examiner

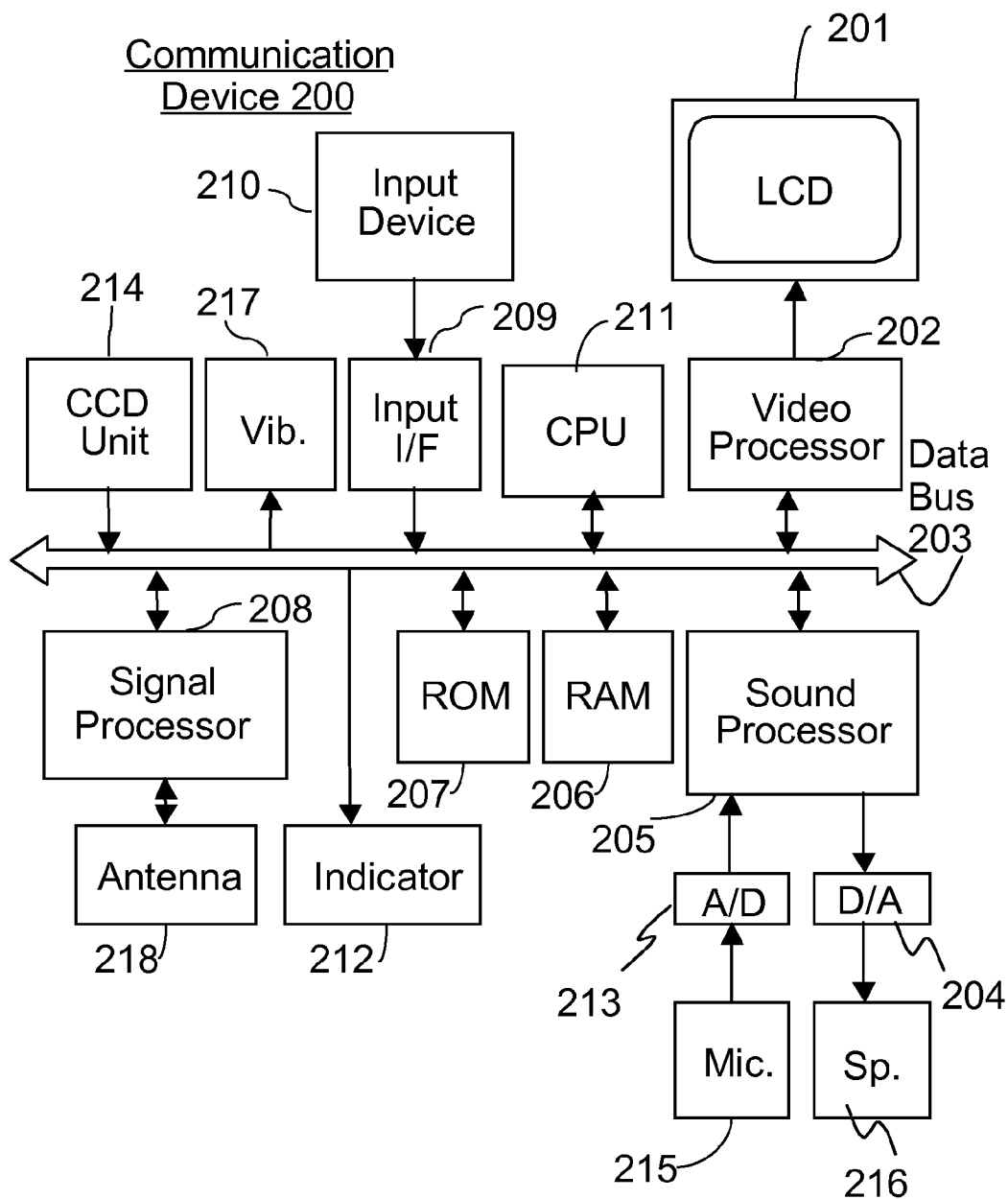

COMMUNICATION DEVICE

CROSS REFERENCE TO RELATED APPLICATIONS

This application is a continuation of U.S. Ser. No. 14/337,224 filed 2014 Jul. 22, which is a continuation of U.S. Ser. No. 13/872,257 filed 2013 Apr. 29, which is a continuation of U.S. Ser. No. 12/979,530 filed 2010 Dec. 28, which is a continuation of U.S. Ser. No. 11/743,768 filed 2007 May 3, both of which are hereby incorporated herein by reference in their entirety.

BACKGROUND OF INVENTION

The invention relates to communication device and more particularly to the communication device which is capable to communicate with another communication device in a wireless fashion.

U.S. Patent Publication No. 20030045301 is introduced as prior art of the present invention of which the summary is the following: "The present invention is directed to an electronic system and method for managing location, calendar, and event information. The system comprises at least two hand portable electronic devices, each having a display device to display personal profile, location, and event information, and means for processing, storing, and wirelessly communicating data. A software program running in the electronic device can receive local and remote input data; store, process, and update personal profile, event, time, and location information; and convert location information into coordinates of a graphic map display. The system additionally includes at least one earth orbiting satellite device using remote sensing technology to determine the location coordinates of the electronic device. The electronic devices receive synchronization messages broadcast by the satellite device, causing the software program to update the personal profile, event, time, and location information stored in each hand portable electronic device". However, this prior art does not disclose the system comprising a first communication device and a second communication device, wherein when the door is locked by the first communication device, a door locked message is displayed on the first communication device and/or the second communication device, wherein when the door is unlocked by the first communication device, a door unlocked message is displayed on the first communication device and/or the second communication device, and wherein the first communication device comprises a moving picture replaying implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

It is another object of the present invention to provide a device capable to implement a plurality of functions.

The present invention introduces the system comprising a first communication device and a second communication device, wherein when the door is locked by the first communication device, a door locked message is displayed on the first communication device and/or the second communication device, wherein when the door is unlocked by the first communication device, a door unlocked message is displayed on the first communication device and/or the second communication device, and wherein the first communication device comprises a moving picture replaying implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the FIGURE number is cited after the elements in parenthesis in a manner for example 'RAM 206 (FIG. 1)'. It is done so merely to assist the readers to have a better understanding of this specification, and must not be used to limit the scope of the claims in any manner since the FIGURE numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the elements of Communication Device 200. The elements of Communication Device 200 described in this paragraph is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Voice Recognition System>>

Communication Device 200 (FIG. 1) has the function to operate the device by the user's voice or convert the user's voice into a text format (i.e., the voice recognition). The voice recognition function can be performed in terms of software by using Area 261, the voice recognition working area, of RAM 206 (FIG. 1) which is specifically allocated to perform such function, or can also be performed in terms of hardware circuit where such space is specifically allocated in Area 282 of Sound Processor 205 (FIG. 1) for the voice recognition system.

This paragraph illustrates how the voice recognition function is activated. CPU 211 (FIG. 1) periodically checks the input status of Input Device 210 (FIG. 1) (S1). If CPU 211 detects a specific signal input from Input Device 210 (S2) the voice recognition system is activated. As another embodiment, the voice recognition system can also be activated by entering predetermined phrase, such as 'start voice recognition system' via Microphone 215 (FIG. 1).

<<Voice Recognition—Dialing/Auto-Off During Call Function>>

This paragraph illustrates the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

<<Voice Recognition Tag Function>>

The following paragraphs describe the method of inputting the numeric information in a convenient manner.

In this embodiment, RAM 206 includes Table #1 and Table #2. Audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' Tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' Once the audio data is processed as described in S4 hereinbefore, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

This paragraph illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' Once the audio data is processed as described in S4 hereinbefore, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained hereinbefore. Namely, once the audio data is processed by CPU 211 (FIG. 1) as described in S4 hereinbefore and retrieves the text data therefrom and detects one of the tags registered in Table #2 (e.g., 'Scot'), CPU 211 retrieves the corresponding numeric information (e.g., '(916) 411-2526') from the same table.

<<Voice Recognition Noise Filtering Function>>

The following paragraphs describe the method of minimizing the undesired effect of the background noise when utilizing the voice recognition system.

In this embodiment, RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256.

This paragraph describes the method to utilize the data stored in Area 255 and Area 256 described hereinbefore. When the voice recognition system is activated as described hereinbefore, the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1). If the digital audio data matches to the data stored in Area 255 and/or Area 256, the filtering process is initiated and the matched portion of the digital audio data is deleted as background noise. Such sequence of process is done before retrieving text and numeric information from the digital audio data.

This paragraph describes the method of updating Area 255. When the voice recognition system is activated as described hereinbefore, the analog audio data is input from Microphone 215 (FIG. 1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

This paragraph describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

<<Voice Recognition Auto-Off Function>>

The voice recognition system can be automatically turned off to avoid glitch. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition Email Function (1)>>

This paragraph illustrates the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

<<Voice Recognition—Speech-to-Text Function>>

The next paragraph illustrates the speech-to-text function of Communication Device 200 (FIG. 1).

Once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

This paragraph illustrates how the text and numeric information as well as the tag are displayed. On LCD 201 the text and numeric information 702 ('XXXXXXXXX') are displayed with the predetermined font and color as well as with the tag 701 ('John').

<<Audio/Video Data Capturing System>>

The following paragraphs illustrate the audio/video capturing system of Communication Device 200 (FIG. 1).

Assuming that Device A, a Communication Device 200, captures audio/video data and transfers such data to Device B, another Communication Device 200, via a host (not shown). Primarily video data is input from CCD Unit 214 (FIG. 1) and audio data is input from Microphone 215 of (FIG. 1) of Device A.

In this embodiment, RAM 206 (FIG. 1) includes Area 267 which stores video data, Area 268 which stores audio data, and Area 265 which is a work area utilized for the process explained hereinafter.

In this embodiment, the video data input from CCD Unit 214 (FIG. 1) (S1a) is converted from analog data to digital data (S2a) and is processed by Video Processor 202 (FIG. 1) (S3a). Area 265 is used as work area for such process. The processed video data is stored in Area 267 of RAM 206 (S4a) and is displayed on LCD 201 (FIG. 1) (S5a). The audio data input from Microphone 215 (FIG. 1) (S1b) is converted from analog data to digital data by A/D 213 (FIG. 1) (S2b) and is processed by Sound Processor 205 (FIG. 1) (S3b). Area 265 is used as work area for such process. The processed audio data is stored in Area 268 of RAM 206 (S4b) and is transferred to Sound Processor 205 and is output from Speaker 216 (FIG. 1) via D/A 204 (FIG. 1) (S5b). The sequences of S1a through S5a and S1b through S5b are continued until a specific signal indicating to stop such sequence is input from Input Device 210 (FIG. 1) or by the voice recognition system (S6).

This paragraph illustrates the sequence to transfer the video data and the audio data via Antenna 218 (FIG. 1) in a wireless fashion. CPU 211 (FIG. 1) of Device A initiates a dialing process (S1) until the line is connected to a host (not shown) (S2). As soon as the line is connected, CPU 211 reads the video data and the audio data stored in Area 267 and Area 268 (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

This paragraph illustrates the basic structure of the transferred data which is transferred from Device A as described in S4 and S5 hereinbefore. Transferred data 610 is primarily composed of Header 611, video data 612, audio data 613, relevant data 614, and Footer 615. Video data 612 corresponds to the video data stored in Area 267 of RAM 206, and audio data 613 corresponds to the audio data stored in Area 268 of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

This paragraph illustrates the data contained in RAM 206 (FIG. 1) of Device B. RAM 206 includes Area 269 which stores video data, Area 270 which stores audio data, and Area 266 which is a work area utilized for the process explained hereinafter.

In this embodiment, CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 and Area 270 of RAM 206 respectively (S5). The video data stored in Area 269 is processed by Video Processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in Area 270 is processed by Sound Processor 205 (FIG. 1) (S6b). The processed audio data is converted into analog data by D/A 204 (FIG. 1) (S7b) and output from Speaker 216 (FIG. 1) (S8b). The sequences of S6a through S8a and S6b through S8b are continued until a specific signal indicating to stop such sequence is input from Input Device 210 (FIG. 1) or via the voice recognition system (S9).

<<Caller ID System>>

The following paragraphs illustrate the caller ID system of Communication Device 200 (FIG. 1).

In this embodiment, RAM 206 includes Table C. Each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

In this embodiment, the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

In this embodiment, CPU 211 (FIG. 1) periodically checks whether it has received a call from other communication devices (S1). If it receives a call (S2), CPU 211 scans Table C to see whether the phone number of the caller device is registered in the table (S3). If there is a match (S4), the designated color is output from Indicator 212 (FIG. 1) and the designated sound is output from Speaker 216 (FIG. 1) (S5). For example if the incoming call is from Phone #1, Color A is output from Indicator 212 and Sound E is output from Speaker 216.

<<Call Blocking Function>>

The following paragraphs illustrate the so-called 'call blocking' function of Communication Device 200 (FIG. 1).

In this embodiment, RAM 206 (FIG. 1) includes Area 273 and Area 274. Area 273 stores phone numbers that should be blocked. In this embodiment, Phone #1, Phone #2, and Phone #3 are blocked. Area 274 stores a message data, preferably a wave data, stating that the phone can not be connected.

This paragraph illustrates the operation of Communication Device 200. When Communication Device 200 receives a call (S1), CPU 211 (FIG. 1) scans Area 273 of RAM 206 (S2). If the phone number of the incoming call matches one of the phone numbers stored in Area 273 (S3), CPU 211 sends the message data stored in Area 274 of RAM 206 to the caller device (S4) and disconnects the line (S5).

This paragraph illustrates the method of updating Area 273 of RAM 206. Assuming that the phone number of the incoming call does not match any of the phone numbers stored in Area 273 of RAM 206 (see S3 hereinbefore). In that case, Communication Device 200 is connected to the caller device. However, the user of Communication Device 200 may decide to have such number 'blocked' after all. If that is the case, the user dials '999' while the line is connected. Technically CPU 211 (FIG. 1) periodically checks the signals input from Input Device 210 (FIG. 1) (S1). If the input signal represents a numerical data '999' from Input Device 210 (S2), CPU 211 adds the phone number of the pending call to Area 273 (S3) and sends the message data stored in Area 274 of RAM 206 to the caller device (S4). The line is disconnected thereafter (S5).

The following paragraphs illustrate another embodiment of the present invention.

In this embodiment, Host H (not shown) includes Area 403 and Area 404. Area 403 stores phone numbers that should be blocked to be connected to Communication Device 200. In this embodiment, Phone #1, Phone #2, and Phone #3 are blocked for Device A; Phone #4, Phone #5, and Phone #6 are blocked for Device B; and Phone #7, Phone #8, and Phone #9 are blocked for Device C. Area 404 stores a message data stating that the phone can not be connected.

This paragraph illustrates the operation of Host H (not shown). Assuming that the caller device is attempting to connect to Device B, Communication Device 200. Host H periodically checks the signals from all Communication Device 200 (S1). If Host H detects a call for Device B (S2), it scans Area 403 (S3) and checks whether the phone number of the incoming call matches one of the phone numbers stored therein for Device B (S4). If the phone number of the incoming call does not match any of the phone numbers stored in Area 403, the line is connected to Device B (S5b). On the other hand, if the phone number of the incoming call matches one of the phone numbers stored in Area 403, the line is 'blocked,' i.e., not connected to Device B (S5a) and Host H sends the massage data stored in Area 404 to the caller device (S6).

This paragraph illustrates the method of updating Area 403 of Host H. Assuming that the phone number of the incoming call does not match any of the phone numbers stored in Area 403 (see S4 described hereinbefore). In that case, Host H allows the connection between the caller device and Communication Device 200, however, the user of Communication Device 200 may decide to have such number 'blocked' after all. If that is the case, the user simply dials '999' while the line is connected. Technically Host H periodically checks the signals input from Input Device 210 (FIG. 1) (S1). If the input signal represents '999' from Input Device 210 (FIG. 1) (S2), Host H adds the phone number of the pending call to Area 403 (S3) and sends the message data stored in Area 404 to the caller device (S4). The line is disconnected thereafter (S5).

As another embodiment of the method illustrated in the previous paragraph, Host H may delegate some of its tasks to Communication Device 200. Namely, Communication Device 200 periodically checks the signals input from Input Device 210 (FIG. 1). If the input signal represents a numeric data '999' from Input Device 210, Communication Device 200 sends to Host H a block request signal as well as with the phone number of the pending call. Host H, upon receiving the block request signal from Communication Device 200, adds the phone number of the pending call to Area 403 and sends the message data stored in Area 404 to the caller device. The line is disconnected thereafter.

<<Navigation System>>

The following paragraphs illustrate the navigation system of Communication Device 200 (FIG. 1).

In this embodiment, RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

In this embodiment, Video Processor 202 (FIG. 1) includes texture mapping processor 290. Texture mapping processor 290 produces polygons in a three-dimensional space and 'pastes' textures to each polygon. The concept of such method is described in the following patents and the references cited thereof: U.S. Pat. No. 5,870,101, U.S. Pat. No. 6,157,384, U.S. Pat. No. 5,774,125, U.S. Pat. No. 5,375,206, and/or U.S. Pat. No. 5,925,127.

In this embodiment, the voice recognition system is activated when CPU 211 (FIG. 1) detects a specific signal input from Input Device 210 (FIG. 1) (S1). After the voice recognition system is activated, the input current position mode starts and the current position of Communication Device 200 is input by voice recognition system (S2). The current position can also be input from Input Device 210. As another embodiment of the present invention, the current position can automatically be detected by the method so-called 'global positioning system' or 'GPS' and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

This paragraph illustrates the sequence of the input current position mode described in S2 described hereinbefore. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

This paragraph illustrates the sequence of the input destination mode described in S3 described hereinbefore. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

This paragraph illustrates the sequence of displaying the shortest route from the current position to the destination. CPU 211 (FIG. 1) retrieves both the current position data and the Destination Data which are input by the method described hereinbefore from Area 277 of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 of RAM 206 (S2).

As another embodiment of the present invention, by way of utilizing the location data stored in Area 277, CPU 211 may produce a three-dimensional map by composing the three dimensional objects (by method so-called 'texture mapping' as described above) which are stored in Area 276 of RAM 206. The two-dimensional map and/or the three dimensional map is displayed on LCD 201 (FIG. 1) (S3).

As another embodiment of the present invention, the attribution data stored in Area 295 of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 of RAM 206. Then CPU 211 retrieves a plurality of object data which correspond to such location data from Area 276 of RAM 206 and displays a plurality of objects on LCD 201 based on such object data in a manner the user of Communication Device 200 may observe from the current location.

This paragraph illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 of RAM 206 (S3). Instead, by way of utilizing the location data stored in Area 277, CPU 211 may produce a three-dimensional map by composing the three dimensional objects by method so-called 'texture mapping' which are stored in Area 276 of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

This paragraph illustrates the method of finding the shortest location of the desired facility, such as restaurant, hotel, gas station, etc. The voice recognition system is activated in the manner described hereinbefore (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described hereinbefore (S3). From the data selected in S2, CPU 211 scans Area 277 of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (S5). Instead, by way of utilizing the location data stored in 277, CPU 211 may produce a three-dimensional map by composing the three dimensional objects by method so-called 'texture mapping' which are stored in Area 276 of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

This paragraph illustrates the method of displaying the time and distance to the destination. CPU 211 (FIG. 1) calculates the current position wherein the source data can be input from the method described hereinbefore (S1). The distance is calculated from the method described hereinbefore (S2). The speed is calculated from the distance which Communication Device 200 has proceeded within specific period of time (S3). The distance to the destination and the time left are displayed on LCD 201 (FIG. 1) (S4 and S5).

This paragraph illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method is repeated for a certain period of time. If the deviation still exists after such period of time has passed, CPU 211 (FIG. 1) initiates the sequence described hereinbefore and calculates the shortest route to the destination and display it on LCD 201. The details of such sequence is as same as the one explained hereinbefore.

This paragraph illustrates the overall operation of Communication Device 200 regarding the navigation system and the communication system. When Communication Device 200 receives data from Antenna 218 (FIG. 1) (S1), CPU 211 (FIG. 1) determines whether the data is navigation data, i.e., data necessary to operate the navigation system (S2). If the data received is a navigation data, the navigation system described hereinbefore is performed (S3). On the other hand, if the data received is a communication data (S4), the communication system, i.e., the system necessary for wireless communication which is mainly described in FIG. 1 is performed (S5).

<<Auto Time Adjust Function>>

The following paragraphs illustrate the automatic time adjust function, i.e., a function which automatically adjusts the clock of Communication Device 200.

This paragraph illustrates the data stored in RAM 206 (FIG. 1). In this embodiment, RAM 206 includes Auto Time Adjust Software Storage Area 2069a, Current Time Data Storage Area 2069b, and Auto Time Data Storage Area 2069c. Auto Time Adjust Software Storage Area 2069a stores software program to implement the present function which is explained in details hereinafter, Current Time Data Storage Area 2069b stores the data which represents the current time, and Auto Time Data Storage Area 2069c is a working area assigned for implementing the present function.

This paragraph illustrates a software program stored in Auto Time Adjust Software Storage Area 2069a. First of all, Communication Device 200 is connected to Network NT (e.g., the Internet) via Antenna 218 (FIG. 1) (S1). CPU 211 (FIG. 1) then retrieves an atomic clock data from Network NT (S2) and the current time data from Current Time Data Storage Area 2069b, and compares both data. If the difference between both data is not within the predetermined value X (S3), CPU 211 adjusts the current time data (S4). The method to adjust the current data can be either simply overwrite the data stored in Current Time Data Storage Area 2069b with the atomic clock data retrieved from Network NT or calculate the difference of the two data and add or subtract the difference to or from the current time data stored in Current Time Data Storage Area 2069b by utilizing Auto Time Data Storage Area 2069c as a working area.

This paragraph illustrates another software program stored in Auto Time Adjust Software Storage Area 2069a. When the power of Communication Device 200 is turned on (S1), CPU 211 (FIG. 1) stores a predetermined timer value in Auto Time Data Storage Area 2069c (S2). The timer value is decremented periodically (S3). When the timer value equals to zero (S4), the automatic timer adjust function is activated (S5) and CPU 211 performs the sequence described hereinbefore, and the sequence of S2 through S4 is repeated thereafter.

<<Calculator Function>>

The following paragraphs illustrate the calculator function of Communication Device 200. Communication Device 200 can be utilized as a calculator to perform mathematical calculation by implementing the present function.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step, and the calculator function is activated (S3c) when the calculator function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c, and the data to activate (as described in S3c of the previous paragraph) and to perform the calculator function is stored in Calculator Information Storage Area 20615a.

This paragraph illustrates the data stored in Calculator Information Storage Area 20615a. In this embodiment, Calculator Information Storage Area 20615a includes Calculator Software Storage Area 20615b and Calculator Data Storages Area 20615c. Calculator Software Storage Area 20615b stores the software programs to implement the present function, such as the one explained hereinafter, and Calculator Data Storage Area 20615c stores a plurality of data necessary to execute the software programs stored in Calculator Software Storage Area 20615b and to implement the present function.

This paragraph illustrates the software program stored in Calculator Storage Area 20615b. In this embodiment, one or more of numeric data are input by utilizing Input Device 210 (FIG. 1) or via voice recognition system as well as the arithmetic operators (e.g., '+', '−', and '×'), which are temporarily stored in Calculator Data Storage Area 20615c (S1). By utilizing the data stored in Calculator Data Storage Area 20615c, CPU 211 (FIG. 1) performs the calculation by executing the software program stored in Calculator Software Storage Area 20615b (S2). The result of the calculation is displayed on LCD 201 (FIG. 1) thereafter (S3).

<<Spreadsheet Function>>

The following paragraphs illustrate the spreadsheet function of Communication Device 200. Here, the spreadsheet is composed of a plurality of cells which are aligned in matrix. In other words, the spreadsheet is divided into a plurality of rows and columns in which alphanumeric data is capable to be input. Microsoft Excel is the typical example of the spreadsheet.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step, and the spreadsheet function is activated (S3c) when the spreadsheet function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c, and the data to activate (as described in S3c of the previous paragraph) and to perform the spreadsheet function is stored in Spreadsheet Information Storage Area 20616a.

This paragraph illustrates the data stored in Spreadsheet Information Storage Area 20616a. In this embodiment, Spreadsheet Information Storage Area 20616a includes Spreadsheet Software Storage Area 20616b and Spreadsheet Data Storage Area 20616c. Spreadsheet Software Storage Area 20616b stores the software programs to implement the present function, such as the one explained hereinafter, and Spreadsheet Data Storage Area 20616c stores a plurality of data necessary to execute the software programs stored in Spreadsheet Software Storage Area 20616b and to implement the present function.

This paragraph illustrates the software program stored in Spreadsheet Software Storage Area 20616b. In this embodiment, a certain cell of a plurality of cells displayed on LCD 201 (FIG. 1) is selected by utilizing Input Device 210 (FIG. 1) or via voice recognition system. The selected cell is highlighted by a certain manner, and CPU 211 (FIG. 1) stores the location of the selected cell in Spreadsheet Data Storage Area 20616c (S1). One or more of alphanumeric data are input by utilizing Input Device 210 or via voice recognition system into the cell selected in S1, and CPU 211 stores the alphanumeric data in Spreadsheet Data Storage Area 20616c (S2). CPU 21 displays the alphanumeric data on LCD 201 thereafter (S3). The sequence of S1 through S3 can be repeated for a numerous amount of times and saved and closed thereafter.

<<Word Processing Function>>

The following paragraphs illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described hereinafter, and the word processing function is activated (S3c) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described hereinafter, and the data to activate (as described in S3c of the previous paragraph) and to perform the word processing function is stored in Word Processing Information Storage Area 20617a.

This paragraph illustrates the data stored in Word Processing Information Storage Area 20617a. Word Processing Information Storage Area 20617a includes Word Processing Software Storage Area 20617b and Word Processing Data Storage Area 20617c. Word processing Software Storage Area 20617b stores the software programs described hereinafter, and Word Processing Data Storage Area 20617c stores a plurality of data described hereinafter.

This paragraph illustrates the software programs stored in Word Processing Software Storage Area 20617b. Word Processing Software Storage Area 20617b stores Alphanumeric Data Input Software 20617b1, Bold Formatting Software 20617b2, Italic Formatting Software 20617b3, Image Pasting Software 20617b4, Font Formatting Software 20617b5, Spell Check Software 20617b6, Underlining Software 20617b7, Page Numbering Software 20617b8, and Bullets And Numbering Software 20617b9. Alphanumeric Data Input Software 20617b1 inputs to a document a series of alphanumeric data in accordance to the input signals produced by utilizing Input Device 210 (FIG. 1) or via voice recognition system. Bold Formatting Software 20617b2 implements the bold formatting function which makes the selected alphanumeric data bold of which the sequence is described hereinafter. Italic Formatting Software 20617b3 implements the italic formatting function which makes the selected alphanumeric data italic of which the sequence is described hereinafter. Image Pasting Software 20617b4 implements the image pasting function which pastes the selected image to a document to the selected location of which the sequence is described hereinafter. Font Formatting Software 20617b5 implements the font formatting function which changes the selected alphanumeric data to the selected font of which the sequence is described hereinafter. Spell Check Software 20617b6 implements the spell check function which fixes spelling and grammatical errors of the alphanumeric data in a document of which the sequence is described hereinafter. Underlining Software 20617b7 implements the underlining function which adds the selected underlines to the selected alphanumeric data of which the sequence is described hereinafter. Page Numbering Software 20617b8 implements the page numbering function which adds page numbers at the selected location to each page of a document of which the sequence is described hereinafter. Bullets And Numbering Software 20617b9 implements the bullets and numbering function which adds the selected type of bullets and numbers to the selected paragraphs of which the sequence is described hereinafter.

This paragraph illustrates the data stored in Word Processing Data Storage Area 20617c. Word Processing Data Storage Area 20617c includes Alphanumeric Data Storage Area 20617c1, Bold Formatting Data Storage Area 20617c2, Italic Formatting Data Storage Area 20617c3, Image Data Storage Area 20617c4, Font Formatting Data Storage Area 20617c5, Spell Check Data Storage Area 20617c6, Underlining Data Storage Area 20617c7, Page Numbering Data Storage Area 20617c8, and Bullets And Numbering Data Storage Area 20617c9. Alphanumeric Data Storage Area 20617c1 stores the basic text and numeric data which are not decorated by bold and/or italic (the default font may be courier new). Bold Formatting Data Storage Area 20617c2 stores the text and numeric data which are decorated by bold. Italic Formatting Data Storage Area 20617c3 stores the text and numeric data which are decorated by italic. Image Data Storage Area 20617c4 stores the data representing the location of the image data pasted in a document and the image data itself. Font Formatting Data Storage Area 20617c5 stores a plurality of types of fonts, such as arial, century, courier new, tahoma, and times new roman, of all text and numeric data stored in Alphanumeric Data Storage Area 20617c1. Spell check Data Storage Area 20617c6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617c7 stores a plurality of data representing underlines of different types. Page Numbering Data Storage Area 20617c8 stores the data representing the location of page numbers to be displayed in a document and the page number of each page of a document. Bullets And Numbering Data Storage Area 20617c9 stores a plurality of data representing different types of bullets and numbering and the location which they are added.

This paragraph illustrates the sequence of the software program stored in Alphanumeric Data Input Software 20617b1. A plurality of alphanumeric data is input by utilizing Input Device 210 (FIG. 1) or via voice recognition system (S1). The corresponding alphanumeric data is retrieved from Alphanumeric Data Storage Area 20617c1 (S2), and the document including the alphanumeric data retrieved in S2 is displayed on LCD 201 (FIG. 1) (S3).

This paragraph illustrates the sequence of the software program stored in Bold Formatting Software 20617b2. One or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617c2 (S3), and replaces the alphanumeric data selected in S1 with the bold formatting data retrieved in S3 (S4). The document with the replaced bold formatting data is displayed on LCD 201 thereafter (S5).

This paragraph illustrates the sequence of the software program stored in Italic Formatting Software 20617b3. One or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617c3 (S3), and replaces the alphanumeric data selected in S1 with the italic formatting data retrieved in S3 (S4). The document with the replaced italic formatting data is displayed on LCD 201 thereafter (S5).

This paragraph illustrates the sequence of the software program stored in Image Pasting Software 20617b4. The image to be pasted is selected by utilizing Input Device 210 (FIG. 1) or via voice recognition system (S1). Here, the image may be of any type, such as JPEG, GIF, and TIFF. Next the location in a document where the image is to be pasted is selected by utilizing Input Device 210 or via voice recognition system (S2). The data representing the location is stored in Image Pasting Data Storage Area 20617c4. The image is pasted at the location selected in S2 and the image is stored in Image Pasting Data Storage Area 20617c4 (S3). The document with the pasted image is displayed on LCD 201 (FIG. 1) thereafter (S4).

This paragraph illustrates the sequence of the software program stored in Font Formatting Software 20617b5. One or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617c5 (S3), and replaces the alphanumeric data selected in S1 with the font formatting data retrieved in S3 (S4). The document with the replaced font formatting data is displayed on LCD 201 thereafter (S5).

This paragraph illustrates the sequence of the software program stored in Spell Check Software 20617b6. CPU 211 (FIG. 1) scans all alphanumeric data in a document (S1). CPU 211 then compares the alphanumeric data with the spell check data stored in Spell Check Data Storage Area 20617c6, i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4).

This paragraph illustrates the sequence of the software program stored in Underlining Software 20617b7. One or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617c7 (S3), and adds to the alphanumeric data selected in S1 (S4). The document with underlines added to the selected alphanumeric data is displayed on LCD 201 thereafter (S5).

This paragraph illustrates the sequence of the software program stored in Page Numbering Software 20617b8. A page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617c8, and adds the page number to each page of a document at the selected location (S3). The document with page numbers is displayed on LCD 201 thereafter (S4).

This paragraph illustrates the sequence of the software program stored in Bullets And Numbering Software 20617b9. A paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617c9, and adds the bullets and/or numbering to the selected paragraph of a document (S3). The document with the bullets and/or numbering is displayed on LCD 201 thereafter (S4).

<<Start Up Software Function>>

The following paragraphs illustrate the start up software program function which enables Communication Device 200 to automatically activate (or start up) the registered software programs when the power is on.

This paragraph illustrates the overall sequence of the present function. The user of Communication Device 200 presses the power button of Communication Device 200 (S1). Then the predetermined software programs automatically activate (or start up) without having any instructions from the user of Communication Device 200 (S2).

This paragraph illustrates the storage area included RAM 206 (FIG. 1). RAM 206 includes Start Up Information Storage Area 20621a which is described hereinafter.

This paragraph illustrates the storage areas included in Start Up Information Storage Area 20621a. Start Up Information Storage Area 20621a includes Start Up Software Storage Area 20621b and Start Up Data Storage Area 20621c. Start Up Software Storage Area 20621b stores the software programs necessary to implement the present function, such as the ones described hereinafter. Start Up Data Storage Area 20621c stores the data necessary to implement the present function, such as the ones described hereinafter.

This paragraph illustrates the software programs stored in Start Up Software Storage Area 20621b. Start Up Software Storage Area 20621b stores Power On Detecting Software 20621b1, Start Up Data Storage Area Scanning Software 20621b2, and Start Up Software Activating Software 20621b3. Power On Detecting Software 20621b1 detects whether the power of Communication Device 200 is on of which the sequence is described hereinafter, Start Up Data Storage Area Scanning Software 20621b2 identifies the software programs which are automatically activated of which the sequence is described hereinafter, and Start Up Software Activating Software 20621b3 activates the identified software programs identified by Start Up Data Storage Area Scanning Software 20621b2 of which the sequence is described hereinafter.

This paragraph illustrates the storage area included in Start Up Data Storage Area 20621c. Start Up Data Storage Area 20621c includes Start Up Software Index Storage Area 20621c1. Here, Start Up Software Index Storage Area 20621c1 stores the software program indexes, wherein a software program index is an unique information assigned to each software program as an identifier (e.g., title of a software program) of which the details are explained hereinafter.

This paragraph illustrates the data stored in Start Up Software Index Storage Area 20621c1. Start Up Software Index Storage Area 20621c1 stores the software program indexes of the software programs which are automatically activated by the present function. Here, the software programs may be any software programs explained in this specification. Three software program indexes, i.e., Start Up Software Index 20621c1a, Start Up Software Index 20621c1b, and Start Up Software Index 20621c1c, are stored in Start Up Software Index Storage Area 20621c1 in the present example. The software program indexes can be created and store in Start Up Software Index Storage Area 20621c1 manually by utilizing input device 210 (FIG. 1) or via voice recognition system.

This paragraph illustrates the sequence of Power On Detecting Software 20621b1 stored in Start Up Software Storage Area 2062b. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621b2 of which the sequence is explained hereinafter.

This paragraph illustrates the sequence of Start Up Data Storage Area Scanning Software 20621b2 stored in Start Up Software Storage Area 20621b. CPU 211 (FIG. 1) scans Start Up Software Index Storage Area 20621c1 (S1), and identifies the software programs which are automatically activated (S2). CPU 211 activates Start Up Software Activating Software 20621b3 thereafter of which the sequence is explained hereinafter (S3).

This paragraph illustrates the sequence of Start Up Software Activating Software 20621b3 stored in Start Up Software Storage Area 20621b. CPU 211 (FIG. 1) activates the software programs of which the software program indexes are identified in S2 described hereinbefore (S1).

This paragraph illustrates another embodiment wherein the three software programs stored in Start Up Software Storage Area 20621b (i.e., Power On Detecting Software 20621b1, Start Up Data Storage Area Scanning Software 20621b2, Start Up Software Activating Software 20621b3) is integrated into one software program stored therein. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621c1 (S3), and identifies the software programs which are automatically activated (S4). CPU 211 activates the software programs thereafter of which the software program indexes are identified in S4 (S5).

As another embodiment, the software programs per se (not the software program indexes described hereinbefore may be stored in a specific storage area which are activated by the present function.

As another embodiment, the present function may be implemented at the time the user of Communication Device 200 logs on instead of at the time the Communication Device 200 is powered as described in S2 described hereinbefore.

<<Stereo Audio Data Output Function>>

The following paragraphs illustrate the stereo audio data output function which enables Communication Device 200 to output audio data from Speakers 216L and 216R in a stereo fashion.

This paragraph illustrates the storage area included in Host Data Storage Area H00c of Host H. In this embodiment, Host Data Storage Area H00c includes Stereo Audio Information Storage Area H22a. Stereo Audio Information Storage Area H22a stores the software programs and data necessary to implement the present function as described in details hereinafter.

This paragraph illustrates the storage areas included in Stereo Audio Information Storage Area H22a. In this embodiment, Stereo Audio Information Storage Area H22a includes Stereo Audio Software Storage Area H22b and Stereo Audio Data Storage Area H22c. Stereo Audio Software Storage Area H22b stores the software programs necessary to implement the present function, such as the one described hereinafter. Stereo Audio Data Storage Area H22c stores the data necessary to implement the present function, such as the ones described hereinafter.

This paragraph illustrates the stereo audio data stored in Stereo Audio Data Storage Area H22c. A plurality of stereo audio data are stored in Stereo Audio Data Storage Area H22c. In this embodiment, three stereo audio data, i.e., Stereo Audio Data H22c1, Stereo Audio Data H22c2, and Stereo Audio Data H22c3 are stored therein.

This paragraph illustrates the components of the stereo audio data stored in Stereo Audio Data Storage Area H22c. This paragraph describes the components of Stereo Audio Data H22c1 as an example. In this embodiment, Stereo Audio Data H22c1 includes Left Speaker Audio Data H22c1L, Right Speaker Audio Data H22c1R, and Stereo Audio Data Output Timing Data H22c1T. Left Speaker Audio Data H22c1L is an audio data which is designed to be output from Speaker 216L. Right Speaker Audio Data H22c1R is an audio data which is designed to be output from Speaker 216R. Stereo Audio Data Output Timing Data H22c1T is a timing data which is utilized to synchronize the output of both Left Speaker Audio Data H22c1L and Right Speaker Audio Data H22c1R from Speaker 216R and Speaker 216L respectively.

This paragraph illustrates the sequence of the software program stored in Stereo Audio Software Storage Area H22b. In this embodiment, the software program stored in Stereo Audio Software Storage Area H22b extracts one of the stereo audio data stored in Stereo Audio Data Storage Area H22c and creates Transferred Stereo Audio Data TSAD for purposes of transferring the extracted stereo audio data to Communication Device 200 (S1).

This paragraph illustrates the components of Transferred Stereo Audio Data TSAD created by the software program stored in Stereo Audio Software Storage Area H22b. In this embodiment, Transferred Stereo Audio Data TSAD is composed of Header TSAD1, Com Device ID TSAD2, Host ID TSAD3, Transferred Stereo Audio Data TSAD4, and Footer TSAD5. Com Device ID TSAD2 indicates the identification of Communication Device 200, Host ID TSAD3 indicates the identification of Host H, and Transferred Stereo Audio Data TSAD4 is the stereo audio data extracted in the manner described hereinbefore. Header TSAD1 and Footer TSAD5 indicate the beginning and the end of Transferred Stereo Audio Data TSAD.

This paragraph illustrates the storage area included in RAM 206 (FIG. 1) of Communication Device 200. In this embodiment, RAM 206 includes Stereo Audio Information Storage Area 20622a. Stereo Audio Information Storage Area 20622a stores the software programs and data necessary to implement the present function as described in details hereinafter.

This paragraph illustrates the storage areas included in Stereo Audio Information Storage Area 20622a. In this embodiment, Stereo Audio Information Storage Area 20622a includes Stereo Audio Software Storage Area 20622b and Stereo Audio Data Storage Area 20622c. Stereo Audio Software Storage Area 20622b stores the software programs necessary to implement the present function, such as the ones described hereinafter. Stereo Audio Data Storage Area 20622c stores the data necessary to implement the present function, such as the ones described hereinafter.

This paragraph illustrates the stereo audio data stored in Stereo Audio Data Storage Area 20622c. A plurality of stereo audio data are stored in Stereo Audio Data Storage Area 20622c. In this embodiment, three stereo audio data, i.e., Stereo Audio Data 20622c1, Stereo Audio Data 20622c2, and Stereo Audio Data 20622c3 are stored therein.

This paragraph illustrates the components of the stereo audio data stored in Stereo Audio Data Storage Area 20622c. This paragraph describes the components of Stereo Audio Data 20622c1 as an example. In this embodiment, Stereo Audio Data 20622c1 includes Left Speaker Audio Data 20622c1L, Right Speaker Audio Data 20622c1R, and Stereo Audio Data Output Timing Data 20622c1T. Left Speaker Audio Data 20622c1L is an audio data which is designed to be output from Speaker 216L. Right Speaker Audio Data 20622c1R is an audio data which is designed to be output from Speaker 216R. Stereo Audio Data Output Timing Data 20622c1T is a timing data which is utilized to synchronize the output of both Left Speaker Audio Data 20622c1L and Right Speaker Audio Data 20622c1R from Speaker 216R and Speaker 216L respectively.

The downloaded stereo audio data are stored in specific area(s) of Stereo Audio Data Storage Area 20622c.

This paragraph illustrates the sequence of selecting and preparing to output the stereo audio data from Speakers 216L and 216R in a stereo fashion. In this embodiment, a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622c1 is selected in S2, CPU 211 (FIG. 1) retrieves Left Speaker Audio Data 20622c1L (S3), Right Speaker Audio Data 20622c1R (S4), and Stereo Audio Data Output Timing Data 20622c1T from Stereo Audio Data Storage Area 20622c (S5).

This paragraph illustrates the sequence of outputting the stereo audio data from Speakers 216L and 216R in a stereo fashion. In this embodiment, the user of Communication Device 200 inputs a specific signal to output the stereo audio data by utilizing Input Device 210 (FIG. 1) or via voice recognition system (S1). Assuming Audio Data 20622c1 is selected in S2 described hereinbefore, CPU 211 outputs Left Speaker Audio Data 20622c1L and Right Speaker Audio Data 20622c1R from Speakers 216L and 216R respectively in a stereo fashion in accordance with Stereo Audio Data Output Timing Data 20622c1T (S2).

<<SOS Calling Function>>

The following paragraphs illustrate the SOS calling function which enables Communication Device 200 to notify the police department the current location of Communication Device 200 and the personal information of the user of Communication 200 when a 911 call is dialed from Communication Device 200.

This paragraph illustrates the storage area included in Host Information Storage Area H00a. Host Information Storage Area H00a includes SOS Calling Information Storage Area H29a of which the data stored therein are described hereinafter.

This paragraph illustrates the storage areas included in SOS Calling Information Storage Area H29a. SOS Calling Information Storage Area H29a includes SOS Calling Data Storage Area H29b and SOS Calling Software Storage Area H29c. SOS Calling Data Storage Area H29b stores the data necessary to implement the present function, such as the ones described hereinafter. SOS Calling Software Storage Area H29c stores the software programs necessary to implement the present function, such as the ones described hereinafter.

This paragraph illustrates the storage area included in SOS Calling Data Storage Area H29b. SOS Calling Data Storage Area H29b includes Police Department Location Data Storage Area H29b1 of which the data stored therein are described hereinafter.

This paragraph illustrates the data stored in Police Department Location Data Storage Area H29b1. Police Department Location Data Storage Area H29b1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the present example, H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

The data and/or the software programs necessary to implement the present function on the side of Communication Device 200 as described hereinafter may be downloaded from Host H.

This paragraph illustrates the storage area included in RAM 206 (FIG. 1) of Communication Device 200. RAM 206 includes SOS Calling Information Storage Area 20629a of which the details are described hereinafter.

This paragraph illustrates the storage areas included in SOS Calling Information Storage Area 20629a. SOS Calling Information Storage Area 20629a includes SOS Calling Data Storage Area 20629b and SOS Calling Software Storage Area 20629c. SOS Calling Data Storage Area 20629b includes data necessary to implement the present function, such as the ones described hereinafter. SOS Calling Software Storage Area 20629c stores the software programs necessary to implement the present function, such as the one described hereinafter.

This paragraph illustrates storage areas included in SOS Calling Data Storage Area 20629b. SOS Calling Data Storage Area 20629b includes GPS Data Storage Area 20629b1 and User Data Storage Area 20629b2. GPS Data Storage Area 20629b1 stores the data regarding the current geographical location produced by the method so-called GPS as described hereinbefore. User Data Storage Area 20629b2 stores the data regarding the personal information of the user of Communication Device 200 as described hereinafter.

This paragraph illustrates the data stored in User Data Storage Area 20629b2. User Data Storage Area 20629b2 includes User Data 20629UD which includes data regarding the personal information of the user of Communication Device 200. In the present example, User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200.

This paragraph illustrates the software program stored in SOS Calling Software Storage Area 20629c. When the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629b1 (S3). CPU 211 then retrieves User Data 20629UD from User Data Storage Area 20629b2 and the GPS data from GPS Data Storage Area 20629b1 (S4), and composes SOS Data 20629SOS therefrom (S5), which is sent thereafter to Host H (S6).

This paragraph illustrates the elements of SOS Data 20629SOS. SOS Data 20629SOS comprises Connection Request 20629CR, GPS Data 20629GD, and User Data 20629UD. Connection Request 20629CR represents a request to Host H to forward the 911 call to a police department. GPS Data 20629GD is a data retrieved from GPS Data Storage Area 20629b1 as described in S4 described hereinbefore. User Data 20629UD is a data retrieved from User Data Storage Area 20629b2 as described in S4 described hereinbefore.

This paragraph illustrates the software program stored in SOS Calling Software Storage Area H29c of Host H. Host H periodically checks the incoming call (S1). If the incoming call is SOS Data 20629SOS (S2), Host H initiates the SOS calling process as described hereinafter (S3).

This paragraph illustrates the software program stored in SOS Calling Software Storage Area H29c of Host H. Host H retrieves GPS Data 20629GD from SOS Data 20629SOS (S1), and selects the closest police department by comparing GPS Data 20629GD and the data stored in column Location Data of Police Department Location Data Storage Area H29b1 of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4).

As another embodiment, User Data 20629UD stored in User Data Storage Area 20629b2 may be stored in SOS Calling Data Storage Area H29b of Host H. In this embodiment, SOS Data 20629SOS primarily comprises Connection Request 20629CR and GPS Data 20629GD, and User Data 20629UD is retrieved from SOS Calling Data Storage Area H29b of Host H, which is sent to the police department in S4 described hereinbefore.

<<Audiovisual Playback Function>>

The following paragraphs illustrate the audiovisual playback function which enables Communication Device 200 to playback audiovisual data, such as movies, soap operas, situation comedies, news, and any type of TV programs.

This paragraph illustrates the information stored in RAM 206 (FIG. 1). RAM 206 includes Audiovisual Playback Information Storage Area 20632a of which the information stored therein are described hereinafter.

The data and/or the software programs necessary to implement the present function may be downloaded to Communication Device 200 from Host H.

This paragraph illustrates the data and software programs stored in Audiovisual Playback Information Storage Area 20632a. Audiovisual Playback Information Storage Area 20632a includes Audiovisual Playback Data Storage Area 20632b and Audiovisual Playback Software Storage Area 20632c. Audiovisual Playback Data Storage Area 20632b stores the data necessary to implement the present function, such as the ones described hereinafter. Audiovisual Playback Software Storage Area 20632c stores the software programs necessary to implement the present function, such as the ones described hereinafter.

This paragraph illustrates the data stored in Audiovisual Playback Data Storage Area 20632b. Audiovisual Playback Data Storage Area 20632b includes Audiovisual Data Storage Area 20632b1 and Message Data Storage Area 20632b2. Audiovisual Data Storage Area 20632b1 stores a plurality of audiovisual data described hereinafter. Message Data Storage Area 20632b2 stores a plurality of message data described hereinafter.

This paragraph illustrates the audiovisual data stored in Audiovisual Data Storage Area 20632b1. Audiovisual Data Storage Area 20632b1 stores a plurality of audiovisual data wherein the audiovisual data stored therein in the present example are: Audiovisual Data 20632b1a, Audiovisual Data 20632b1b, Audiovisual Data 20632b1c, and Audiovisual Data 20632b1d, all of which are primarily composed of video data and audio data. Audiovisual Data 20632b1a is a movie, Audiovisual Data 20632b1b is a soap opera, Audiovisual Data 20632b1c is a situation comedy, Audiovisual Data 20632b1d is TV news in the present embodiment. As another embodiment, Audiovisual Data 20632b1d may be an audiovisual data taken via CCD Unit 214 (FIG. 1) and Microphone 215 (FIG. 1).

This paragraph illustrates the data stored in Message Data Storage Area 20632b2. Message Data Storage Area 20632b2 includes Start Message Text Data 20632b2a, Stop Message Text Data 20632b2b, Pause Message Text Data 20632b2c, Resume Message Text Data 20632b2c1, Slow Replay Message Text Data 20632b2d, Forward Message Text Data 20632b2e, Rewind Message Text Data 20632b2f, Next Message Text Data 20632b2g, and Previous Message Text Data 20632b2h. Start Message Text Data 20632b2a is a text data which is displayed on LCD 201 (FIG. 1) and which indicates that the playback of an audiovisual data is initiated. Stop Message Text Data 20632b2b is a text data which is displayed on LCD 201 and which indicates that the playback process of an audiovisual data is stopped. Pause Message Text Data 20632b2c is a text data which is displayed on LCD 201 and which indicates that the playback process of an audiovisual data is paused. Resume Message Text Data 20632b2c1 is a text data which is displayed on LCD 201 and which indicates that the playback process of an audiovisual data is resumed from the point it is paused. Slow Replay Message Text Data 20632b2d is a text data which is displayed on LCD 201 and which indicates that the playback process of an audiovisual data is implemented in a slow motion. Fast-Forward Message Text Data 20632b2e is a text data which is displayed on LCD 201 and which indicates that an audiovisual data is fast-forwarded. Fast-Rewind Message Text Data 20632b2f is a text data which is displayed on LCD 201 and which indicates that an audiovisual data is fast-rewinded. Next Message Text Data 20632b2g is a text data which is displayed on LCD 201 and which indicates that the playback process of the next audiovisual data stored in Audiovisual Data Storage Area 20632b1 is initiated. Previous Message Text Data 20632b2h is a text data which is displayed on LCD 201 and which indicates that the playback process of the previous audiovisual data stored in Audiovisual Data Storage Area 20632b1 is initiated.

This paragraph illustrates the software programs stored in Audiovisual Playback Software Storage Area 20632c. Audiovisual Playback Software Storage Area 20632c includes Audiovisual Start Software 20632c1, Audiovisual Stop Software 20632c2, Audiovisual Pause Software 20632c3, Audiovisual Resume Software 20632c3a, Audiovisual Slow Replay Software 20632c4, Audiovisual Fast-Forward Software 20632c5, Audiovisual Fast-Rewind Software 20632c6, Audiovisual Next Software 20632c7, and Audiovisual Previous Software 20632c8. Audiovisual Start Software 20632c1 is a software program which initiates the playback process of an audiovisual data. Audiovisual Stop Software 20632c2 is a software program which stops the playback process of an audiovisual data. Audiovisual Pause Software 20632c3 is a software program which pauses the playback process of an audiovisual data. Audiovisual Resume Software 20632c3a is a software program which resumes the playback process of the audiovisual data from the point it is paused by Audiovisual Pause Software 20632c3. Audiovisual Slow Replay Software 20632c4 is a software program which implements the playback process of an audiovisual data in a slow motion. Audiovisual Fast-Forward Software 20632c5 is a software program which fast-forwards an audiovisual data. Audiovisual Fast-Rewind Software 20632c6 is a software program which fast-rewinds an audiovisual data. Audiovisual Next Software 20632c7 is a software program which initiates the playback process of the next audiovisual data stored in Audiovisual Data Storage Area 20632b1. Audiovisual Previous Software 20632c8 is a software program which initiates the playback process of the previous audiovisual data stored in Audiovisual Data Storage Area 20632b1.

This paragraph illustrates the messages displayed on LCD 201 (FIG. 1). Eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20632b2a, 'Stop' is Stop Message Text Data 20632b2b, 'Pause' is Pause Message Text Data 20632b2c, 'Resume' is Resume Message Text Data 20632b2c1, 'Slow Reply' is Slow Replay Message Text Data 20632b2d, 'Fast-Forward' is Fast-Forward Message Text Data 20632b2e, 'Fast-Rewind' is Fast-Rewind Message Text Data 20632b2f, 'Next' is Next Message Text Data 20632b2g, 'Previous' is Previous Message Text Data 20632b2h described hereinbefore.

This paragraph illustrates Audiovisual Selecting Software 20632c9 stored in Audiovisual Playback Software Storage Area 20632c in preparation of executing the software programs described hereinafter. CPU 211 (FIG. 1) retrieves the identifications of the audiovisual data stored in Audiovisual Data Storage Area 20632b1 (S1). CPU 211 then displays a list of the identifications on LCD 201 (FIG. 1) (S2). A particular audiovisual data is selected by utilizing Input Device 210 (FIG. 1) or via voice recognition system (S3).

The following paragraphs illustrate the software programs stored in Audiovisual Playback Software Storage Area 20632c. Nine types of input signals can be input by utilizing Input Device 210 (FIG. 1) or via voice recognition system, i.e., the audiovisual playback signal, the audiovisual stop signal, the audiovisual pause signal, the audiovisual resume signal, the audiovisual slow replay signal, the audiovisual fast-forward signal, the audiovisual fast-rewind signal, the audiovisual next signal, and the audiovisual previous signal. The audiovisual playback signal indicates to initiate the playback process of the audiovisual data selected in S3 described hereinbefore. The audiovisual stop signal indicates to stop the playback process of the audiovisual data selected in S3 described hereinbefore. The audiovisual pause signal indicates to pause the playback process of the audiovisual data selected in S3 described hereinbefore. The audiovisual resume signal indicates to resume the playback process of the audiovisual data selected in S3 described hereinbefore from the point the audio data is paused. The audiovisual slow replay signal indicates to implement the playback process of the audiovisual data selected in S3 described hereinbefore in a slow motion. The audiovisual fast-forward signal indicates to fast-forward the audiovisual data selected in S3 described hereinbefore. The audiovisual fast-rewind signal indicates to fast-rewind the audiovisual data selected in S3 described hereinbefore. The audiovisual next signal indicates to initiate the playback process of the next audiovisual data of the audiovisual data selected in S3 described hereinbefore both of which are stored in Audiovisual Data Storage Area 20632b1. The audiovisual previous signal indicates to initiate the playback process of the previous audiovisual data of the audiovisual data selected in S3 described hereinbefore both of which are stored in Audiovisual Data Storage Area 20632b1.

This paragraph illustrates Audiovisual Start Software 20632c1 stored in Audiovisual Playback Software Storage Area 20632c which initiates the playback process of the audiovisual data selected in S3 described hereinbefore. The audiovisual playback signal is input by utilizing Input Device 210 (FIG. 1) or via voice recognition system (S1). CPU 211 (FIG. 1) then initiates the playback process (i.e., outputs the audio data from Speaker 216 (FIG. 1) and display the video data on LCD 201 (FIG. 1)) of the audiovisual data selected in S3 described hereinbefore (S2), and retrieves Start Message Text Data 20632b2a from Message Data Storage Area 20632b2 and displays the data on LCD 201 (FIG. 1) for a specified period of time (S3).

This paragraph illustrates Audiovisual Stop Software 20632c2 stored in Audiovisual Playback Software Storage Area 20632c which stops the playback process of the audiovisual data selected in S3 described hereinbefore. The audiovisual stop signal is input by utilizing Input Device 210 (FIG. 1) or via voice recognition system (S1). CPU 211 (FIG. 1) then stops the playback process of the audiovisual data selected in S3 described hereinbefore (S2), and retrieves Stop Message Text Data 20632b2b from Message Data Storage Area 20632b2 and displays the data on LCD 201 (FIG. 1) for a specified period of time (S3).

This paragraph illustrates Audiovisual Pause Software 20632c3 stored in Audiovisual Playback Software Storage Area 20632c which pauses the playback process of the audiovisual data selected in S3 described hereinbefore. The audiovisual pause signal is input by utilizing Input Device 210 (FIG. 1) or via voice recognition system (S1). CPU 211 (FIG. 1) then pauses the playback process of the audiovisual data selected in S3 described hereinbefore (S2), and retrieves Pause Message Text Data 20632b2c from Message Data Storage Area 20632b2 and displays the data on LCD 201 (FIG. 1) for a specified period of time (S3) When the playback process is paused in S2, the audio data included in the audiovisual data is refrained from being output from Speaker 216 (FIG. 1) and a still image composing the video data included in the audiovisual data is displayed on LCD 201 (FIG. 1).

This paragraph illustrates Audiovisual Resume Software 20632c3a stored in Audiovisual Playback Software Storage Area 20632c which resumes the playback process of the audiovisual data selected in S3 described hereinbefore from the point the audiovisual data is paused in S2 described hereinbefore. The audiovisual resume signal is input by utilizing Input Device 210 (FIG. 1) or via voice recognition system (S1). CPU 211 (FIG. 1) then resumes the playback process of the audiovisual data selected in S3 described hereinbefore (S2) from the point it is paused in S2 described hereinbefore, and retrieves Resume Message Text Data 20632b2c1 from Message Data Storage Area 20632b2 and displays the data on LCD 201 (FIG. 1) for a specified period of time (S3) When the playback process is resumed in S2, the audio data included in the audiovisual data is resumed to be output from Speaker 216 (FIG. 1) and the video data included in the audiovisual data is resumed to be displayed on LCD 201 (FIG. 1).

This paragraph illustrates Audiovisual Slow Replay Software 20632c4 stored in Audiovisual Playback Software Storage Area 20632c which implements the playback process of the audiovisual data selected in S3 described hereinbefore in a slow motion. The audiovisual slow replay signal is input by utilizing Input Device 210 (FIG. 1) or via voice recognition system (S1). CPU 211 (FIG. 1) then initiates the playback process of the audiovisual data selected in S3 described hereinbefore in a slow motion (S2), and retrieves Slow Replay Message Text Data 20632b2d from Message Data Storage Area 20632b2 and displays the data on LCD 201 (FIG. 1) for a specified period of time (S3).

This paragraph illustrates Audiovisual Fast-Forward Software 20632c5 stored in Audiovisual Playback Software Storage Area 20632c which fast-forwards the audiovisual data selected in S3 described hereinbefore. The audiovisual fast-forward signal is input by utilizing Input Device 210 (FIG. 1) or via voice recognition system (S1). CPU 211 (FIG. 1) then fast-forwards the audiovisual data selected in S3 described hereinbefore (S2), and retrieves Fast-Forward Message Text Data 20632b2e from Message Data Storage Area 20632b2 and displays the data on LCD 201 (FIG. 1) for a specified period of time (S3).

This paragraph illustrates Audiovisual Fast-Rewind Software 20632c6 stored in Audiovisual Playback Software Storage Area 20632c which fast-rewinds the audiovisual data selected in S3 described hereinbefore. The audiovisual fast-rewind signal is input by utilizing Input Device 210 (FIG. 1) or via voice recognition system (S1). CPU 211 (FIG. 1) then fast-rewinds the audiovisual data selected in S3 described hereinbefore (S2), and retrieves Fast-Rewind Message Text Data 20632b2f from Message Data Storage Area 20632b2 and displays the data on LCD 201 (FIG. 1) for a specified period of time (S3).

This paragraph illustrates Audiovisual Next Software 20632c7 stored in Audiovisual Playback Software Storage Area 20632c which initiates the playback process of the next audiovisual data stored in Audiovisual Data Storage Area 20632b1. The audiovisual next signal is input by utilizing Input Device 210 (FIG. 1) or via voice recognition system (S1). CPU 211 (FIG. 1) then initiates the playback process of the next audiovisual data of the audiovisual data selected in S3 described hereinbefore both of which are stored in Audiovisual Data Storage Area 20632b1 (S2), and retrieves Next Message Text Data 20632b2g from Message Data Storage Area 20632b2 and displays the data on LCD 201 (FIG. 1) for a specified period of time (S3).

This paragraph illustrates Audiovisual Previous Software 20632c8 is a software program which initiates the playback process of the previous audiovisual data stored in Audiovisual Data Storage Area 20632b1. The audiovisual previous signal is input by utilizing Input Device 210 (FIG. 1) or via voice recognition system (S1). CPU 211 (FIG. 1) then initiates the playback process of the previous audiovisual data of the audiovisual data selected in S3 described hereinbefore both of which are stored in Audiovisual Data Storage Area 20632b1 (S2), and retrieves Previous Message Text Data 20632b2h from Message Data Storage Area 20632b2 and displays the data on LCD 201 (FIG. 1) for a specified period of time (S3).

As another embodiment, the audiovisual data stored in Audiovisual Data Storage Area 20632b1 may be stored in Host H and retrieved therefrom when the software programs described hereinbefore are executed. In this embodiment, the audio data is temporarily stored in RAM 206 (FIG. 1) and is erased from the portion which is playbacked.

<<Audio Playback Function>>

The following paragraphs illustrate the audio playback function which enables Communication Device 200 to playback audio data, such as jazz music, rock music, classic music, pops music, and any other types of audio data.

This paragraph illustrates the information stored in RAM 206 (FIG. 1). In this embodiment, RAM 206 includes Audio Playback Information Storage Area 20633a of which the information stored therein are described hereinafter.

The data and/or the software programs necessary to implement the present function may be downloaded to Communication Device 200 from Host H.

This paragraph illustrates the data and software programs stored in Audio Playback Information Storage Area 20633a. In this embodiment, Audio Playback Information Storage Area 20633a includes Audio Playback Data Storage Area 20633b and Audio Playback Software Storage Area 20633c. Audio Playback Data Storage Area 20633b stores the data necessary to implement the present function, such as the ones described hereinafter. Audio Playback Software Storage Area 20633*c* stores the software programs necessary to implement the present function, such as the ones described hereinafter.

This paragraph illustrates the data stored in Audio Playback Data Storage Area 20633*b*. In this embodiment, Audio Playback Data Storage Area 20633*b* includes Audio Data Storage Area 20633*b*1 and Message Data Storage Area 20633*b*2. Audio Data Storage Area 20633*b*1 stores a plurality of audio data described hereinafter. Message Data Storage Area 20633*b*2 stores a plurality of message data described hereinafter.

This paragraph illustrates the audio data stored in Audio Data Storage Area 20633*b*1. In this embodiment, Audio Data Storage Area 20633*b*1 stores a plurality of audio data wherein the audio data stored therein in the present example are: Audio Data 20633*b*1*a*, Audio Data 20633*b*1*b*, Audio Data 20633*b*1*c*, and Audio Data 20633*b*1*d*, all of which are primarily composed of video data and audio data. Audio Data 20633*b*1*a* is a jazz music, Audio Data 20633*b*1*b* is a rock music, Audio Data 20633*b*1*c* is a classic music, Audio Data 20633*b*1*d* is a pops music in the present embodiment. As another embodiment, Audio Data 20633*b*1*d* may be an audio data taken via CCD Unit 214 (FIG. 1) and Microphone 215 (FIG. 1).

This paragraph illustrates the data stored in Message Data Storage Area 20633*b*2. In this embodiment, Message Data Storage Area 20633*b*2 includes Start Message Text Data 20633*b*2*a*, Stop Message Text Data 20633*b*2*b*, Pause Message Text Data 20633*b*2*c*, Resume Message Text Data 20633*b*2*c*1, Slow Replay Message Text Data 20633*b*2*d*, Forward Message Text Data 20633*b*2*e*, Rewind Message Text Data 20633*b*2*f*, Next Message Text Data 20633*b*2*g*, and Previous Message Text Data 20633*b*2*h*. Start Message Text Data 20633*b*2*a* is a text data which is displayed on LCD 201 (FIG. 1) and which indicates that the playback of an audio data is initiated. Stop Message Text Data 20633*b*2*b* is a text data which is displayed on LCD 201 and which indicates that the playback process of an audio data is stopped. Pause Message Text Data 20633*b*2*c* is a text data which is displayed on LCD 201 and which indicates that the playback process of an audio data is paused. Resume Message Text Data 20633*b*2*c*1 is a text data which is displayed on LCD 201 and which indicates that the playback process of an audio data is resumed from the point it is paused. Slow Replay Message Text Data 20633*b*2*d* is a text data which is displayed on LCD 201 and which indicates that the playback process of an audio data is implemented in a slow motion. Fast-Forward Message Text Data 20633*b*2*e* is a text data which is displayed on LCD 201 and which indicates that an audio data is fast-forwarded. Fast-Rewind Message Text Data 20633*b*2*f* is a text data which is displayed on LCD 201 and which indicates that an audio data is fast-rewinded. Next Message Text Data 20633*b*2*g* is a text data which is displayed on LCD 201 and which indicates that the playback process of the next audio data stored in Audio Data Storage Area 20633*b*1 is initiated. Previous Message Text Data 20633*b*2*h* is a text data which is displayed on LCD 201 and which indicates that the playback process of the previous audio data stored in Audio Data Storage Area 20633*b*1 is initiated.

This paragraph illustrates the software programs stored in Audio Playback Software Storage Area 20633*c*. In this embodiment, Audio Playback Software Storage Area 20633*c* includes Audio Start Software 20633*c*1, Audio Stop Software 20633*c*2, Audio Pause Software 20633*c*3, Audio Resume Software 20633*c*3*a*, Audio Slow Replay Software 20633*c*4, Audio Fast-Forward Software 20633*c*5, Audio Fast-Rewind Software 20633*c*6, Audio Next Software 20633*c*7, and Audio Previous Software 20633*c*8. Audio Start Software 20633*c*1 is a software program which initiates the playback process of an audio data. Audio Stop Software 20633*c*2 is a software program which stops the playback process of an audio data. Audio Pause Software 20633*c*3 is a software program which pauses the playback process of an audio data. Audio Resume Software 20633*c*3*a* is a software program which resumes the playback process of the audio data from the point it is paused by Audio Pause Software 20633*c*3. Audio Slow Replay Software 20633*c*4 is a software program which implements the playback process of an audio data in a slow motion. Audio Fast-Forward Software 20633*c*5 is a software program which fast-forwards an audio data. Audio Fast-Rewind Software 20633*c*6 is a software program which fast-rewinds an audio data. Audio Next Software 20633*c*7 is a software program which initiates the playback process of the next audio data stored in Audio Data Storage Area 20633*b*1. Audio Previous Software 20633*c*8 is a software program which initiates the playback process of the previous audio data stored in Audio Data Storage Area 20633*b*1.

This paragraph illustrates the messages displayed on LCD 201 (FIG. 1). In this embodiment, eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20633*b*2*a*, 'Stop' is Stop Message Text Data 20633*b*2*b*, 'Pause' is Pause Message Text Data 20633*b*2*c*, 'Resume' is Resume Message Text Data 20633*b*2*c*1, 'Slow Reply' is Slow Replay Message Text Data 20633*b*2*d*, 'Fast-Forward' is Fast-Forward Message Text Data 20633*b*2*e*, 'Fast-Rewind' is Fast-Rewind Message Text Data 20633*b*2*f*, 'Next' is Next Message Text Data 20633*b*2*g*, 'Previous' is Previous Message Text Data 20633*b*2*h* described hereinbefore.

This paragraph illustrates Audio Selecting Software 20633*c*9 stored in Audio Playback Software Storage Area 20633*c* in preparation of executing the software programs described hereinafter. In this embodiment, CPU 211 (FIG. 1) retrieves the identifications of the audio data stored in Audio Data Storage Area 20633*b*1 (S1). CPU 211 then displays a list of the identifications on LCD 201 (FIG. 1) (S2). A particular audio data is selected by utilizing Input Device 210 (FIG. 1) or via voice recognition system (S3).

This paragraph and the following paragraphs illustrate the software programs stored in Audio Playback Software Storage Area 20633*c*. As described in each drawing FIGURE hereinafter, eight types of input signals can be input by utilizing Input Device 210 (FIG. 1) or via voice recognition system, i.e., the audio playback signal, the audio stop signal, the audio pause signal, the audio resume signal, the audio slow replay signal, the audio fast-forward signal, the audio fast-rewind signal, the audio next signal, and the audio previous signal. The audio playback signal indicates to initiate the playback process of the audio data selected in S3 described hereinbefore. The audio stop signal indicates to stop the playback process of the audio data selected in S3 described hereinbefore. The audio pause signal indicates to pause the playback process of the audio data selected in S3 described hereinbefore. The audio resume signal indicates to resume the playback process of the audio data selected in S3 described hereinbefore from the point the audio data is paused. The audio slow replay signal indicates to implement the playback process of the audio data selected in S3 described hereinbefore in a slow motion. The audio fast-forward signal indicates to fast-forward the audio data selected in S3 described hereinbefore. The audio fast-rewind signal indicates to fast-rewind the audio data selected in S3 described hereinbefore. The audio next signal indicates to initiate the playback process of the next audio data of the audio data selected in S3 described hereinbefore both of which are stored in Audio Data Storage Area 20633*b*1. The audio previous signal indicates to initiate the playback process of the previous audio data of the audio data selected in S3 described hereinbefore both of which are stored in Audio Data Storage Area 20633*b*1.

This paragraph illustrates Audio Start Software 20633*c*1 stored in Audio Playback Software Storage Area 20633*c* which initiates the playback process of the audio data selected in S3 described hereinbefore. In this embodiment, the audio playback signal is input by utilizing Input Device 210 (FIG. 1) or via voice recognition system (S1). CPU 211 (FIG. 1) then initiates the playback process (i.e., outputs the audio data from Speaker 216 (FIG. 1)) of the audio data selected in S3 described hereinbefore (S2), and retrieves Start Message Text Data 20633*b*2*a* from Message Data Storage Area 20633*b*2 and displays the data on LCD 201 (FIG. 1) for a specified period of time (S3).

This paragraph illustrates Audio Stop Software 20633*c*2 stored in Audio Playback Software Storage Area 20633*c* which stops the playback process of the audio data selected in S3 described hereinbefore. In this embodiment, the audio stop signal is input by utilizing Input Device 210 (FIG. 1) or via voice recognition system (S1). CPU 211 (FIG. 1) then stops the playback process of the audio data selected in S3 described hereinbefore (S2), and retrieves Stop Message Text Data 20633*b*2*b* from Message Data Storage Area 20633*b*2 and displays the data on LCD 201 (FIG. 1) for a specified period of time (S3).

This paragraph illustrates Audio Pause Software 20633*c*3 stored in Audio Playback Software Storage Area 20633*c* which pauses the playback process of the audio data selected in S3 described hereinbefore. In this embodiment, the audio pause signal is input by utilizing Input Device 210 (FIG. 1) or via voice recognition system (S1). CPU 211 (FIG. 1) then pauses the playback process of the audio data selected in S3 described hereinbefore (S2), and retrieves Pause Message Text Data 20633*b*2*c* from Message Data Storage Area 20633*b*2 and displays the data on LCD 201 (FIG. 1) for a specified period of time (S3) When the playback process is paused in S2, the audio data included in the audio data is refrained from being output from Speaker 216 (FIG. 1).

This paragraph illustrates Audio Resume Software 20633*c*3*a* stored in Audio Playback Software Storage Area 20633*c* which resumes the playback process of the audio data selected in S3 described hereinbefore from the point the audiovisual data is paused in S2 described hereinbefore. In this embodiment, the audio resume signal is input by utilizing Input Device 210 (FIG. 1) or via voice recognition system (S1). CPU 211 (FIG. 1) then resumes the playback process of the audio data selected in S3 described hereinbefore from the point the audiovisual data is paused in S2 described hereinbefore (S2), and retrieves Resume Message Text Data 20633*b*2*c*1 from Message Data Storage Area 20633*b*2 and displays the data on LCD 201 (FIG. 1) for a specified period of time (S3).

This paragraph illustrates Audio Slow Replay Software 20633*c*4 stored in Audio Playback Software Storage Area 20633*c* which implements the playback process of the audio data selected in S3 described hereinbefore in a slow motion. In this embodiment, the audio slow replay signal is input by utilizing Input Device 210 (FIG. 1) or via voice recognition system (S1). CPU 211 (FIG. 1) then initiates the playback process of the audio data selected in S3 described hereinbefore in a slow motion (S2), and retrieves Slow Replay Message Text Data 20633*b*2*d* from Message Data Storage Area 20633*b*2 and displays the data on LCD 201 (FIG. 1) for a specified period of time (S3).

This paragraph illustrates Audio Fast-Forward Software 20633*c*5 stored in Audio Playback Software Storage Area 20633*c* which fast-forwards the audio data selected in S3 described hereinbefore. In this embodiment, the audio fast-forward signal is input by utilizing Input Device 210 (FIG. 1) or via voice recognition system (S1). CPU 211 (FIG. 1) then fast-forwards the audio data selected in S3 described hereinbefore (S2), and retrieves Fast-Forward Message Text Data 20633*b*2*e* from Message Data Storage Area 20633*b*2 and displays the data on LCD 201 (FIG. 1) for a specified period of time (S3).

This paragraph illustrates Audio Fast-Rewind Software 20633*c*6 stored in Audio Playback Software Storage Area 20633*c* which fast-rewinds the audio data selected in S3 described hereinbefore. In this embodiment, the audio fast-rewind signal is input by utilizing Input Device 210 (FIG. 1) or via voice recognition system (S1). CPU 211 (FIG. 1) then fast-rewinds the audio data selected in S3 described hereinbefore (S2), and retrieves Fast-Rewind Message Text Data 20633*b*2*f* from Message Data Storage Area 20633*b*2 and displays the data on LCD 201 (FIG. 1) for a specified period of time (S3).

This paragraph illustrates Audio Next Software 20633*c*7 stored in Audio Playback Software Storage Area 20633*c* which initiates the playback process of the next audio data stored in Audio Data Storage Area 20633*b*1. In this embodiment, the audio next signal is input by utilizing Input Device 210 (FIG. 1) or via voice recognition system (S1). CPU 211 (FIG. 1) then initiates the playback process of the next audio data of the audio data selected in S3 described hereinbefore both of which are stored in Audio Data Storage Area 20633*b*1 (S2), and retrieves Next Message Text Data 20633*b*2*g* from Message Data Storage Area 20633*b*2 and displays the data on LCD 201 (FIG. 1) for a specified period of time (S3).

This paragraph illustrates Audio Previous Software 20633*c*8 is a software program which initiates the playback process of the previous audio data stored in Audio Data Storage Area 20633*b*1. In this embodiment, the audio previous signal is input by utilizing Input Device 210 (FIG. 1) or via voice recognition system (S1). CPU 211 (FIG. 1) then initiates the playback process of the previous audio data of the audio data selected in S3 described hereinbefore both of which are stored in Audio Data Storage Area 20633*b*1 (S2), and retrieves Previous Message Text Data 20633*b*2*h* from Message Data Storage Area 20633*b*2 and displays the data on LCD 201 (FIG. 1) for a specified period of time (S3).

As another embodiment, the audio data stored in Audio Data Storage Area 20633*b*1 may be stored in Host H and retrieved therefrom when the software programs described hereinbefore are executed. In this embodiment, the audio data is temporarily stored in RAM 206 (FIG. 1) and is erased from the portion which is playbacked.

<<Digital Camera Function>>

The following paragraphs illustrate the digital camera function which enables Communication Device 200 to take digital photos by utilizing CCD Unit 214 (FIG. 1).

This paragraph illustrates the storage area included in RAM 206 (FIG. 1). In this embodiment, RAM 206 includes Digital Camera Information Storage Area 20646*a* of which the data and the software programs stored therein are described hereinafter.

The data and software programs stored in Digital Camera Information Storage Area 20646*a* may be downloaded from Host H.

This paragraph illustrates the storage areas included in Digital Camera Information Storage Area 20646a. In this embodiment, Digital Camera Information Storage Area 20646a includes Digital Camera Data Storage Area 20646b and Digital Camera Software Storage Area 20646c. Digital Camera Data Storage Area 20646b stores the data necessary to implement the present function, such as the ones described hereinafter. Digital Camera Software Storage Area 20646c stores the software programs necessary to implement the present function, such as the ones described hereinafter.

This paragraph illustrates the storage areas included in Digital Camera Data Storage Area 20646b. In this embodiment, Digital Camera Data Storage Area 20646b includes Photo Data Storage Area 20646b1 and Digital Camera Function Data Storage Area 20646b2. Photo Data Storage Area 20646b1 stores the data described hereinafter. Digital Camera Function Data Storage Area 20646b2 stores the data stored hereinafter.

This paragraph illustrates the data stored in Photo Data Storage Area 20646b1. In this embodiment, Photo Data Storage Area 20646b1 comprises two columns, i.e., 'Photo ID' and 'Photo Data'. Column 'Photo ID' stores the identifications of the photo data, and column 'Photo Data' stores a plurality of photo data taken by implementing the present function. In the example described in the present drawing, Photo Data Storage Area 20646b1 stores the following data: 'Photo ID' Photo #1 of which the 'Photo Data' is 46PD1; 'Photo ID' Photo #2 of which the 'Photo Data' is 46PD2; 'Photo ID' Photo #3 of which the 'Photo Data' is 46PD3; 'Photo ID' Photo #4 of which the 'Photo Data' is 46PD4; and 'Photo ID' Photo #5 of which the 'Photo Data' is 46PD5.

This paragraph illustrates the storage areas included in Digital Camera Function Data Storage Area 20646b2. In this embodiment, Digital Camera Function Data Storage Area 20646b2 includes Quality Data Storage Area 20646b2a, Multiple Photo Shooting Number Data Storage Area 20646b2b, and Strobe Data Storage Area 20646b2c. Quality Data Storage Area 20646b2a stores the data selected in S2 described hereinafter. Multiple Photo Shooting Number Data Storage Area 20646b2b stores the data selected in S2 described hereinafter. Strobe Data Storage Area 20646b2c stores the data selected in S2 described hereinafter.

This paragraph illustrates the software programs stored in Digital Camera Software Storage Area 20646c. In this embodiment, Digital Camera Software Storage Area 20646c stores Quality Selecting Software 20646c1, Multiple Photo Shooting Software 20646c2, Trimming Software 20646c3, Digital Zooming Software 20646c4, Strobe Software 20646c5, Digital Camera Function Selecting Software 20646c6, Multiple Photo Shooting Number Selecting Software 20646c7, Strobe On/Off Selecting Software 20646c8, Photo Data Shooting Software 20646c9, and Multiple Photo Shooting Software 20646c10. Quality Selecting Software 20646c1 is the software program described hereinafter. Multiple Photo Shooting Software 20646c2 is the software program described hereinafter. Trimming Software 20646c3 is the software program described hereinafter. Digital Zooming Software 20646c4 is the software program described hereinafter. Strobe Software 20646c5 is the software program described hereinafter. Digital Camera Function Selecting Software 20646c6 is the software program described hereinafter. Multiple Photo Shooting Number Selecting Software 20646c7 is the software program described hereinafter. Strobe On/Off Selecting Software 20646c8 is the software program described hereinafter. Photo Data Shooting Software 20646c9 is the software program described hereinafter.

This paragraph illustrates Digital Camera Function Selecting Software 20646c6 stored in Digital Camera Software Storage Area 20646c which administers the overall flow of displaying the functions and selecting the option for each function. In this embodiment, a list of functions is displayed on LCD 201 (FIG. 1) (S1). The items displayed on LCD 201 are 'Quality', 'Multiple Photo', and 'Strobe'. A function is selected by utilizing Input Device 210 (FIG. 1) or via voice recognition system (S2), and the relevant software program is activated thereafter (S3). In the present embodiment, Quality Selecting Software 20646c1 described hereinafter is activated when 'Quality' displayed on LCD 201 is selected in S2. Multiple Photo Shooting Number Selecting Software 20646c7 described hereinafter is activated when 'Multiple Photo' is selected in S2. Strobe On/Off Selecting Software 20646c8 described hereinafter is activated when 'Strobe' is selected in S2.

This paragraph illustrates Quality Selecting Software 20646c1 stored in Digital Camera Software Storage Area 20646c which selects the quality of the photo data taken by implementing the present function. In this embodiment, a list of options is displayed on LCD 201 (FIG. 1) (S1). The options displayed on LCD 201 are 'High', 'STD', and 'Low' in the present embodiment. One of the options is selected by utilizing Input Device 210 (FIG. 1) or via voice recognition system (S2). The resolution of the photo data taken is high if 'High' is selected; the resolution of the photo taken is standard if 'STD' is selected; and the resolution of the photo taken is low if 'Low' is selected. The selected option is stored as the quality data in Quality Data Storage Area 20646b2a (S3).

This paragraph illustrates Multiple Photo Shooting Number Selecting Software 20646c7 stored in Digital Camera Software Storage Area 20646c which selects the number of photos taken by a single photo shooting signal. In this embodiment, a list of options is displayed on LCD 201 (FIG. 1) (S1). The options displayed on LCD 201 are figures from '1' through '10'. Only one photo is taken by a photo shooting signal if '1' is selected; two photos are taken by a photo shooting signal if '2' is selected; three photos are taken by a photo shooting signal if '3' is selected; four photos are taken by a photo shooting signal if '4' is selected; five photos are taken by a photo shooting signal if '5' is selected; six photos are taken by a photo shooting signal if '6' is selected; seven photos are taken by a photo shooting signal if '7' is selected; eight photos are taken by a photo shooting signal if '8' is selected; nine photos are taken by a photo shooting signal if '9' is selected; and ten photos are taken by a photo shooting signal if '10' is selected. A digit from '1' through '10' is selected by utilizing Input Device 210 (FIG. 1) or via voice recognition system (S2). The selected digital is stored as the multiple photo shooting number data in Multiple Photo Shooting Number Data Storage Area 20646b2b (S3).

This paragraph illustrates Strobe On/Off Selecting Software 20646c8 stored in Digital Camera Software Storage Area 20646c which selects Flash Light Unit 220 (not shown) to be activated or not when a photo is taken. In this embodiment, a list of options is displayed on LCD 201 (FIG. 1) (S1). The options displayed on LCD 201 are 'On' and 'Off'. Flash Light Unit 220 is activated at the time photo is taken if 'On' is selected; and Flash Light Unit 220 is not activated at the time photo is taken if 'Off' is selected. One of the two options is selected by utilizing Input Device 210 (FIG. 1) or via voice recognition system (S2). The selected option is stored as the strobe data in Strobe Data Storage Area 20646b2c (S3).

This paragraph illustrates Photo Data Shooting Software 20646c9 stored in Digital Camera Software Storage Area 20646c which takes photo(s) in accordance with the options selected hereinbefore. In this embodiment, a photo shooting signal is input by utilizing Input Device 210 (FIG. 1) or via voice recognition system (S1). Here, the photo shooting signal indicates CPU 211 (FIG. 1) to input photo data to CCD Unit 214 (FIG. 1) and store the data in Photo Data Storage Area 20646b1. CPU 211 then retrieves the quality data from Quality Data Storage Area 20646b2a (S2). The photo data is input via CCD Unit 214 (S3), and the data is stored in Photo Data Storage Area 20646b1 with new photo ID in accordance with the quality data retrieved in S2 (S4).

This paragraph illustrates Multiple Photo Shooting Software 20646c2 stored in Digital Camera Software Storage Area 20646c which takes photo(s) in accordance with the options selected hereinbefore. In this embodiment, a photo shooting signal is input by utilizing Input Device 210 (FIG. 1) or via voice recognition system (S1). CPU 211 (FIG. 1) retrieves the multiple photo shooting number data from Multiple Photo Shooting Number Data Storage Area 20646b2b (S2). CPU 211 then takes photos in accordance with the multiple photo shooting number data retrieved in S2 (S3). Namely, only one photo is taken by a photo shooting signal if the multiple photo shooting number data retrieved in S2 is '1'; two photos are taken by a photo shooting signal if the multiple photo shooting number data retrieved in S2 is '2'; three photos are taken by a photo shooting signal if the multiple photo shooting number data retrieved in S2 is '3'; four photos are taken by a photo shooting signal if the multiple photo shooting number data retrieved in S2 is '4'; five photos are taken by a photo shooting signal if the multiple photo shooting number data retrieved in S2 is '5'; six photos are taken by a photo shooting signal if the multiple photo shooting number data retrieved in S2 is '6'; seven photos are taken by a photo shooting signal if the multiple photo shooting number data retrieved in S2 is '7'; eight photos are taken by a photo shooting signal if the multiple photo shooting number data retrieved in S2 is '8'; nine photos are taken by a photo shooting signal if the multiple photo shooting number data retrieved in S2 is '9'; and ten photos are taken by a photo shooting signal if the multiple photo shooting number data retrieved in S2 is '10'.

This paragraph illustrates Strobe Software 20646c5 stored in Digital Camera Software Storage Area 20646c which takes photo(s) in accordance with the options selected hereinbefore. In this embodiment, a photo shooting signal is input by utilizing Input Device 210 (FIG. 1) or via voice recognition system (S1). CPU 211 (FIG. 1) retrieves the strobe data from Strobe Data Storage Area 20646b2c (S2). If the strobe data is 'On' (S3), CPU 211 activates Flash Light Unit 220 (not shown) each time a photo is taken (S4). In other words, Strobe Software 20646c5 is harmonized with Multiple Photo Shooting Software 20646c2 described hereinbefore. Namely, Flash Light Unit 220 is activated for one time if one photo is taken by a single photo shooting signal. Flash Light Unit 220 is activated for two times if two photos are taken by a single photo shooting signal. Flash Light Unit 220 is activated for three times if three photos are taken by a single photo shooting signal. Flash Light Unit 220 is activated for four times if four photos are taken by a single photo shooting signal. Flash Light Unit 220 is activated for five times if five photos are taken by a single photo shooting signal. Flash Light Unit 220 is activated for six times if six photos are taken by a single photo shooting signal. Flash Light Unit 220 is activated for seven times if seven photos are taken by a single photo shooting signal. Flash Light Unit 220 is activated for eight times if eight photos are taken by a single photo shooting signal. Flash Light Unit 220 is activated for nine times if nine photos are taken by a single photo shooting signal. Flash Light Unit 220 is activated for ten times if ten photos are taken by a single photo shooting signal.

This paragraph illustrates one embodiment of the zooming function which zooms the photo data stored in Photo Data Storage Area 20646b1. In this embodiment, a certain photo selected by the user of Communication Device 200 is displayed on LCD 201 (FIG. 1). Assuming that the user intends to zoom Object 20646Obj, the object displayed on LCD 201, to a larger size. The user selects Area 46ARa which includes Object 20646Obj by utilizing Input Device 210 (FIG. 1) or via voice recognition system, and the selected area is zoomed to fit the size of LCD 201. The zoomed photo is replaced with the original photo.

This paragraph illustrates the operation performed in RAM 206 (FIG. 1) to implement the zooming function described hereinbefore. A certain photo data selected by the user of Communication Device 200 is stored in Area 20646ARa of RAM 206. Here, the size of the photo data is as same as that of Area 20646ARa. In this embodiment, Display Area 20646DA is the area which is displayed on LCD 201 (FIG. 1). Area 46ARa is the area which is selected by the user of Communication Device 200. Object 20646Obj is the object included in the photo data. Area 46ARa which includes Object 20646Obj is selected by utilizing Input Device 210 (FIG. 1) or via voice recognition system, and the photo data stored in Area 20646ARa is zoomed to the size in which the size of Area 46ARa equals to that of Display Area 20646DA. The zoomed photo data is replaced with the original photo data and stored in Photo Data Storage Area 20646b1. The portion of the photo data which does not fit Area 20646ARa is cropped.

This paragraph illustrates Digital Zooming Software 20646c4 stored in Digital Camera Software Storage Area 20646c which implements the operation described hereinbefore. In this embodiment, CPU 211 (FIG. 1) displays a list of the photo IDs representing the photo data stored in Photo Data Storage Area 20646b1 as well as the thumbnails (S1). A certain photo data is selected by utilizing Input Device 210 (FIG. 1) or via voice recognition system (S2), and the selected photo data is displayed on LCD 201 (FIG. 1) as described hereinbefore (S3). Area 46ARa described hereinbefore is selected by utilizing Input Device 210 or via voice recognition system (S4). When a zooming signal is input by utilizing Input Device 210 or via voice recognition system (S5), CPU 211 (FIG. 1) implements the process described hereinbefore and replaces the original photo data with the zoomed photo data, which is stored in Photo Data Storage Area 20646b1 (S6).

This paragraph illustrates one embodiment of the trimming function which trims the photo data stored in Photo Data Storage Area 20646b1 and thereby moves the selected object to the center of the photo data. In this embodiment, a certain photo selected by the user of Communication Device 200 is displayed on LCD 201 (FIG. 1). Point 20646PTa adjacent to Object 20646Obj is selected by utilizing Input Device 210 (FIG. 1) or via voice recognition system, and the photo is centered at Point 20646PTa. The trimmed photo is replaced with the original photo.

This paragraph illustrates the operation performed in RAM 206 (FIG. 1) to implement the trimming function described hereinbefore. In this embodiment, Display Area 20646DA is the portion of the photo data which is displayed on LCD 201 (FIG. 1). Object 20646Obj is the object included in the photo data. Point 20646PTa is the point selected by the user of Communication Device 200 adjacent to Object 20646Obj which is centered by the present function. In this embodiment, a certain photo data selected by the user of Communication Device 200 is stored in Area 20646ARb of RAM 206. Here, the size of the photo data is as same as that of Area 20646ARb. Point 20646PTa is selected by utilizing Input Device 210 (FIG. 1) or via voice recognition system, and the photo data is centered at Point 20646PTa by sliding the entire photo data to the right. The trimmed photo data is replaced with the original photo data and stored in Photo Data Storage Area 20646b1. The portion of the photo data which does not fit Area 20646ARa is cropped.

This paragraph illustrates Trimming Software 20646c3 stored in Digital Camera Software Storage Area 20646c which implements the operation described hereinbefore. In this embodiment, CPU 211 (FIG. 1) displays a list of the photo IDs representing the photo data stored in Photo Data Storage Area 20646b1 as well as the thumbnails (S1). A certain photo data is selected by utilizing Input Device 210 (FIG. 1) or via voice recognition system (S2), and the selected photo data is displayed on LCD 201 (FIG. 1) as described hereinbefore (S3). Point 20646PTa described hereinbefore is selected by utilizing Input Device 210 or via voice recognition system (S4). When a trimming signal is input by utilizing Input Device 210 or via voice recognition system (S5), CPU 211 (FIG. 1) centers the photo data at Point 20646PTa and replaces the original photo data with the trimmed photo data, which is stored in Photo Data Storage Area 20646b1 (S6).

<<Multiple Device Door Unlocking Function>>

The following paragraphs illustrate the multiple device door unlocking function, wherein a door is capable to be unlocked by Device A and Device B. When the door is unlocked by Device A, the door unlocked message is displayed on Device A. Further, the door unlocked message is displayed on Device B. The door unlocking log is capable to be displayed on Device A, wherein the door unlocking log includes the time and date at which the door is unlocked and the identification of the device which unlocked the door. The door unlocking log is also capable to be displayed on Device B. The location data indicating the geographic locations of Device A and Device B at which the door is unlocked are displayed on Device A. The location data indicating the geographic locations of Device A and Device B at which the door is unlocked are also displayed on Device B. Here, each of Device A and Device B is Communication Device 200. The door (not shown) may be any type of door included in an artificial structure or carrier. Here, the artificial structure may be a house or building, and the carrier may be any type of carrier or transportation system designed to carry passenger (s), such as airplane, automobile, motorcycle, railway train, taxi, bus, space ship, and space station.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Device C, another Communication Device 200, is connected to Network NT (e.g., the Internet) in a wireless fashion. Host H, Device A, Device B, and Device C are capable to communicate with each other via Network NT (e.g., the Internet) to implement the present function. Device A, Device B, and Device C are also capable to communicate with each other directly to implement the present function. Assuming that Device A is installed in a door (not shown), and the lock of the door is capable to be unlocked by Device B and Device C. Assuming further that Device B and Device C are owned by the same user.

This paragraph illustrates the major element utilized to implement the present function. In this embodiment, Door Unlocking Device DUD570 is connected to Data Bus 203 (FIG. 1) of Device A. Door Unlocking Device DUD570 is the device which unlocks the door (not shown). The door is unlocked when Door Unlocking Device DUD570 is activated.

This paragraph illustrates the storage area included in Host H. In this embodiment, Host H includes Multiple Device Door Unlocking Information Storage Area H570a of which the data and the software program(s) stored therein are described hereinafter.

This paragraph illustrates the storage area(s) included in Multiple Device Door Unlocking Information Storage Area H570a. In this embodiment, Multiple Device Door Unlocking Information Storage Area H570a includes Multiple Device Door Unlocking Data Storage Area H570b and Multiple Device Door Unlocking Software Storage Area H570c. Multiple Device Door Unlocking Data Storage Area H570b stores the data necessary to implement the present function on the side of Host H, such as the one(s) described hereinafter. Multiple Device Door Unlocking Software Storage Area H570c stores the software program(s) necessary to implement the present function on the side of Host H, such as the one(s) described hereinafter.

This paragraph illustrates the storage area(s) included in Multiple Device Door Unlocking Data Storage Area H570b. In this embodiment, Multiple Device Door Unlocking Data Storage Area H570b includes User Code Data Storage Area H570b1, All Device Code Data Storage Area H570b2, Door Unlocked Message Data Storage Area H570b3, All Device Location Data Storage Area H570b4, Map Data Storage Area H570b5, All Device Icon Data Storage Area H570b6, Door Unlock Log Data Storage Area H570b7, and Work Area H570a8. User Code Data Storage Area H570b1 stores the user code data which is the code unique to the common user of both Device B and Device C. All Device Code Data Storage Area H570b2 stores the data described hereinafter. Door Unlocked Message Data Storage Area H570b3 stores the door unlocked message data which is the message indicating that the door is unlocked. All Device Location Data Storage Area H570b4 stores the data described hereinafter. Map Data Storage Area H570b5 stores the map data which is the image data indicating a map. All Device Icon Data Storage Area H570b6 stores the data described hereinafter. Door Unlock Log Data Storage Area H570b7 stores the data described hereinafter. Work Area H570a8 is utilized as a work area to perform calculation and temporarily store data.

This paragraph illustrates the storage area(s) included in All Device Code Data Storage Area H570b2. In this embodiment, All Device Code Data Storage Area H570b2 includes 1st Device Code Data Storage Area H570b2a and 2nd Device Code Data Storage Area H570b2b. 1st Device Code Data Storage Area H570b2a stores the 1st device code data which indicates the code unique to Device B. 2nd Device Code Data Storage Area H570b2b stores the 2nd device code data which indicates the code unique to Device C.

This paragraph illustrates the storage area(s) included in All Device Location Data Storage Area H570b4. In this embodiment, All Device Location Data Storage Area H570b4 includes 1st Device Location Data Storage Area H570b4a and 2nd Device Location Data Storage Area H570b4b. 1st Device Location Data Storage Area H570b4a stores the 1st device location data which indicates the current geographic location of Device B in (x,y,z) format. 2nd Device Location Data Storage Area H570*b*4*b* stores the 2nd device location data which indicates the current geographic location of Device C in (x,y,z) format.

This paragraph illustrates the storage area(s) included in All Device Icon Data Storage Area H570*b*6. In this embodiment, All Device Icon Data Storage Area H570*b*6 includes 1st Device Icon Data Storage Area H570*b*6*a* and 2nd Device Icon Data Storage Area H570*b*6*b*. 1st Device Icon Data Storage Area H570*b*6*a* stores the 1st device icon data which is the image of the icon utilized to indicate the geographic location of Device B on the map data. 2nd Device Icon Data Storage Area H570*b*6*b* stores the 2nd device icon data which is the image of the icon utilized to indicate the geographic location of Device C on the map data.

This paragraph illustrates the data stored in Door Unlock Log Data Storage Area H570*b*7. In this embodiment, Door Unlock Log Data Storage Area H570*b*7 comprises two columns, i.e., 'Door Unlock Log ID' and 'Door Unlock Log Data'. Column 'Door Unlock Log ID' stores the door unlock log IDs, and each door unlock log ID is an identification of the corresponding door unlock log data stored in column 'Door Unlock Log Data'. Column 'Door Unlock Log Data' stores the door unlock log data, and each door unlock log data is the log of unlocking the door. In this embodiment, Door Unlock Log Data Storage Area H570*b*7 stores the following data: 'Door Unlock Log#1' and the corresponding 'Door Unlock Log Data#1'; 'Door Unlock Log#2' and the corresponding 'Door Unlock Log Data#2'; 'Door Unlock Log#3' and the corresponding 'Door Unlock Log Data#3'; and 'Door Unlock Log#4' and the corresponding 'Door Unlock Log Data#4'. Each of the door unlock log data includes the door unlocked time data which indicates the time and date at which the door is unlocked, the device code data (either the 1st device code data or the 2nd device code data) by which the door is unlocked, and the 1st device location data and the 2nd device location data at the time the door is unlocked.

This paragraph illustrates the software program(s) stored in Multiple Device Door Unlocking Software Storage Area H570*c*. In this embodiment, Multiple Device Door Unlocking Software Storage Area H570*c* stores 1st Device Location Data Producing Software H570*c*1, Door Unlocking Software H570*c*3, Door Unlock Log Data Sharing Software H570*c*4, and Individual Unlock Log Data Displaying Software H570*c*5. 1st Device Location Data Producing Software H570*c*1 is the software program described hereinafter. Door Unlocking Software H570*c*3 is the software program described hereinafter. Door Unlock Log Data Sharing Software H570*c*4 is the software program described hereinafter. Individual Unlock Log Data Displaying Software H570*c*5 is the software program described hereinafter.

This paragraph illustrates the storage area included in RAM 206 (FIG. 1) of Device A. In this embodiment, RAM 206 includes Multiple Device Door Unlocking Information Storage Area 206A570*a* of which the data and the software program(s) stored therein are described hereinafter.

The data and/or the software program(s) necessary to implement the present function may be downloaded from Host H to Device A.

This paragraph illustrates the storage area(s) included in Multiple Device Door Unlocking Information Storage Area 206A570*a*. In this embodiment, Multiple Device Door Unlocking Information Storage Area 206A570*a* includes Multiple Device Door Unlocking Data Storage Area 206A570*b* and Multiple Device Door Unlocking Software Storage Area 206A570*c*. Multiple Device Door Unlocking Data Storage Area 206A570*b* stores the data necessary to implement the present function on the side of Device A, such as the one(s) described hereinafter. Multiple Device Door Unlocking Software Storage Area 206A570*c* stores the software program(s) necessary to implement the present function on the side of Device A, such as the one(s) described hereinafter.

This paragraph illustrates the storage area(s) included in Multiple Device Door Unlocking Data Storage Area 206A570*b*. In this embodiment, Multiple Device Door Unlocking Data Storage Area 206A570*b* includes User Code Data Storage Area 206A570*b*1, All Device Code Data Storage Area 206A570*b*2, Door Unlocked Message Data Storage Area 206A570*b*3, All Device Location Data Storage Area 206A570*b*4, Map Data Storage Area 206A570*b*5, All Device Icon Data Storage Area 206A570*b*6, Door Unlock Log Data Storage Area 206A570*b*7, and Work Area 206A570*a*8. User Code Data Storage Area 206A570*b*1 stores the user code data which is the code unique to the common user of both Device B and Device C. All Device Code Data Storage Area 206A570*b*2 stores the data described hereinafter. Door Unlocked Message Data Storage Area 206A570*b*3 stores the door unlocked message data which is the message indicating that the door is unlocked. All Device Location Data Storage Area 206A570*b*4 stores the data described hereinafter. Map Data Storage Area 206A570*b*5 stores the map data which is the image data indicating a map. All Device Icon Data Storage Area 206A570*b*6 stores the data described hereinafter. Door Unlock Log Data Storage Area 206A570*b*7 stores the data described hereinafter. Work Area 206A570*a*8 is utilized as a work area to perform calculation and temporarily store data.

This paragraph illustrates the storage area(s) included in All Device Code Data Storage Area 206A570*b*2. In this embodiment, All Device Code Data Storage Area 206A570*b*2 includes 1st Device Code Data Storage Area 206A570*b*2*a* and 2nd Device Code Data Storage Area 206A570*b*2*b*. 1st Device Code Data Storage Area 206A570*b*2*a* stores the 1st device code data which indicates the code unique to Device B. 2nd Device Code Data Storage Area 206A570*b*2*b* stores the 2nd device code data which indicates the code unique to Device C.

This paragraph illustrates the storage area(s) included in All Device Location Data Storage Area 206A570*b*4. In this embodiment, All Device Location Data Storage Area 206A570*b*4 includes 1st Device Location Data Storage Area 206A570*b*4*a* and 2nd Device Location Data Storage Area 206A570*b*4*b*. 1st Device Location Data Storage Area 206A570*b*4*a* stores the 1st device location data which indicates the current geographic location of Device B in (x,y,z) format. 2nd Device Location Data Storage Area 206A570*b*4*b* stores the 2nd device location data which indicates the current geographic location of Device C in (x,y,z) format.

This paragraph illustrates the storage area(s) included in All Device Icon Data Storage Area 206A570*b*6. In this embodiment, All Device Icon Data Storage Area 206A570*b*6 includes 1st Device Icon Data Storage Area 206A570*b*6*a* and 2nd Device Icon Data Storage Area 206A570*b*6*b*. 1st Device Icon Data Storage Area 206A570*b*6*a* stores the 1st device icon data which is the image of the icon utilized to indicate the geographic location of Device B on the map data. 2nd Device Icon Data Storage Area 206A570*b*6*b* stores the 2nd device icon data which is the image of the icon utilized to indicate the geographic location of Device C on the map data.

This paragraph illustrates the data stored in Door Unlock Log Data Storage Area 206A570*b*7. In this embodiment, Door Unlock Log Data Storage Area 206A570*b*7 comprises two columns, i.e., 'Door Unlock Log ID' and 'Door Unlock Log Data'. Column 'Door Unlock Log ID' stores the door unlock log IDs, and each door unlock log ID is an identification of the corresponding door unlock log data stored in column 'Door Unlock Log Data'. Column 'Door Unlock Log Data' stores the door unlock log data, and each door unlock log data is the log of unlocking the door. In this embodiment, Door Unlock Log Data Storage Area 206A570b7 stores the following data: 'Door Unlock Log#1' and the corresponding 'Door Unlock Log Data#1'; 'Door Unlock Log#2' and the corresponding 'Door Unlock Log Data#2'; 'Door Unlock Log#3' and the corresponding 'Door Unlock Log Data#3'; and 'Door Unlock Log#4' and the corresponding 'Door Unlock Log Data#4'. Each of the door unlock log data includes the door unlocked time data which indicates the time and date at which the door is unlocked, the device code data (either the 1st device code data or the 2nd device code data) by which the door is unlocked, and the 1st device location data and the 2nd device location data at the time the door is unlocked.

This paragraph illustrates the software program(s) stored in Multiple Device Door Unlocking Software Storage Area 206A570c. In this embodiment, Multiple Device Door Unlocking Software Storage Area 206A570c stores Door Unlocking Software 206A570c3, Door Unlock Log Data Sharing Software 206A570c4, and Individual Unlock Log Data Displaying Software 206A570c5. Door Unlocking Software 206A570c3 is the software program described hereinafter. Door Unlock Log Data Sharing Software 206A570c4 is the software program described hereinafter. Individual Unlock Log Data Displaying Software 206A570c5 is the software program described hereinafter.

This paragraph illustrates the storage area included in RAM 206 (FIG. 1) of Device B. In this embodiment, RAM 206 includes Multiple Device Door Unlocking Information Storage Area 206B570a of which the data and the software program(s) stored therein are described hereinafter.

The data and/or the software program(s) necessary to implement the present function may be downloaded from Host H to Device B.

This paragraph illustrates the storage area(s) included in Multiple Device Door Unlocking Information Storage Area 206B570a. In this embodiment, Multiple Device Door Unlocking Information Storage Area 206B570a includes Multiple Device Door Unlocking Data Storage Area 206B570b and Multiple Device Door Unlocking Software Storage Area 206B570c. Multiple Device Door Unlocking Data Storage Area 206B570b stores the data necessary to implement the present function on the side of Device B, such as the one(s) described hereinafter. Multiple Device Door Unlocking Software Storage Area 206B570c stores the software program(s) necessary to implement the present function on the side of Device B, such as the one(s) described hereinafter.

This paragraph illustrates the storage area(s) included in Multiple Device Door Unlocking Data Storage Area 206B570b. In this embodiment, Multiple Device Door Unlocking Data Storage Area 206B570b includes User Code Data Storage Area 206B570b1, All Device Code Data Storage Area 206B570b2, Door Unlocked Message Data Storage Area 206B570b3, All Device Location Data Storage Area 206B570b4, Map Data Storage Area 206B570b5, All Device Icon Data Storage Area 206B570b6, Door Unlock Log Data Storage Area 206B570b7, and Work Area 206B570a8. User Code Data Storage Area 206B570b1 stores the user code data which is the code unique to the common user of both Device B and Device C. All Device Code Data Storage Area 206B570b2 stores the data described hereinafter. Door Unlocked Message Data Storage Area 206B570b3 stores the door unlocked message data which is the message indicating that the door is unlocked. All Device Location Data Storage Area 206B570b4 stores the data described hereinafter. Map Data Storage Area 206B570b5 stores the map data which is the image data indicating a map. All Device Icon Data Storage Area 206B570b6 stores the data described hereinafter. Door Unlock Log Data Storage Area 206B570b7 stores the data described hereinafter. Work Area 206B570a8 is utilized as a work area to perform calculation and temporarily store data.

This paragraph illustrates the storage area(s) included in All Device Code Data Storage Area 206B570b2. In this embodiment, All Device Code Data Storage Area 206B570b2 includes 1st Device Code Data Storage Area 206B570b2a. 1st Device Code Data Storage Area 206B570b2a stores the 1st device code data which indicates the code unique to Device B.

This paragraph illustrates the storage area(s) included in All Device Location Data Storage Area 206B570b4. In this embodiment, All Device Location Data Storage Area 206B570b4 includes 1st Device Location Data Storage Area 206B570b4a and 2nd Device Location Data Storage Area 206B570b4b. 1st Device Location Data Storage Area 206B570b4a stores the 1st device location data which indicates the current geographic location of Device B in (x,y,z) format. 2nd Device Location Data Storage Area 206B570b4b stores the 2nd device location data which indicates the current geographic location of Device C in (x,y,z) format.

This paragraph illustrates the storage area(s) included in All Device Icon Data Storage Area 206B570b6. In this embodiment, All Device Icon Data Storage Area 206B570b6 includes 1st Device Icon Data Storage Area 206B570b6a and 2nd Device Icon Data Storage Area 206B570b6b. 1st Device Icon Data Storage Area 206B570b6a stores the 1st device icon data which is the image of the icon utilized to indicate the geographic location of Device B on the map data. 2nd Device Icon Data Storage Area 206B570b6b stores the 2nd device icon data which is the image of the icon utilized to indicate the geographic location of Device C on the map data.

This paragraph illustrates the data stored in Door Unlock Log Data Storage Area 206B570b7. In this embodiment, Door Unlock Log Data Storage Area 206B570b7 comprises two columns, i.e., 'Door Unlock Log ID' and 'Door Unlock Log Data'. Column 'Door Unlock Log ID' stores the door unlock log IDs, and each door unlock log ID is an identification of the corresponding door unlock log data stored in column 'Door Unlock Log Data'. Column 'Door Unlock Log Data' stores the door unlock log data, and each door unlock log data is the log of unlocking the door. In this embodiment, Door Unlock Log Data Storage Area 206B570b7 stores the following data: 'Door Unlock Log#1' and the corresponding 'Door Unlock Log Data#1'; 'Door Unlock Log#2' and the corresponding 'Door Unlock Log Data#2'; 'Door Unlock Log#3' and the corresponding 'Door Unlock Log Data#3'; and 'Door Unlock Log#4' and the corresponding 'Door Unlock Log Data#4'. Each of the door unlock log data includes the door unlocked time data which indicates the time and date at which the door is unlocked, the device code data (either the 1st device code data or the 2nd device code data) by which the door is unlocked, and the 1st device location data and the 2nd device location data at the time the door is unlocked.

This paragraph illustrates the software program(s) stored in Multiple Device Door Unlocking Software Storage Area 206B570c. In this embodiment, Multiple Device Door Unlocking Software Storage Area 206B570c stores 1st Device Location Data Producing Software 206B570c1, Door Unlocking Software 206B570c3, Door Unlock Log Data Sharing Software 206B570c4, and Individual Unlock Log Data Displaying Software 206B570c5. 1st Device Location Data Producing Software 206B570c1 is the software program described hereinafter. Door Unlocking Software 206B570c3 is the software program described hereinafter. Door Unlock Log Data Sharing Software 206B570c4 is the software program described hereinafter. Individual Unlock Log Data Displaying Software 206B570c5 is the software program described hereinafter.

This paragraph illustrates the storage area included in RAM 206 (FIG. 1) of Device C. In this embodiment, RAM 206 includes Multiple Device Door Unlocking Information Storage Area 206C570a of which the data and the software program(s) stored therein are described hereinafter.

The data and/or the software program(s) necessary to implement the present function may be downloaded from Host H to Device C.

This paragraph illustrates the storage area(s) included in Multiple Device Door Unlocking Information Storage Area 206C570a. In this embodiment, Multiple Device Door Unlocking Information Storage Area 206C570a includes Multiple Device Door Unlocking Data Storage Area 206C570b and Multiple Device Door Unlocking Software Storage Area 206C570c. Multiple Device Door Unlocking Data Storage Area 206C570b stores the data necessary to implement the present function on the side of Device C, such as the one(s) described hereinafter. Multiple Device Door Unlocking Software Storage Area 206C570c stores the software program(s) necessary to implement the present function on the side of Device C, such as the one(s) described hereinafter.

This paragraph illustrates the storage area(s) included in Multiple Device Door Unlocking Data Storage Area 206C570b. In this embodiment, Multiple Device Door Unlocking Data Storage Area 206C570b includes User Code Data Storage Area 206C570b1, All Device Code Data Storage Area 206C570b2, Door Unlocked Message Data Storage Area 206C570b3, All Device Location Data Storage Area 206C570b4, Map Data Storage Area 206C570b5, All Device Icon Data Storage Area 206C570b6, Door Unlock Log Data Storage Area 206C570b7, and Work Area 206C570a8. User Code Data Storage Area 206C570b1 stores the user code data which is the code unique to the common user of both Device B and Device C. All Device Code Data Storage Area 206C570b2 stores the data described hereinafter. Door Unlocked Message Data Storage Area 206C570b3 stores the door unlocked message data which is the message indicating that the door is unlocked. All Device Location Data Storage Area 206C570b4 stores the data described hereinafter. Map Data Storage Area 206C570b5 stores the map data which is the image data indicating a map. All Device Icon Data Storage Area 206C570b6 stores the data described hereinafter. Door Unlock Log Data Storage Area 206C570b7 stores the data described hereinafter. Work Area 206C570a8 is utilized as a work area to perform calculation and temporarily store data.

This paragraph illustrates the storage area(s) included in All Device Code Data Storage Area 206C570b2. In this embodiment, All Device Code Data Storage Area 206C570b2 includes 2nd Device Code Data Storage Area 206C570b2b. 2nd Device Code Data Storage Area 206C570b2b stores the 2nd device code data which indicates the code unique to Device C.

This paragraph illustrates the storage area(s) included in All Device Location Data Storage Area 206C570b4. In this embodiment, All Device Location Data Storage Area 206C570b4 includes 1st Device Location Data Storage Area 206C570b4a and 2nd Device Location Data Storage Area 206C570b4b. 1st Device Location Data Storage Area 206C570b4a stores the 1st device location data which indicates the current geographic location of Device B in (x,y,z) format. 2nd Device Location Data Storage Area 206C570b4b stores the 2nd device location data which indicates the current geographic location of Device C in (x,y,z) format.

This paragraph illustrates the storage area(s) included in All Device Icon Data Storage Area 206C570b6. In this embodiment, All Device Icon Data Storage Area 206C570b6 includes 1st Device Icon Data Storage Area 206C570b6a and 2nd Device Icon Data Storage Area 206C570b6b. 1st Device Icon Data Storage Area 206C570b6a stores the 1st device icon data which is the image of the icon utilized to indicate the geographic location of Device B on the map data. 2nd Device Icon Data Storage Area 206C570b6b stores the 2nd device icon data which is the image of the icon utilized to indicate the geographic location of Device C on the map data.

This paragraph illustrates the data stored in Door Unlock Log Data Storage Area 206C570b7. In this embodiment, Door Unlock Log Data Storage Area 206C570b7 comprises two columns, i.e., 'Door Unlock Log ID' and 'Door Unlock Log Data'. Column 'Door Unlock Log ID' stores the door unlock log IDs, and each door unlock log ID is an identification of the corresponding door unlock log data stored in column 'Door Unlock Log Data'. Column 'Door Unlock Log Data' stores the door unlock log data, and each door unlock log data is the log of unlocking the door. In this embodiment, Door Unlock Log Data Storage Area 206C570b7 stores the following data: 'Door Unlock Log#1' and the corresponding 'Door Unlock Log Data#1'; 'Door Unlock Log#2' and the corresponding 'Door Unlock Log Data#2'; 'Door Unlock Log#3' and the corresponding 'Door Unlock Log Data#3'; and 'Door Unlock Log#4' and the corresponding 'Door Unlock Log Data#4'. Each of the door unlock log data includes the door unlocked time data which indicates the time and date at which the door is unlocked, the device code data (either the 1st device code data or the 2nd device code data) by which the door is unlocked, and the 1st device location data and the 2nd device location data at the time the door is unlocked.

This paragraph illustrates the software program(s) stored in Multiple Device Door Unlocking Software Storage Area 206C570c. In this embodiment, Multiple Device Door Unlocking Software Storage Area 206C570c stores 2nd Device Location Data Producing Software 206C570c2, Door Unlocking Software 206C570c3, Door Unlock Log Data Sharing Software 206C570c4, and Individual Unlock Log Data Displaying Software 206C570c5. 2nd Device Location Data Producing Software 206C570c2 is the software program described hereinafter. Door Unlocking Software 206C570c3 is the software program described hereinafter. Door Unlock Log Data Sharing Software 206C570c4 is the software program described hereinafter. Individual Unlock Log Data Displaying Software 206C570c5 is the software program described hereinafter.

This paragraph illustrate(s) 1st Device Location Data Producing Software 206B570c1 of Device B, which produce(s) the 1st device location data. In this embodiment, CPU 211 (FIG. 1) of Device B identifies the current location of Device B (S1). CPU 211 (FIG. 1) of Device B produces the 1st device location data by referring to the current location identified in the previous step (S2). CPU 211 (FIG. 1) of Device B stores the 1st device location data produced in the previous step in 1st Device Location Data Storage Area 206B570b4a (S3). The foregoing sequence is repeated periodically.

This paragraph illustrate(s) 2nd Device Location Data Producing Software 206C570c2 of Device C, which produce(s) the 2nd device location data. In this embodiment, CPU 211

(FIG. 1) of Device C identifies the current location of Device C (S1). CPU 211 (FIG. 1) of Device C produces the 2nd device location data by referring to the current location identified in the previous step (S2). CPU 211 (FIG. 1) of Device C stores the 2nd device location data produced in the previous step in 2nd Device Location Data Storage Area 206C570b4b (S3). The foregoing sequence is repeated periodically.

This paragraph illustrate(s) Door Unlocking Software H570c3 of Host H, Door Unlocking Software 206A570c3 of Device A, Door Unlocking Software 206B570c3 of Device B, and Door Unlocking Software 206C570c3 of Device C, which unlock(s) the door (not shown). Assuming that the door is unlocked by utilizing Device B. In this embodiment, the user inputs, by utilizing Input Device 210 (FIG. 1) or via voice recognition system, the door unlocking command (S1). Here, the door unlocking command is the command to unlock the door (not shown). CPU 211 (FIG. 1) of Device B retrieves the user code data from User Code Data Storage Area 206B570b1 and sends the data to Host H in a wireless fashion (S2). Host H receives the user code data from Device B (S3). CPU 211 (FIG. 1) of Device B retrieves the 1st device code data from 1st Device Code Data Storage Area 206B570b2a and sends the data to Host H in a wireless fashion (S4). Host H receives the 1st device code data from Device B (S5). Host H retrieves the user code data from User Code Data Storage Area H570b1 (S6). If the user code data received in S3 and the user code data retrieved in the previous step matches, Host H proceeds to the next step (S7). Host H sends the door unlocking device activating command to Device A (S8). Here, the door unlocking device activating command is the command to activate Door Unlocking Device DUD570. CPU 211 (FIG. 1) of Device A receives the door unlocking device activating command from Host H in a wireless fashion (S9). CPU 211 (FIG. 1) of Device A activates Door Unlocking Device DUD570 (S10). Host H sends the 1st device location data transferring request to Device B (S11). Here, the 1st device location data transferring request is the request to transfer the 1st device location data. CPU 211 (FIG. 1) of Device B receives the 1st device location data transferring request from Host H in a wireless fashion (S12). CPU 211 (FIG. 1) of Device B retrieves the 1st device location data from 1st Device Location Data Storage Area 206B570b4a and sends the data to Host H in a wireless fashion (S13). Host H receives the 1st device location data from Device B and stores the data in 1st Device Location Data Storage Area H570b4a (S14). Host H sends the 2nd device location data transferring request to Device C (S15). Here, the 2nd device location data transferring request is the request to transfer the 2nd device location data. CPU 211 (FIG. 1) of Device C receives the 2nd device location data transferring request from Host H in a wireless fashion (S16). CPU 211 (FIG. 1) of Device C retrieves the 2nd device location data from 2nd Device Location Data Storage Area 206C570b4b and sends the data to Host H in a wireless fashion (S17). Host H receives the 2nd device location data from Device C and stores the data in 2nd Device Location Data Storage Area H570b4b (S18). Host H identifies the current time and date (S19). Host H produces the door unlocked time data by utilizing the current time and date identified in the previous step (S20). Host H produces the door unlock log data (e.g., Door Unlock Log Data#3) by utilizing the door unlocked time data produced in the previous step, the user code data received in S3, the 1st device code data received in S5, the 1st device location data received in S14, and the 2nd device location data received in S18 (S21). Host H stores the door unlock log data (e.g., Door Unlock Log Data#3) produced in the previous step in Door Unlock Log Data Storage Area H570b7 (S22). Host H retrieves the door unlocked message data from Door Unlocked Message Data Storage Area H570b3 and sends the data to Device A (S23). CPU 211 (FIG. 1) of Device A receives the door unlocked message data from Host H in a wireless fashion and displays the data on LCD 201 (FIG. 1) of Device A (S24). Host H sends the door unlocked notice to Device B (S25). Here, the door unlocked notice indicates that the door is unlocked. CPU 211 (FIG. 1) of Device B receives the door unlocked notice from Host H in a wireless fashion (S26). CPU 211 (FIG. 1) of Device B retrieves the door unlocked message data from Door Unlocked Message Data Storage Area 206B570b3 and displays the data on LCD 201 (FIG. 1) of Device B (S27). Host H sends the door unlocked notice to Device C (S28). Here, the door unlocked notice indicates that the door is unlocked. CPU 211 (FIG. 1) of Device C receives the door unlocked notice from Host H in a wireless fashion (S29). CPU 211 (FIG. 1) of Device C retrieves the door unlocked message data from Door Unlocked Message Data Storage Area 206C570b3 and displays the data on LCD 201 (FIG. 1) of Device C (S30).

This paragraph illustrate(s) Door Unlocking Software H570c3 of Host H, Door Unlocking Software 206A570c3 of Device A, Door Unlocking Software 206B570c3 of Device B, and Door Unlocking Software 206C570c3 of Device C, which unlock(s) the door (not shown). Assuming that the door is unlocked by utilizing Device C. In this embodiment, the user inputs, by utilizing Input Device 210 (FIG. 1) or via voice recognition system, the door unlocking command (S1). Here, the door unlocking command is the command to unlock the door (not shown). CPU 211 (FIG. 1) of Device C retrieves the user code data from User Code Data Storage Area 206C570b1 and sends the data to Host H in a wireless fashion (S2). Host H receives the user code data from Device C (S3). CPU 211 (FIG. 1) of Device C retrieves the 2nd device code data from 2nd Device Code Data Storage Area 206C570b2b and sends the data to Host H in a wireless fashion (S4). Host H receives the 2nd device code data from Device C (S5). Host H retrieves the user code data from User Code Data Storage Area H570b1 (S6). If the user code data received in S3 and the user code data retrieved in the previous step matches, Host H proceeds to the next step (S7). Host H sends the door unlocking device activating command to Device A (S8). Here, the door unlocking device activating command is the command to activate Door Unlocking Device DUD570. CPU 211 (FIG. 1) of Device A receives the door unlocking device activating command from Host H in a wireless fashion (S9). CPU 211 (FIG. 1) of Device A activates Door Unlocking Device DUD570 (S10). Host H sends the 1st device location data transferring request to Device B (S11). Here, the 1st device location data transferring request is the request to transfer the 1st device location data. CPU 211 (FIG. 1) of Device B receives the 1st device location data transferring request from Host H in a wireless fashion (S12). CPU 211 (FIG. 1) of Device B retrieves the 1st device location data from 1st Device Location Data Storage Area 206B570b4a and sends the data to Host H in a wireless fashion (S13). Host H receives the 1st device location data from Device B and stores the data in 1st Device Location Data Storage Area H570b4a (S14). Host H sends the 2nd device location data transferring request to Device C (S15). Here, the 2nd device location data transferring request is the request to transfer the 2nd device location data. CPU 211 (FIG. 1) of Device C receives the 2nd device location data transferring request from Host H in a wireless fashion (S16). CPU 211 (FIG. 1) of Device C retrieves the 2nd device location data from 2nd Device Location Data Storage Area 206C570b4b and sends the data to Host H in a wireless fashion (S17). Host H receives the 2nd device location data from Device C and stores the data in 2nd Device Location Data Storage Area H570b4b (S18). Host H identifies the current time and date (S19). Host H produces the door unlocked time data by utilizing the current time and date identified in the previous step (S20). Host H produces the door unlock log data (e.g., Door Unlock Log Data#4) by utilizing the door unlocked time data produced in the previous step, the user code data received in S3, the 2nd device code data received in S5, the 1st device location data received in S14, and the 2nd device location data received in S18 (S21). Host H stores the door unlock log data (e.g., Door Unlock Log Data#4) produced in the previous step in Door Unlock Log Data Storage Area H570b7 (S22). Host H retrieves the door unlocked message data from Door Unlocked Message Data Storage Area H570b3 and sends the data to Device A (S23). CPU 211 (FIG. 1) of Device A receives the door unlocked message data from Host H in a wireless fashion and displays the data on LCD 201 (FIG. 1) of Device A (S24). Host H sends the door unlocked notice to Device B (S25). Here, the door unlocked notice indicates that the door is unlocked. CPU 211 (FIG. 1) of Device B receives the door unlocked notice from Host H in a wireless fashion (S26). CPU 211 (FIG. 1) of Device B retrieves the door unlocked message data from Door Unlocked Message Data Storage Area 206B570b3 and displays the data on LCD 201 (FIG. 1) of Device B (S27). Host H sends the door unlocked notice to Device C (S28). Here, the door unlocked notice indicates that the door is unlocked. CPU 211 (FIG. 1) of Device C receives the door unlocked notice from Host H in a wireless fashion (S29). CPU 211 (FIG. 1) of Device C retrieves the door unlocked message data from Door Unlocked Message Data Storage Area 206C570b3 and displays the data on LCD 201 (FIG. 1) of Device C (S30).

This paragraph illustrate(s) Door Unlock Log Data Sharing Software H570c4 of Host H and Door Unlock Log Data Sharing Software 206B570c4 of Device B, which share(s) the door unlock log data. In this embodiment, Host H retrieves all door unlock log data (e.g., Door Unlock Log Data#1 through #4) from Door Unlock Log Data Storage Area H570b7 and sends the data to Device B (S1). CPU 211 (FIG. 1) of Device B receives the door unlock log data (e.g., Door Unlock Log Data#1 through #4) from Host H in a wireless fashion and stores the data in Door Unlock Log Data Storage Area 206B570b7 (S2). The foregoing sequence is repeated periodically.

This paragraph illustrate(s) Door Unlock Log Data Sharing Software H570c4 of Host H and Door Unlock Log Data Sharing Software 206C570c4 of Device C, which share(s) the door unlock log data. In this embodiment, Host H retrieves all door unlock log data (e.g., Door Unlock Log Data#1 through #4) from Door Unlock Log Data Storage Area H570b7 and sends the data to Device C (S1). CPU 211 (FIG. 1) of Device C receives the door unlock log data (e.g., Door Unlock Log Data#1 through #4) from Host H in a wireless fashion and stores the data in Door Unlock Log Data Storage Area 206C570b7 (S2). The foregoing sequence is repeated periodically.

This paragraph illustrate(s) Individual Unlock Log Data Displaying Software H570c5 of Host H and Individual Unlock Log Data Displaying Software 206A570c5 of Device A, which display(s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device A sends the door unlock log data displaying command input in the previous step to Host H in a wireless fashion (S2). Host H receives the door unlock log data displaying command from Device A (S3). Host H retrieves all door unlock log IDs (e.g., Door Unlock Log#1 through #4) from Door Unlock Log Data Storage Area H570b7 and sends the data to Device A (S4). CPU 211 (FIG. 1) of Device A receives the door unlock log IDs (e.g., Door Unlock Log#1 through #4) from Host H in a wireless fashion and displays the data on LCD 201 (FIG. 1) of Device A (S5). The user selects, by utilizing Input Device 210 (FIG. 1) or via voice recognition system, a door unlock log ID (e.g., Door Unlock Log#1) (S6). Host H retrieves the door unlock log data (e.g., Door Unlock Log Data#1) corresponding to the door unlock log ID (e.g., Door Unlock Log#1) selected in the previous step from Door Unlock Log Data Storage Area H570b7 (S7). Host H retrieves the door unlocked time data, the user code data, and the device code data (e.g., the 1st device code data) from the door unlock log data (e.g., Door Unlock Log Data#1) retrieved in the previous step and sends the data to Device A (S8). CPU 211 (FIG. 1) of Device A receives the door unlocked time data, the user code data, and the device code data (e.g., the 1st device code data) from Host H in a wireless fashion and displays the data on LCD 201 (FIG. 1) of Device A (S9). Host H retrieves the map data from Map Data Storage Area H570b5 and sends the data to Device A (S10). CPU 211 (FIG. 1) of Device A receives the map data from Host H in a wireless fashion and displays the data on LCD 201 (FIG. 1) of Device A (S11). Host H retrieves the 1st device location data from the door unlock log data (e.g., Door Unlock Log Data#1) retrieved in S7 and sends the data to Device A (S12). CPU 211 (FIG. 1) of Device A receives the 1st device location data from Host H in a wireless fashion (S13). Host H retrieves the 1st device icon data from 1st Device Icon Data Storage Area H570b6a and sends the data to Device A (S14). CPU 211 (FIG. 1) of Device A receives the 1st device icon data from Host H in a wireless fashion (S15). CPU 211 (FIG. 1) of Device A displays the 1st device icon data received in the previous step at the location corresponding to the 1st device location data received in S13 on the map data displayed in S11 (S16). Host H retrieves the 2nd device location data from the door unlock log data (e.g., Door Unlock Log Data#1) retrieved in S7 and sends the data to Device A (S17). CPU 211 (FIG. 1) of Device A receives the 2nd device location data from Host H in a wireless fashion (S18). Host H retrieves the 2nd device icon data from 2nd Device Icon Data Storage Area H570b6b and sends the data to Device A (S19). CPU 211 (FIG. 1) of Device A receives the 2nd device icon data from Host H in a wireless fashion (S20). CPU 211 (FIG. 1) of Device A displays the 2nd device icon data received in the previous step at the location corresponding to the 2nd device location data received in S18 on the map data displayed in S11 (S21). Thus, the geographic locations of Device B and Device C are displayed on the map data simultaneously.

This paragraph illustrate(s) Individual Unlock Log Data Displaying Software 206B570c5 of Device B, which display(s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device B retrieves all door unlock log IDs (e.g., Door Unlock Log#1 through #4) from Door Unlock Log Data Storage Area 206B570b7 (S2). CPU 211 (FIG. 1) of Device B displays the door unlock log IDs (e.g., Door Unlock Log#1 through #4) retrieved in the previous step on LCD 201 (FIG. 1) of Device B (S3). The user selects, by utilizing Input Device 210 (FIG. 1) or via voice recognition system, a door unlock log ID (e.g., Door Unlock Log#1) (S4). CPU 211 (FIG. 1) of Device B retrieves the door unlock log data (e.g., Door Unlock Log Data#1) corresponding to the door unlock log ID (e.g., Door Unlock Log#1) selected in the previous step from Door Unlock Log Data Storage Area 206B570*b*7 (S5). CPU 211 (FIG. 1) of Device B retrieves the door unlocked time data, the user code data, and the device code data (e.g., the 1st device code data) from the door unlock log data (e.g., Door Unlock Log Data#1) retrieved in the previous step (S6). CPU 211 (FIG. 1) of Device B displays the door unlocked time data, the user code data, and the device code data (e.g., the 1st device code data) retrieved in the previous step on LCD 201 (FIG. 1) of Device B (S7). CPU 211 (FIG. 1) of Device B retrieves the map data from Map Data Storage Area 206B570*b*5 (S8). CPU 211 (FIG. 1) of Device B displays the map data retrieved in the previous step on LCD 201 (FIG. 1) of Device B (S9). CPU 211 (FIG. 1) of Device B retrieves the 1st device location data from the door unlock log data (e.g., Door Unlock Log Data#1) retrieved in S5 (S10). CPU 211 (FIG. 1) of Device B retrieves the 1st device icon data from 1st Device Icon Data Storage Area 206B570*b*6*a* (S11). CPU 211 (FIG. 1) of Device B displays the 1st device icon data retrieved in the previous step at the location corresponding to the 1st device location data retrieved in S10 on the map data displayed in S9 (S12). CPU 211 (FIG. 1) of Device B retrieves the 2nd device location data from the door unlock log data (e.g., Door Unlock Log Data#1) retrieved in S5 (S13). CPU 211 (FIG. 1) of Device B retrieves the 2nd device icon data from 2nd Device Icon Data Storage Area 206B570*b*6*b* (S14). CPU 211 (FIG. 1) of Device B displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Unlock Log Data Displaying Software 206C570*c*5 of Device C, which display(s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device C retrieves all door unlock log IDs (e.g., Door Unlock Log#1 through #4) from Door Unlock Log Data Storage Area 206C570*b*7 (S2). CPU 211 (FIG. 1) of Device C displays the door unlock log IDs (e.g., Door Unlock Log#1 through #4) retrieved in the previous step on LCD 201 (FIG. 1) of Device C (S3). The user selects, by utilizing Input Device 210 (FIG. 1) or via voice recognition system, a door unlock log ID (e.g., Door Unlock Log#1) (S4). CPU 211 (FIG. 1) of Device C retrieves the door unlock log data (e.g., Door Unlock Log Data#1) corresponding to the door unlock log ID (e.g., Door Unlock Log#1) selected in the previous step from Door Unlock Log Data Storage Area 206C570*b*7 (S5). CPU 211 (FIG. 1) of Device C retrieves the door unlocked time data, the user code data, and the device code data (e.g., the 2nd device code data) from the door unlock log data (e.g., Door Unlock Log Data#1) retrieved in the previous step (S6). CPU 211 (FIG. 1) of Device C displays the door unlocked time data, the user code data, and the device code data (e.g., the 2nd device code data) retrieved in the previous step on LCD 201 (FIG. 1) of Device C (S7). CPU 211 (FIG. 1) of Device C retrieves the map data from Map Data Storage Area 206C570*b*5 (S8). CPU 211 (FIG. 1) of Device C displays the map data retrieved in the previous step on LCD 201 (FIG. 1) of Device C (S9). CPU 211 (FIG. 1) of Device C retrieves the 1st device location data from the door unlock log data (e.g., Door Unlock Log Data#1) retrieved in S5 (S10). CPU 211 (FIG. 1) of Device C retrieves the 1st device icon data from 1st Device Icon Data Storage Area 206C570*b*6*a* (S11). CPU 211 (FIG. 1) of Device C displays the 1st device icon data retrieved in the previous step at the location corresponding to the 1st device location data retrieved in S10 on the map data displayed in S9 (S12). CPU 211 (FIG. 1) of Device C retrieves the 2nd device location data from the door unlock log data (e.g., Door Unlock Log Data#1) retrieved in S5 (S13). CPU 211 (FIG. 1) of Device C retrieves the 2nd device icon data from 2nd Device Icon Data Storage Area 206C570*b*6*b* (S14). CPU 211 (FIG. 1) of Device C displays the 2nd device icon data retrieved in the previous step at the location corresponding to the 2nd device location data retrieved in S13 on the map data displayed in S9 (S15). Thus, the geographic locations of Device C and Device C are displayed on the map data simultaneously.

The following paragraphs illustrate another embodiment wherein Device A plays the major role in implementing the present function.

This paragraph illustrate(s) 1st Device Location Data Producing Software 206B570*c*1 of Device B, which produce(s) the 1st device location data. In this embodiment, CPU 211 (FIG. 1) of Device B identifies the current location of Device B (S1). CPU 211 (FIG. 1) of Device B produces the 1st device location data by referring to the current location identified in the previous step (S2). CPU 211 (FIG. 1) of Device B stores the 1st device location data produced in the previous step in 1st Device Location Data Storage Area 206B570*b*4*a* (S3). The foregoing sequence is repeated periodically.

This paragraph illustrate(s) 2nd Device Location Data Producing Software 206C570*c*2 of Device C, which produce(s) the 2nd device location data. In this embodiment, CPU 211 (FIG. 1) of Device C identifies the current location of Device C (S1). CPU 211 (FIG. 1) of Device C produces the 2nd device location data by referring to the current location identified in the previous step (S2). CPU 211 (FIG. 1) of Device C stores the 2nd device location data produced in the previous step in 2nd Device Location Data Storage Area 206C570*b*4*b* (S3). The foregoing sequence is repeated periodically.

This paragraph illustrate(s) Door Unlocking Software 206A570*c*3 of Device A, Door Unlocking Software 206B570*c*3 of Device B, and Door Unlocking Software 206C570*c*3 of Device C, which unlock(s) the door (not shown). Assuming that the door is unlocked by utilizing Device B. In this embodiment, the user inputs, by utilizing Input Device 210 (FIG. 1) or via voice recognition system, the door unlocking command (S1). Here, the door unlocking command is the command to unlock the door (not shown). CPU 211 (FIG. 1) of Device B retrieves the user code data from User Code Data Storage Area 206B570*b*1 and sends the data to Device A in a wireless fashion (S2). CPU 211 (FIG. 1) of Device A receives the user code data from Device B in a wireless fashion (S3). CPU 211 (FIG. 1) of Device B retrieves the 1st device code data from 1st Device Code Data Storage Area 206B570*b*2*a* and sends the data to Device A in a wireless fashion (S4). CPU 211 (FIG. 1) of Device A receives the 1st device code data from Device B in a wireless fashion (S5). CPU 211 (FIG. 1) of Device A retrieves the user code data from User Code Data Storage Area 206A570*b*1 (S6). If the user code data received in S3 and the user code data retrieved in the previous step matches, CPU 211 (FIG. 1) of Device A proceeds to the next step (S7). CPU 211 (FIG. 1) of Device A activates Door Unlocking Device DUD570 (S8). CPU 211 (FIG. 1) of Device A sends the 1st device location data transferring request to Device B in a wireless fashion (S9). Here, the 1st device location data transferring request is the request to transfer the 1st device location data. CPU 211 (FIG. 1) of Device B receives the 1st device location data transferring request from Device A in a wireless fashion (S10). CPU 211 (FIG. 1) of Device B retrieves the 1st device location data from 1st Device Location Data Storage Area 206B570*b*4*a* and sends the data to Device A in a wireless fashion (S11). CPU 211 (FIG. 1) of Device A receives the 1st device location data from Device B in a wireless fashion and stores the data in 1st Device Location Data Storage Area 206A570*b*4*a* (S12). CPU 211 (FIG. 1) of Device A sends the 2nd device location data transferring request to Device C in a wireless fashion (S13). Here, the 2nd device location data transferring request is the request to transfer the 2nd device location data. CPU 211 (FIG. 1) of Device C receives the 2nd device location data transferring request from Device A in a wireless fashion (S14). CPU 211 (FIG. 1) of Device C retrieves the 2nd device location data from 2nd Device Location Data Storage Area 206C570*b*4*b* and sends the data to Device A in a wireless fashion (S15). CPU 211 (FIG. 1) of Device A receives the 2nd device location data from Device C in a wireless fashion and stores the data in 2nd Device Location Data Storage Area 206A570*b*4*b* (S16). CPU 211 (FIG. 1) of Device A identifies the current time and date (S17). CPU 211 (FIG. 1) of Device A produces the door unlocked time data by utilizing the current time and date identified in the previous step (S18). CPU 211 (FIG. 1) of Device A produces the door unlock log data (e.g., Door Unlock Log Data#3) by utilizing the door unlocked time data produced in the previous step, the user code data received in S3, the 1st device code data received in S5, the 1st device location data received in S12, and the 2nd device location data received in S16 (S19). CPU 211 (FIG. 1) of Device A stores the door unlock log data (e.g., Door Unlock Log Data#3) produced in the previous step in Door Unlock Log Data Storage Area 206A570*b*7 (S20). CPU 211 (FIG. 1) of Device A retrieves the door unlocked message data from Door Unlocked Message Data Storage Area 206A570*b*3 (S21). CPU 211 (FIG. 1) of Device A displays the door unlocked message data retrieved in the previous step on LCD 201 (FIG. 1) of Device A (S22). CPU 211 (FIG. 1) of Device A sends the door unlocked notice to Device B in a wireless fashion (S23). Here, the door unlocked notice indicates that the door is unlocked. CPU 211 (FIG. 1) of Device B receives the door unlocked notice from Device A in a wireless fashion (S24). CPU 211 (FIG. 1) of Device B retrieves the door unlocked message data from Door Unlocked Message Data Storage Area 206B570*b*3 and displays the data on LCD 201 (FIG. 1) of Device B (S25). CPU 211 (FIG. 1) of Device A sends the door unlocked notice to Device C in a wireless fashion (S26). Here, the door unlocked notice indicates that the door is unlocked. CPU 211 (FIG. 1) of Device C receives the door unlocked notice from Device A in a wireless fashion (S27). CPU 211 (FIG. 1) of Device C retrieves the door unlocked message data from Door Unlocked Message Data Storage Area 206C570*b*3 and displays the data on LCD 201 (FIG. 1) of Device C (S28).

This paragraph illustrate(s) Door Unlocking Software 206A570*c*3 of Device A, Door Unlocking Software 206B570*c*3 of Device B, and Door Unlocking Software 206C570*c*3 of Device C, which unlock(s) the door (not shown). Assuming that the door is unlocked by utilizing Device C. In this embodiment, the user inputs, by utilizing Input Device 210 (FIG. 1) or via voice recognition system, the door unlocking command (S1). Here, the door unlocking command is the command to unlock the door (not shown). CPU 211 (FIG. 1) of Device C retrieves the user code data from User Code Data Storage Area 206C570*b*1 and sends the data to Device A in a wireless fashion (S2). CPU 211 (FIG. 1) of Device A receives the user code data from Device C in a wireless fashion (S3). CPU 211 (FIG. 1) of Device C retrieves the 2nd device code data from 2nd Device Code Data Storage Area 206C570*b*2*b* and sends the data to Device A in a wireless fashion (S4). CPU 211 (FIG. 1) of Device A receives the 2nd device code data from Device C in a wireless fashion (S5). CPU 211 (FIG. 1) of Device A retrieves the user code data from User Code Data Storage Area 206A570*b*1 (S6). If the user code data received in S3 and the user code data retrieved in the previous step matches, CPU 211 (FIG. 1) of Device A proceeds to the next step (S7). CPU 211 (FIG. 1) of Device A activates Door Unlocking Device DUD570 (S8). CPU 211 (FIG. 1) of Device A sends the 1st device location data transferring request to Device B in a wireless fashion (S9). Here, the 1st device location data transferring request is the request to transfer the 1st device location data. CPU 211 (FIG. 1) of Device B receives the 1st device location data transferring request from Device A in a wireless fashion (S10). CPU 211 (FIG. 1) of Device B retrieves the 1st device location data from 1st Device Location Data Storage Area 206B570*b*4*a* and sends the data to Device A in a wireless fashion (S11). CPU 211 (FIG. 1) of Device A receives the 1st device location data from Device B in a wireless fashion and stores the data in 1st Device Location Data Storage Area 206A570*b*4*a* (S12). CPU 211 (FIG. 1) of Device A sends the 2nd device location data transferring request to Device C in a wireless fashion (S13). Here, the 2nd device location data transferring request is the request to transfer the 2nd device location data. CPU 211 (FIG. 1) of Device C receives the 2nd device location data transferring request from Device A in a wireless fashion (S14). CPU 211 (FIG. 1) of Device C retrieves the 2nd device location data from 2nd Device Location Data Storage Area 206C570*b*4*b* and sends the data to Device A in a wireless fashion (S15). CPU 211 (FIG. 1) of Device A receives the 2nd device location data from Device C in a wireless fashion and stores the data in 2nd Device Location Data Storage Area 206A570*b*4*b* (S16). CPU 211 (FIG. 1) of Device A identifies the current time and date (S17). CPU 211 (FIG. 1) of Device A produces the door unlocked time data by utilizing the current time and date identified in the previous step (S18). CPU 211 (FIG. 1) of Device A produces the door unlock log data (e.g., Door Unlock Log Data#4) by utilizing the door unlocked time data produced in the previous step, the user code data received in S3, the 2nd device code data received in S5, the 1st device location data received in S12, and the 2nd device location data received in S16 (S19). CPU 211 (FIG. 1) of Device A stores the door unlock log data (e.g., Door Unlock Log Data#4) produced in the previous step in Door Unlock Log Data Storage Area 206A570*b*7 (S20). CPU 211 (FIG. 1) of Device A retrieves the door unlocked message data from Door Unlocked Message Data Storage Area 206A570*b*3 (S21). CPU 211 (FIG. 1) of Device A displays the door unlocked message data retrieved in the previous step on LCD 201 (FIG. 1) of Device A (S22). CPU 211 (FIG. 1) of Device A sends the door unlocked notice to Device B in a wireless fashion (S23). Here, the door unlocked notice indicates that the door is unlocked. CPU 211 (FIG. 1) of Device B receives the door unlocked notice from Device A in a wireless fashion (S24). CPU 211 (FIG. 1) of Device B retrieves the door unlocked message data from Door Unlocked Message Data Storage Area 206B570*b*3 and displays the data on LCD 201 (FIG. 1) of Device B (S25). CPU 211 (FIG. 1) of Device A sends the door unlocked notice to Device C in a wireless fashion (S26). Here, the door unlocked notice indicates that the door is unlocked. CPU 211 (FIG. 1) of Device C receives the door unlocked notice from Device A in a wireless fashion (S27). CPU 211 (FIG. 1) of Device C retrieves the door unlocked message data from Door Unlocked Message Data Storage Area 206C570*b*3 and displays the data on LCD 201 (FIG. 1) of Device C (S28).

This paragraph illustrate(s) Door Unlock Log Data Sharing Software 206A570*c*4 of Device A and Door Unlock Log Data Sharing Software 206B570*c*4 of Device B, which share(s) the door unlock log data. In this embodiment, CPU 211 (FIG. 1) of Device A retrieves all door unlock log data (e.g., Door Unlock Log Data#1 through #4) from Door Unlock Log Data Storage Area 206A570*b*7 and sends the data to Device B in a wireless fashion (S1). CPU 211 (FIG. 1) of Device B receives the door unlock log data (e.g., Door Unlock Log Data#1 through #4) from Device A in a wireless fashion and stores the data in Door Unlock Log Data Storage Area 206B570*b*7 (S2). The foregoing sequence is repeated periodically.

This paragraph illustrate(s) Door Unlock Log Data Sharing Software 206A570*c*4 of Device A and Door Unlock Log Data Sharing Software 206C570*c*4 of Device C, which share(s) the door unlock log data. In this embodiment, CPU 211 (FIG. 1) of Device A retrieves all door unlock log data (e.g., Door Unlock Log Data#1 through #4) from Door Unlock Log Data Storage Area 206A570*b*7 and sends the data to Device C in a wireless fashion (S1). CPU 211 (FIG. 1) of Device C receives the door unlock log data (e.g., Door Unlock Log Data#1 through #4) from Device A in a wireless fashion and stores the data in Door Unlock Log Data Storage Area 206C570*b*7 (S2). The foregoing sequence is repeated periodically.

This paragraph illustrate(s) Individual Unlock Log Data Displaying Software 206A570*c*5 of Device A, which display (s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device A retrieves all door unlock log IDs (e.g., Door Unlock Log#1 through #4) from Door Unlock Log Data Storage Area 206A570*b*7 (S2). CPU 211 (FIG. 1) of Device A displays the door unlock log IDs (e.g., Door Unlock Log#1 through #4) retrieved in the previous step on LCD 201 (FIG. 1) of Device A (S3). The user selects, by utilizing Input Device 210 (FIG. 1) or via voice recognition system, a door unlock log ID (e.g., Door Unlock Log#1) (S4). CPU 211 (FIG. 1) of Device A retrieves the door unlock log data (e.g., Door Unlock Log Data#1) corresponding to the door unlock log ID (e.g., Door Unlock Log#1) selected in the previous step from Door Unlock Log Data Storage Area 206A570*b*7 (S5). CPU 211 (FIG. 1) of Device A retrieves the door unlocked time data, the user code data, and the device code data (e.g., the 1st device code data) from the door unlock log data (e.g., Door Unlock Log Data#1) retrieved in the previous step (S6). CPU 211 (FIG. 1) of Device A displays the door unlocked time data, the user code data, and the device code data (e.g., the 1st device code data) retrieved in the previous step on LCD 201 (FIG. 1) of Device A (S7). CPU 211 (FIG. 1) of Device A retrieves the map data from Map Data Storage Area 206A570*b*5 (S8). CPU 211 (FIG. 1) of Device A displays the map data retrieved in the previous step on LCD 201 (FIG. 1) of Device A (S9). CPU 211 (FIG. 1) of Device A retrieves the 1st device location data from the door unlock log data (e.g., Door Unlock Log Data#1) retrieved in S5 (S10). CPU 211 (FIG. 1) of Device A retrieves the 1st device icon data from 1st Device Icon Data Storage Area 206A570*b*6*a* (S11). CPU 211 (FIG. 1) of Device A displays the 1st device icon data retrieved in the previous step at the location corresponding to the 1st device location data retrieved in S10 on the map data displayed in S9 (S12). CPU 211 (FIG. 1) of Device A retrieves the 2nd device location data from the door unlock log data (e.g., Door Unlock Log Data#1) retrieved in S5 (S13). CPU 211 (FIG. 1) of Device A retrieves the 2nd device icon data from 2nd Device Icon Data Storage Area 206A570*b*6*b* (S14). CPU 211 (FIG. 1) of Device A displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Unlock Log Data Displaying Software 206B570*c*5 of Device B, which display (s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device B retrieves all door unlock log IDs (e.g., Door Unlock Log#1 through #4) from Door Unlock Log Data Storage Area 206B570*b*7 (S2). CPU 211 (FIG. 1) of Device B displays the door unlock log IDs (e.g., Door Unlock Log#1 through #4) retrieved in the previous step on LCD 201 (FIG. 1) of Device B (S3). The user selects, by utilizing Input Device 210 (FIG. 1) or via voice recognition system, a door unlock log ID (e.g., Door Unlock Log#1) (S4). CPU 211 (FIG. 1) of Device B retrieves the door unlock log data (e.g., Door Unlock Log Data#1) corresponding to the door unlock log ID (e.g., Door Unlock Log#1) selected in the previous step from Door Unlock Log Data Storage Area 206B570*b*7 (S5). CPU 211 (FIG. 1) of Device B retrieves the door unlocked time data, the user code data, and the device code data (e.g., the 1st device code data) from the door unlock log data (e.g., Door Unlock Log Data#1) retrieved in the previous step (S6). CPU 211 (FIG. 1) of Device B displays the door unlocked time data, the user code data, and the device code data (e.g., the 1st device code data) retrieved in the previous step on LCD 201 (FIG. 1) of Device B (S7). CPU 211 (FIG. 1) of Device B retrieves the map data from Map Data Storage Area 206B570*b*5 (S8). CPU 211 (FIG. 1) of Device B displays the map data retrieved in the previous step on LCD 201 (FIG. 1) of Device B (S9). CPU 211 (FIG. 1) of Device B retrieves the 1st device location data from the door unlock log data (e.g., Door Unlock Log Data#1) retrieved in S5 (S10). CPU 211 (FIG. 1) of Device B retrieves the 1st device icon data from 1st Device Icon Data Storage Area 206B570*b*6*a* (S11). CPU 211 (FIG. 1) of Device B displays the 1st device icon data retrieved in the previous step at the location corresponding to the 1st device location data retrieved in S10 on the map data displayed in S9 (S12). CPU 211 (FIG. 1) of Device B retrieves the 2nd device location data from the door unlock log data (e.g., Door Unlock Log Data#1) retrieved in S5 (S13). CPU 211 (FIG. 1) of Device B retrieves the 2nd device icon data from 2nd Device Icon Data Storage Area 206B570*b*6*b* (S14). CPU 211 (FIG. 1) of Device B displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Unlock Log Data Displaying Software 206C570*c*5 of Device C, which display (s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device C retrieves all door unlock log IDs (e.g., Door Unlock Log#1 through #4) from Door Unlock Log Data Storage Area 206C570*b*7 (S2). CPU 211 (FIG. 1) of Device C displays the door unlock log IDs (e.g., Door Unlock Log#1 through #4) retrieved in the previous step on LCD 201 (FIG. 1) of Device C (S3). The user selects, by utilizing Input Device 210 (FIG. 1) or via voice recognition system, a door unlock log ID (e.g., Door Unlock Log#1) (S4). CPU 211 (FIG. 1) of Device C retrieves the door unlock log data (e.g., Door Unlock Log Data#1) corresponding to the door unlock log ID (e.g., Door Unlock Log#1) selected in the previous step from Door Unlock Log Data Storage Area 206C570b7 (S5). CPU 211 (FIG. 1) of Device C retrieves the door unlocked time data, the user code data, and the device code data (e.g., the 2nd device code data) from the door unlock log data (e.g., Door Unlock Log Data#1) retrieved in the previous step (S6). CPU 211 (FIG. 1) of Device C displays the door unlocked time data, the user code data, and the device code data (e.g., the 2nd device code data) retrieved in the previous step on LCD 201 (FIG. 1) of Device C (S7). CPU 211 (FIG. 1) of Device C retrieves the map data from Map Data Storage Area 206C570b5 (S8). CPU 211 (FIG. 1) of Device C displays the map data retrieved in the previous step on LCD 201 (FIG. 1) of Device C (S9). CPU 211 (FIG. 1) of Device C retrieves the 1st device location data from the door unlock log data (e.g., Door Unlock Log Data#1) retrieved in S5 (S10). CPU 211 (FIG. 1) of Device C retrieves the 1st device icon data from 1st Device Icon Data Storage Area 206C570b6a (S11). CPU 211 (FIG. 1) of Device C displays the 1st device icon data retrieved in the previous step at the location corresponding to the 1st device location data retrieved in S10 on the map data displayed in S9 (S12). CPU 211 (FIG. 1) of Device C retrieves the 2nd device location data from the door unlock log data (e.g., Door Unlock Log Data#1) retrieved in S5 (S13). CPU 211 (FIG. 1) of Device C retrieves the 2nd device icon data from 2nd Device Icon Data Storage Area 206C570b6b (S14). CPU 211 (FIG. 1) of Device C displays the 2nd device icon data retrieved in the previous step at the location corresponding to the 2nd device location data retrieved in S13 on the map data displayed in S9 (S15). Thus, the geographic locations of Device C and Device C are displayed on the map data simultaneously.

The following paragraphs illustrate another embodiment wherein Host H and Device B play the major role in implementing the present function.

This paragraph illustrate(s) 1st Device Location Data Producing Software H570c1 of Host H and 1st Device Location Data Producing Software 206B570c1 of Device B, which produce(s) the 1st device location data. In this embodiment, CPU 211 (FIG. 1) of Device B identifies the current location of Device B (S1). CPU 211 (FIG. 1) of Device B produces the 1st device location data by referring to the current location identified in the previous step and sends the data to Host H in a wireless fashion (S2). Host H receives the 1st device location data from Device B and stores the data in 1st Device Location Data Storage Area H570b4a (S3). The foregoing sequence is repeated periodically.

This paragraph illustrate(s) 2nd Device Location Data Producing Software 206C570c2 of Device C, which produce(s) the 2nd device location data. In this embodiment, CPU 211 (FIG. 1) of Device C identifies the current location of Device C (S1). CPU 211 (FIG. 1) of Device C produces the 2nd device location data by referring to the current location identified in the previous step (S2). CPU 211 (FIG. 1) of Device C stores the 2nd device location data produced in the previous step in 2nd Device Location Data Storage Area 206C570b4b (S3). The foregoing sequence is repeated periodically.

This paragraph illustrate(s) Door Unlocking Software H570c3 of Host H, Door Unlocking Software 206A570c3 of Device A, Door Unlocking Software 206B570c3 of Device B, and Door Unlocking Software 206C570c3 of Device C, which unlock(s) the door (not shown). Assuming that the door is unlocked by utilizing the Host H. In this embodiment, the user inputs, by utilizing Input Device 210 (FIG. 1) or via voice recognition system, the door unlocking command (S1). Here, the door unlocking command is the command to unlock the door (not shown). CPU 211 (FIG. 1) of Device B sends the door unlocking command input in the previous step to Host H in a wireless fashion (S2). Host H receives the door unlocking command from Device B (S3). Host H retrieves the user code data from User Code Data Storage Area H570b1 and sends the data to Device A (S4). CPU 211 (FIG. 1) of Device A receives the user code data from Host H in a wireless fashion (S5). Host H retrieves the 1st device code data from 1st Device Code Data Storage Area H570b2a and sends the data to Device A (S6). CPU 211 (FIG. 1) of Device A receives the 1st device code data from Host H in a wireless fashion (S7). CPU 211 (FIG. 1) of Device A retrieves the user code data from User Code Data Storage Area 206A570b1 (S8). If the user code data received in S5 and the user code data retrieved in the previous step matches, CPU 211 (FIG. 1) of Device A proceeds to the next step (S9). CPU 211 (FIG. 1) of Device A activates Door Unlocking Device DUD570 (S10). CPU 211 (FIG. 1) of Device A sends the 1st device location data transferring request to Host H in a wireless fashion (S11). Here, the 1st device location data transferring request is the request to transfer the 1st device location data. CPU 211 (FIG. 1) of Device B receives the 1st device location data transferring request from Device A (S12). CPU 211 (FIG. 1) of Device B retrieves the 1st device location data from 1st Device Location Data Storage Area H570b4a and sends the data to Device A (S13). CPU 211 (FIG. 1) of Device A receives the 1st device location data from Host H in a wireless fashion and stores the data in 1st Device Location Data Storage Area 206A570b4a (S14). CPU 211 (FIG. 1) of Device A sends the 2nd device location data transferring request to Device C in a wireless fashion (S15). Here, the 2nd device location data transferring request is the request to transfer the 2nd device location data. CPU 211 (FIG. 1) of Device C receives the 2nd device location data transferring request from Device A (S16). CPU 211 (FIG. 1) of Device C retrieves the 2nd device location data from 2nd Device Location Data Storage Area 206C570b4b and sends the data to Device A in a wireless fashion (S17). CPU 211 (FIG. 1) of Device A receives the 2nd device location data from Device C in a wireless fashion and stores the data in 2nd Device Location Data Storage Area 206A570b4b (S18). CPU 211 (FIG. 1) of Device A identifies the current time and date (S19). CPU 211 (FIG. 1) of Device A produces the door unlocked time data by utilizing the current time and date identified in the previous step (S20). CPU 211 (FIG. 1) of Device A produces the door unlock log data (e.g., Door Unlock Log Data#3) by utilizing the door unlocked time data produced in the previous step, the user code data received in S5, the 1st device code data received in S7, the 1st device location data received in S14, and the 2nd device location data received in S18 (S21). CPU 211 (FIG. 1) of Device A stores the door unlock log data (e.g., Door Unlock Log Data#3) produced in the previous step in Door Unlock Log Data Storage Area 206A570b7 (S22). CPU 211 (FIG. 1) of Device A retrieves the door unlocked message data from Door Unlocked Message Data Storage Area 206A570b3 and displays the data on LCD 201 (FIG. 1) of Device A (S23). CPU 211 (FIG. 1) of Device A sends the door unlocked notice to Host H in a wireless fashion (S24). Here, the door unlocked notice indicates that the door is unlocked. Host H receives the door unlocked notice from Device A (S25). Host H retrieves the door unlocked message data from Door Unlocked Message Data Storage Area H570b3 and sends the data to Device B (S26). CPU 211 (FIG. 1) of Device B receives the door unlocked message data from Host H in a wireless fashion and displays the data on LCD 201 (FIG. 1) of Device B (S27). CPU 211 (FIG. 1) of Device A sends the door unlocked notice to Device C in a wireless fashion (S28). Here, the door unlocked notice indicates that the door is unlocked. CPU 211 (FIG. 1) of Device C receives the door unlocked notice from Device A in a wireless fashion (S29). CPU 211 (FIG. 1) of Device C retrieves the door unlocked message data from Door Unlocked Message Data Storage Area 206C570b3 and displays the data on LCD 201 (FIG. 1) of Device C (S30).

This paragraph illustrate(s) Door Unlocking Software H570c3 of Host H, Door Unlocking Software 206A570c3 of Device A, Door Unlocking Software 206B570c3 of Device B, and Door Unlocking Software 206C570c3 of Device C, which unlock(s) the door (not shown). Assuming that the door is unlocked by utilizing Device C. In this embodiment, the user inputs, by utilizing Input Device 210 (FIG. 1) or via voice recognition system, the door unlocking command (S1). Here, the door unlocking command is the command to unlock the door (not shown). CPU 211 (FIG. 1) of Device C retrieves the user code data from User Code Data Storage Area 206C570b1 and sends the data to Device A in a wireless fashion (S2). CPU 211 (FIG. 1) of Device A receives the user code data from Device C in a wireless fashion (S3). CPU 211 (FIG. 1) of Device C retrieves the 2nd device code data from 2nd Device Code Data Storage Area 206C570b2b and sends the data to Device A in a wireless fashion (S4). CPU 211 (FIG. 1) of Device A receives the 2nd device code data from Device C in a wireless fashion (S5). CPU 211 (FIG. 1) of Device A retrieves the user code data from User Code Data Storage Area 206A570b1 (S6). If the user code data received in S3 and the user code data retrieved in the previous step matches, CPU 211 (FIG. 1) of Device A proceeds to the next step (S7). CPU 211 (FIG. 1) of Device A activates Door Unlocking Device DUD570 (S8). CPU 211 (FIG. 1) of Device A sends the 1st device location data transferring request to Host H in a wireless fashion (S9). Here, the 1st device location data transferring request is the request to transfer the 1st device location data. Host H receives the 1st device location data transferring request from Device A (S10). Host H retrieves the 1st device location data from 1st Device Location Data Storage Area H570b4a and sends the data to Device A (S11). CPU 211 (FIG. 1) of Device A receives the 1st device location data from Host H in a wireless fashion and stores the data in 1st Device Location Data Storage Area 206A570b4a (S12). CPU 211 (FIG. 1) of Device A sends the 2nd device location data transferring request to Device C in a wireless fashion (S13). Here, the 2nd device location data transferring request is the request to transfer the 2nd device location data. CPU 211 (FIG. 1) of Device C receives the 2nd device location data transferring request from Device A in a wireless fashion (S14). CPU 211 (FIG. 1) of Device C retrieves the 2nd device location data from 2nd Device Location Data Storage Area 206C570b4b and sends the data to Device A in a wireless fashion (S15). CPU 211 (FIG. 1) of Device A receives the 2nd device location data from Device C in a wireless fashion and stores the data in 2nd Device Location Data Storage Area 206A570b4b (S16). CPU 211 (FIG. 1) of Device A identifies the current time and date (S17). CPU 211 (FIG. 1) of Device A produces the door unlocked time data by utilizing the current time and date identified in the previous step (S18). CPU 211 (FIG. 1) of Device A produces the door unlock log data (e.g., Door Unlock Log Data#4) by utilizing the door unlocked time data produced in the previous step, the user code data received in S3, the 2nd device code data received in S5, the 1st device location data received in S12, and the 2nd device location data received in S16 (S19). CPU 211 (FIG. 1) of Device A stores the door unlock log data (e.g., Door Unlock Log Data#4) produced in the previous step in Door Unlock Log Data Storage Area 206A570b7 (S20). CPU 211 (FIG. 1) of Device A retrieves the door unlocked message data from Door Unlocked Message Data Storage Area 206A570b3 and displays the data on LCD 201 (FIG. 1) of Device A (S21). CPU 211 (FIG. 1) of Device A sends the door unlocked notice to Host H in a wireless fashion (S22). Here, the door unlocked notice indicates that the door is unlocked. Host H receives the door unlocked notice from Device A (S23). Host H retrieves the door unlocked message data from Door Unlocked Message Data Storage Area H570b3 and sends the data to Device B (S24). CPU 211 (FIG. 1) of Device B receives the door unlocked message data from Host H in a wireless fashion and displays the data on LCD 201 (FIG. 1) of Device B (S25). CPU 211 (FIG. 1) of Device A sends the door unlocked notice to Device C in a wireless fashion (S26). Here, the door unlocked notice indicates that the door is unlocked. CPU 211 (FIG. 1) of Device C receives the door unlocked notice from Device A in a wireless fashion (S27). CPU 211 (FIG. 1) of Device C retrieves the door unlocked message data from Door Unlocked Message Data Storage Area 206C570b3 and displays the data on LCD 201 (FIG. 1) of Device C (S28).

This paragraph illustrate(s) Door Unlock Log Data Sharing Software H570c4 of Host H and Door Unlock Log Data Sharing Software 206A570c4 of Device A, which share(s) the door unlock log data. In this embodiment, CPU 211 (FIG. 1) of Device A retrieves all door unlock log data (e.g., Door Unlock Log Data#1 through #4) from Door Unlock Log Data Storage Area 206A570b7 and sends the data to Host H in a wireless fashion (S1). Host H receives the door unlock log data (e.g., Door Unlock Log Data#1 through #4) from Device A and stores the data in Door Unlock Log Data Storage Area H570b7 (S2). The foregoing sequence is repeated periodically.

This paragraph illustrate(s) Door Unlock Log Data Sharing Software 206A570c4 of Device A and Door Unlock Log Data Sharing Software 206C570c4 of Device C, which share(s) the door unlock log data. In this embodiment, CPU 211 (FIG. 1) of Device A retrieves all door unlock log data (e.g., Door Unlock Log Data#1 through #4) from Door Unlock Log Data Storage Area 206A570b7 and sends the data to Device C in a wireless fashion (S1). CPU 211 (FIG. 1) of Device C receives the door unlock log data (e.g., Door Unlock Log Data#1 through #4) from Device A and stores the data in Door Unlock Log Data Storage Area 206C570b7 (S2). The foregoing sequence is repeated periodically.

This paragraph illustrate(s) Individual Unlock Log Data Displaying Software 206A570c5 of Device A, which display (s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device A retrieves all door unlock log IDs (e.g., Door Unlock Log#1 through #4) from Door Unlock Log Data Storage Area 206A570b7 (S2). CPU 211 (FIG. 1) of Device A displays the door unlock log IDs (e.g., Door Unlock Log#1 through #4) retrieved in the previous step on LCD 201 (FIG. 1) of Device A (S3). The user selects, by utilizing Input Device 210 (FIG. 1) or via voice recognition system, a door unlock log ID (e.g., Door Unlock Log#1) (S4). CPU 211 (FIG. 1) of Device A retrieves the door unlock log data (e.g., Door Unlock Log Data#1) corresponding to the door unlock log ID (e.g., Door Unlock Log#1) selected in the previous step from Door Unlock Log Data Storage Area 206A570*b*7 (S5). CPU 211 (FIG. 1) of Device A retrieves the door unlocked time data, the user code data, and the device code data (e.g., the 1st device code data) from the door unlock log data (e.g., Door Unlock Log Data#1) retrieved in the previous step (S6). CPU 211 (FIG. 1) of Device A displays the door unlocked time data, the user code data, and the device code data (e.g., the 1st device code data) retrieved in the previous step on LCD 201 (FIG. 1) of Device A (S7). CPU 211 (FIG. 1) of Device A retrieves the map data from Map Data Storage Area 206A570*b*5 (S8). CPU 211 (FIG. 1) of Device A displays the map data retrieved in the previous step on LCD 201 (FIG. 1) of Device A (S9). CPU 211 (FIG. 1) of Device A retrieves the 1st device location data from the door unlock log data (e.g., Door Unlock Log Data#1) retrieved in S5 (S10). CPU 211 (FIG. 1) of Device A retrieves the 1st device icon data from 1st Device Icon Data Storage Area 206A570*b*6*a* (S11). CPU 211 (FIG. 1) of Device A displays the 1st device icon data retrieved in the previous step at the location corresponding to the 1st device location data retrieved in S10 on the map data displayed in S9 (S12). CPU 211 (FIG. 1) of Device A retrieves the 2nd device location data from the door unlock log data (e.g., Door Unlock Log Data#1) retrieved in S5 (S13). CPU 211 (FIG. 1) of Device A retrieves the 2nd device icon data from 2nd Device Icon Data Storage Area 206A570*b*6*b* (S14). CPU 211 (FIG. 1) of Device A displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Unlock Log Data Displaying Software H570*c*5 of Host H and Individual Unlock Log Data Displaying Software 206B570*c*5 of Device B, which display(s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device B sends the door unlock log data displaying command input in the previous step to Host H in a wireless fashion (S2). Host H receives the door unlock log data displaying command from Device B (S3). Host H retrieves all door unlock log IDs (e.g., Door Unlock Log#1 through #4) from Door Unlock Log Data Storage Area H570*b*7 and sends the data to Device B (S4). CPU 211 (FIG. 1) of Device B receives the door unlock log IDs (e.g., Door Unlock Log#1 through #4) from Host H in a wireless fashion and displays the data on LCD 201 (FIG. 1) of Device B (S5). The user selects, by utilizing Input Device 210 (FIG. 1) or via voice recognition system, a door unlock log ID (e.g., Door Unlock Log#1) (S6). CPU 211 (FIG. 1) of Device B sends the door unlock log ID (e.g., Door Unlock Log#1) selected in the previous step to Host H in a wireless fashion (S7). Host H receives the door unlock log ID (e.g., Door Unlock Log#1) from Device B (S8). Host H retrieves the door unlock log data (e.g., Door Unlock Log Data#1) corresponding to the door unlock log ID (e.g., Door Unlock Log#1) received in the previous step from Door Unlock Log Data Storage Area H570*b*7 (S9). Host H retrieves the door unlocked time data, the user code data, and the device code data (e.g., the 1st device code data) from the door unlock log data (e.g., Door Unlock Log Data#1) retrieved in the previous step and sends the data to Device B (S10). CPU 211 (FIG. 1) of Device B receives the door unlocked time data, the user code data, and the device code data (e.g., the 1st device code data) from Host H in a wireless fashion and displays the data on LCD 201 (FIG. 1) of Device B (S11). Host H retrieves the map data from Map Data Storage Area H570*b*5 and sends the data to Device B (S12). CPU 211 (FIG. 1) of Device B receives the map data from Host H in a wireless fashion and displays the data on LCD 201 (FIG. 1) of Device B (S13). Host H retrieves the 1st device location data from the door unlock log data (e.g., Door Unlock Log Data#1) retrieved in S9 and sends the data to Device B (S14). CPU 211 (FIG. 1) of Device B receives the 1st device location data from Host H in a wireless fashion (S15). Host H retrieves the 1st device icon data from 1st Device Icon Data Storage Area H570*b*6*a* and sends the data to Device B (S16). CPU 211 (FIG. 1) of Device B receives the 1st device icon data from Host H in a wireless fashion (S17). CPU 211 (FIG. 1) of Device B displays the 1st device icon data received in the previous step at the location corresponding to the 1st device location data received in S15 on the map data displayed in S13 (S18). Host H retrieves the 2nd device location data from the door unlock log data (e.g., Door Unlock Log Data#1) retrieved in S9 and sends the data to Device B (S19). CPU 211 (FIG. 1) of Device B receives the 2nd device location data from Host H in a wireless fashion (S20). Host H retrieves the 2nd device icon data from 2nd Device Icon Data Storage Area H570*b*6*b* and sends the data to Device B (S21). CPU 211 (FIG. 1) of Device B receives the 2nd device icon data from Host H in a wireless fashion (S22). CPU 211 (FIG. 1) of Device B displays the 2nd device icon data received in the previous step at the location corresponding to the 2nd device location data received in S20 on the map data displayed in S13 (S23). Thus, the geographic locations of Device B and Device C are displayed on the map data simultaneously.

This paragraph illustrate(s) Individual Unlock Log Data Displaying Software 206C570*c*5 of Device C, which display(s) the door unlock log data individually. In this embodiment, the user inputs, by utilizing Input Device 210 (FIG. 1) or via voice recognition system, the door unlock log data displaying command (S1). Here, the door unlock log data displaying command is the command to display the door unlock log data. CPU 211 (FIG. 1) of Device C retrieves all door unlock log IDs (e.g., Door Unlock Log#1 through #4) from Door Unlock Log Data Storage Area 206C570*b*7 (S2). CPU 211 (FIG. 1) of Device C displays the door unlock log IDs (e.g., Door Unlock Log#1 through #4) retrieved in the previous step on LCD 201 (FIG. 1) of Device C (S3). The user selects, by utilizing Input Device 210 (FIG. 1) or via voice recognition system, a door unlock log ID (e.g., Door Unlock Log#1) (S4). CPU 211 (FIG. 1) of Device C retrieves the door unlock log data (e.g., Door Unlock Log Data#1) corresponding to the door unlock log ID (e.g., Door Unlock Log#1) selected in the previous step from Door Unlock Log Data Storage Area 206C570*b*7 (S5). CPU 211 (FIG. 1) of Device C retrieves the door unlocked time data, the user code data, and the device code data (e.g., the 2nd device code data) from the door unlock log data (e.g., Door Unlock Log Data#1) retrieved in the previous step (S6). CPU 211 (FIG. 1) of Device C displays the door unlocked time data, the user code data, and the device code data (e.g., the 2nd device code data) retrieved in the previous step on LCD 201 (FIG. 1) of Device C (S7). CPU 211 (FIG. 1) of Device C retrieves the map data from Map Data Storage Area 206C570*b*5 (S8). CPU 211 (FIG. 1) of Device C displays the map data retrieved in the previous step on LCD 201 (FIG. 1) of Device C (S9). CPU 211 (FIG. 1) of Device C retrieves the 1st device location data from the door unlock log data (e.g., Door Unlock Log Data#1) retrieved in S5 (S10). CPU 211 (FIG. 1) of Device C retrieves the 1st device icon data from 1st Device Icon Data Storage Area 206C570*b*6*a* (S11). CPU 211 (FIG. 1) of Device C displays the 1st device icon data retrieved in the previous step at the location corresponding to the 1st device location data retrieved in S10 on the map data displayed in S9 (S12). CPU 211 (FIG. 1) of Device C retrieves the 2nd device location data from the door unlock log data (e.g., Door Unlock Log Data#1) retrieved in S5 (S13). CPU 211 (FIG. 1) of Device C retrieves the 2nd device icon data from 2nd Device Icon Data Storage Area 206C570b6b (S14). CPU 211 (FIG. 1) of Device C displays the 2nd device icon data retrieved in the previous step at the location corresponding to the 2nd device location data retrieved in S13 on the map data displayed in S9 (S15). Thus, the geographic locations of Device C and Device C are displayed on the map data simultaneously.

<<Multiple Device Door Locking Function>>

The following paragraphs illustrate the multiple device door locking function, wherein a door is capable to be locked by Device A and Device B. When the door is locked by Device A, the door locked message is displayed on Device A. Further, the door locked message is displayed on Device B. The door locking log is capable to be displayed on Device A, wherein the door locking log includes the time and date at which the door is locked and the identification of the device which locked the door. The door locking log is also capable to be displayed on Device B. The location data indicating the geographic locations of Device A and Device B at which the door is locked are displayed on Device A. The location data indicating the geographic locations of Device A and Device B at which the door is locked are also displayed on Device B. Here, each of Device A and Device B is Communication Device 200. The door (not shown) may be any type of door included in an artificial structure or carrier. Here, the artificial structure may be a house or building, and the carrier may be any type of carrier or transportation system designed to carry passenger(s), such as airplane, automobile, motorcycle, railway train, taxi, bus, space ship, and space station.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Device C, another Communication Device 200, is connected to Network NT (e.g., the Internet) in a wireless fashion. Host H, Device A, Device B, and Device C are capable to communicate with each other via Network NT (e.g., the Internet) to implement the present function. Device A, Device B, and Device C are also capable to communicate with each other directly to implement the present function. Assuming that Device A is installed in a door (not shown), and the lock of the door is capable to be locked by Device B and Device C. Assuming further that Device B and Device C are owned by the same user.

This paragraph illustrates the major element utilized to implement the present function. In this embodiment, Door Locking Device DLD571 is connected to Data Bus 203 (FIG. 1) of Device A. Door Locking Device DLD571 is the device which locks the door (not shown). The door is locked when Door Locking Device DLD571 is activated.

This paragraph illustrates the storage area included in Host H. In this embodiment, Host H includes Multiple Device Door Locking Information Storage Area H571a of which the data and the software program(s) stored therein are described hereinafter.

This paragraph illustrates the storage area(s) included in Multiple Device Door Locking Information Storage Area H571a. In this embodiment, Multiple Device Door Locking Information Storage Area H571a includes Multiple Device Door Locking Data Storage Area H571b and Multiple Device Door Locking Software Storage Area H571c. Multiple Device Door Locking Data Storage Area H571b stores the data necessary to implement the present function on the side of Host H, such as the one(s) described hereinafter. Multiple Device Door Locking Software Storage Area H571c stores the software program(s) necessary to implement the present function on the side of Host H, such as the one(s) described hereinafter.

This paragraph illustrates the storage area(s) included in Multiple Device Door Locking Data Storage Area H571b. In this embodiment, Multiple Device Door Locking Data Storage Area H571b includes User Code Data Storage Area H571b1, All Device Code Data Storage Area H571b2, Door Locked Message Data Storage Area H571b3, All Device Location Data Storage Area H571b4, Map Data Storage Area H571b5, All Device Icon Data Storage Area H571b6, Door Lock Log Data Storage Area H571b7, and Work Area H571a8. User Code Data Storage Area H571b1 stores the user code data which is the code unique to the common user of both Device B and Device C. All Device Code Data Storage Area H571b2 stores the data described hereinafter. Door Locked Message Data Storage Area H571b3 stores the door locked message data which is the message indicating that the door is locked. All Device Location Data Storage Area H571b4 stores the data described hereinafter. Map Data Storage Area H571b5 stores the map data which is the image data indicating a map. All Device Icon Data Storage Area H571b6 stores the data described hereinafter. Door Lock Log Data Storage Area H571b7 stores the data described hereinafter. Work Area H571a8 is utilized as a work area to perform calculation and temporarily store data.

This paragraph illustrates the storage area(s) included in All Device Code Data Storage Area H571b2. In this embodiment, All Device Code Data Storage Area H571b2 includes 1st Device Code Data Storage Area H571b2a and 2nd Device Code Data Storage Area H571b2b. 1st Device Code Data Storage Area H571b2a stores the 1st device code data which indicates the code unique to Device B. 2nd Device Code Data Storage Area H571b2b stores the 2nd device code data which indicates the code unique to Device C.

This paragraph illustrates the storage area(s) included in All Device Location Data Storage Area H571b4. In this embodiment, All Device Location Data Storage Area H571b4 includes 1st Device Location Data Storage Area H571b4a and 2nd Device Location Data Storage Area H571b4b. 1st Device Location Data Storage Area H571b4a stores the 1st device location data which indicates the current geographic location of Device B in (x,y,z) format. 2nd Device Location Data Storage Area H571b4b stores the 2nd device location data which indicates the current geographic location of Device C in (x,y,z) format.

This paragraph illustrates the storage area(s) included in All Device Icon Data Storage Area H571b6. In this embodiment, All Device Icon Data Storage Area H571b6 includes 1st Device Icon Data Storage Area H571b6a and 2nd Device Icon Data Storage Area H571b6b. 1st Device Icon Data Storage Area H571b6a stores the 1st device icon data which is the image of the icon utilized to indicate the geographic location of Device B on the map data. 2nd Device Icon Data Storage Area H571b6b stores the 2nd device icon data which is the image of the icon utilized to indicate the geographic location of Device C on the map data.

This paragraph illustrates the data stored in Door Lock Log Data Storage Area H571b7. In this embodiment, Door Lock Log Data Storage Area H571b7 comprises two columns, i.e., 'Door Lock Log ID' and 'Door Lock Log Data'. Column 'Door Lock Log ID' stores the door lock log IDs, and each door lock log ID is an identification of the corresponding door lock log data stored in column 'Door Lock Log Data'. Column 'Door Lock Log Data' stores the door lock log data, and each door lock log data is the log of locking the door. In this embodiment, Door Lock Log Data Storage Area H571b7 stores the following data: Door Lock Log#1' and the corresponding 'Door Lock Log Data#1'; Door Lock Log#2' and the corresponding 'Door Lock Log Data#2'; Door Lock Log#3' and the corresponding 'Door Lock Log Data#3'; and Door Lock Log#4' and the corresponding 'Door Lock Log Data#4'. Each of the door lock log data includes the door locked time data which indicates the time and date at which the door is locked, the device code data (either the 1st device code data or the 2nd device code data) by which the door is locked, and the 1st device location data and the 2nd device location data at the time the door is locked.

This paragraph illustrates the software program(s) stored in Multiple Device Door Locking Software Storage Area H571c. In this embodiment, Multiple Device Door Locking Software Storage Area H571c stores 1st Device Location Data Producing Software H571c1, Door Locking Software H571c3, Door Lock Log Data Sharing Software H571c4, and Individual Lock Log Data Displaying Software H571c5. 1st Device Location Data Producing Software H571c1 is the software program described hereinafter. Door Locking Software H571c3 is the software program described hereinafter. Door Lock Log Data Sharing Software H571c4 is the software program described hereinafter. Individual Lock Log Data Displaying Software H571c5 is the software program described hereinafter.

This paragraph illustrates the storage area included in RAM 206 (FIG. 1) of Device A. In this embodiment, RAM 206 includes Multiple Device Door Locking Information Storage Area 206A571a of which the data and the software program(s) stored therein are described hereinafter.

The data and/or the software program(s) necessary to implement the present function may be downloaded from Host H to Device A.

This paragraph illustrates the storage area(s) included in Multiple Device Door Locking Information Storage Area 206A571a. In this embodiment, Multiple Device Door Locking Information Storage Area 206A571a includes Multiple Device Door Locking Data Storage Area 206A571b and Multiple Device Door Locking Software Storage Area 206A571c. Multiple Device Door Locking Data Storage Area 206A571b stores the data necessary to implement the present function on the side of Device A, such as the one(s) described hereinafter. Multiple Device Door Locking Software Storage Area 206A571c stores the software program(s) necessary to implement the present function on the side of Device A, such as the one(s) described hereinafter.

This paragraph illustrates the storage area(s) included in Multiple Device Door Locking Data Storage Area 206A571b. In this embodiment, Multiple Device Door Locking Data Storage Area 206A571b includes User Code Data Storage Area 206A571b1, All Device Code Data Storage Area 206A571b2, Door Locked Message Data Storage Area 206A571b3, All Device Location Data Storage Area 206A571b4, Map Data Storage Area 206A571b5, All Device Icon Data Storage Area 206A571b6, Door Lock Log Data Storage Area 206A571b7, and Work Area 206A571a8. User Code Data Storage Area 206A571b1 stores the user code data which is the code unique to the common user of both Device B and Device C. All Device Code Data Storage Area 206A571b2 stores the data described hereinafter. Door Locked Message Data Storage Area 206A571b3 stores the door locked message data which is the message indicating that the door is locked. All Device Location Data Storage Area 206A571b4 stores the data described hereinafter. Map Data Storage Area 206A571b5 stores the map data which is the image data indicating a map. All Device Icon Data Storage Area 206A571b6 stores the data described hereinafter. Door Lock Log Data Storage Area 206A571b7 stores the data described hereinafter. Work Area 206A571a8 is utilized as a work area to perform calculation and temporarily store data.

This paragraph illustrates the storage area(s) included in All Device Code Data Storage Area 206A571b2. In this embodiment, All Device Code Data Storage Area 206A571b2 includes 1st Device Code Data Storage Area 206A571b2a and 2nd Device Code Data Storage Area 206A571b2b. 1st Device Code Data Storage Area 206A571b2a stores the 1st device code data which indicates the code unique to Device B. 2nd Device Code Data Storage Area 206A571b2b stores the 2nd device code data which indicates the code unique to Device C.

This paragraph illustrates the storage area(s) included in All Device Location Data Storage Area 206A571b4. In this embodiment, All Device Location Data Storage Area 206A571b4 includes 1st Device Location Data Storage Area 206A571b4a and 2nd Device Location Data Storage Area 206A571b4b. 1st Device Location Data Storage Area 206A571b4a stores the 1st device location data which indicates the current geographic location of Device B in (x,y,z) format. 2nd Device Location Data Storage Area 206A571b4b stores the 2nd device location data which indicates the current geographic location of Device C in (x,y,z) format.

This paragraph illustrates the storage area(s) included in All Device Icon Data Storage Area 206A571b6. In this embodiment, All Device Icon Data Storage Area 206A571b6 includes 1st Device Icon Data Storage Area 206A571b6a and 2nd Device Icon Data Storage Area 206A571b6b. 1st Device Icon Data Storage Area 206A571b6a stores the 1st device icon data which is the image of the icon utilized to indicate the geographic location of Device B on the map data. 2nd Device Icon Data Storage Area 206A571b6b stores the 2nd device icon data which is the image of the icon utilized to indicate the geographic location of Device C on the map data.

This paragraph illustrates the data stored in Door Lock Log Data Storage Area 206A571b7. In this embodiment, Door Lock Log Data Storage Area 206A571b7 comprises two columns, i.e., 'Door Lock Log ID' and 'Door Lock Log Data'. Column 'Door Lock Log ID' stores the door lock log IDs, and each door lock log ID is an identification of the corresponding door lock log data stored in column 'Door Lock Log Data'. Column 'Door Lock Log Data' stores the door lock log data, and each door lock log data is the log of locking the door. In this embodiment, Door Lock Log Data Storage Area 206A571b7 stores the following data: Door Lock Log#1' and the corresponding 'Door Lock Log Data#1'; Door Lock Log#2' and the corresponding 'Door Lock Log Data#2'; Door Lock Log#3' and the corresponding 'Door Lock Log Data#3'; and Door Lock Log#4' and the corresponding 'Door Lock Log Data#4'. Each of the door lock log data includes the door locked time data which indicates the time and date at which the door is locked, the device code data (either the 1st device code data or the 2nd device code data) by which the door is locked, and the 1st device location data and the 2nd device location data at the time the door is locked.

This paragraph illustrates the software program(s) stored in Multiple Device Door Locking Software Storage Area 206A571c. In this embodiment, Multiple Device Door Locking Software Storage Area 206A571c stores Door Locking Software 206A571*c*3, Door Lock Log Data Sharing Software 206A571*c*4, and Individual Lock Log Data Displaying Software 206A571*c*5. Door Locking Software 206A571*c*3 is the software program described hereinafter. Door Lock Log Data Sharing Software 206A571*c*4 is the software program described hereinafter. Individual Lock Log Data Displaying Software 206A571*c*5 is the software program described hereinafter.

This paragraph illustrates the storage area included in RAM 206 (FIG. 1) of Device B. In this embodiment, RAM 206 includes Multiple Device Door Locking Information Storage Area 206B571*a* of which the data and the software program(s) stored therein are described hereinafter.

The data and/or the software program(s) necessary to implement the present function may be downloaded from Host H to Device B.

This paragraph illustrates the storage area(s) included in Multiple Device Door Locking Information Storage Area 206B571*a*. In this embodiment, Multiple Device Door Locking Information Storage Area 206B571*a* includes Multiple Device Door Locking Data Storage Area 206B571*b* and Multiple Device Door Locking Software Storage Area 206B571*c*. Multiple Device Door Locking Data Storage Area 206B571*b* stores the data necessary to implement the present function on the side of Device B, such as the one(s) described hereinafter. Multiple Device Door Locking Software Storage Area 206B571*c* stores the software program(s) necessary to implement the present function on the side of Device B, such as the one(s) described hereinafter.

This paragraph illustrates the storage area(s) included in Multiple Device Door Locking Data Storage Area 206B571*b*. In this embodiment, Multiple Device Door Locking Data Storage Area 206B571*b* includes User Code Data Storage Area 206B571*b*1, All Device Code Data Storage Area 206B571*b*2, Door Locked Message Data Storage Area 206B571*b*3, All Device Location Data Storage Area 206B571*b*4, Map Data Storage Area 206B571*b*5, All Device Icon Data Storage Area 206B571*b*6, Door Lock Log Data Storage Area 206B571*b*7, and Work Area 206B571*a*8. User Code Data Storage Area 206B571*b*1 stores the user code data which is the code unique to the common user of both Device B and Device C. All Device Code Data Storage Area 206B571*b*2 stores the data described hereinafter. Door Locked Message Data Storage Area 206B571*b*3 stores the door locked message data which is the message indicating that the door is locked. All Device Location Data Storage Area 206B571*b*4 stores the data described hereinafter. Map Data Storage Area 206B571*b*5 stores the map data which is the image data indicating a map. All Device Icon Data Storage Area 206B571*b*6 stores the data described hereinafter. Door Lock Log Data Storage Area 206B571*b*7 stores the data described hereinafter. Work Area 206B571*a*8 is utilized as a work area to perform calculation and temporarily store data.

This paragraph illustrates the storage area(s) included in All Device Code Data Storage Area 206B571*b*2. In this embodiment, All Device Code Data Storage Area 206B571*b*2 includes 1st Device Code Data Storage Area 206B571*b*2*a*. 1st Device Code Data Storage Area 206B571*b*2*a* stores the 1st device code data which indicates the code unique to Device B.

This paragraph illustrates the storage area(s) included in All Device Location Data Storage Area 206B571*b*4. In this embodiment, All Device Location Data Storage Area 206B571*b*4 includes 1st Device Location Data Storage Area 206B571*b*4*a* and 2nd Device Location Data Storage Area 206B571*b*4*b*. 1st Device Location Data Storage Area 206B571*b*4*a* stores the 1st device location data which indicates the current geographic location of Device B in (x,y,z) format. 2nd Device Location Data Storage Area 206B571*b*4*b* stores the 2nd device location data which indicates the current geographic location of Device C in (x,y,z) format.

This paragraph illustrates the storage area(s) included in All Device Icon Data Storage Area 206B571*b*6. In this embodiment, All Device Icon Data Storage Area 206B571*b*6 includes 1st Device Icon Data Storage Area 206B571*b*6*a* and 2nd Device Icon Data Storage Area 206B571*b*6*b*. 1st Device Icon Data Storage Area 206B571*b*6*a* stores the 1st device icon data which is the image of the icon utilized to indicate the geographic location of Device B on the map data. 2nd Device Icon Data Storage Area 206B571*b*6*b* stores the 2nd device icon data which is the image of the icon utilized to indicate the geographic location of Device C on the map data.

This paragraph illustrates the data stored in Door Lock Log Data Storage Area 206B571*b*7. In this embodiment, Door Lock Log Data Storage Area 206B571*b*7 comprises two columns, i.e., 'Door Lock Log ID' and 'Door Lock Log Data'. Column 'Door Lock Log ID' stores the door lock log IDs, and each door lock log ID is an identification of the corresponding door lock log data stored in column 'Door Lock Log Data'. Column 'Door Lock Log Data' stores the door lock log data, and each door lock log data is the log of locking the door. In this embodiment, Door Lock Log Data Storage Area 206B571*b*7 stores the following data: Door Lock Log#1' and the corresponding 'Door Lock Log Data#1'; Door Lock Log#2' and the corresponding 'Door Lock Log Data#2'; Door Lock Log#3' and the corresponding 'Door Lock Log Data#3'; and Door Lock Log#4' and the corresponding 'Door Lock Log Data#4'. Each of the door lock log data includes the door locked time data which indicates the time and date at which the door is locked, the device code data (either the 1st device code data or the 2nd device code data) by which the door is locked, and the 1st device location data and the 2nd device location data at the time the door is locked.

This paragraph illustrates the software program(s) stored in Multiple Device Door Locking Software Storage Area 206B571*c*. In this embodiment, Multiple Device Door Locking Software Storage Area 206B571*c* stores 1st Device Location Data Producing Software 206B571*c*1, Door Locking Software 206B571*c*3, Door Lock Log Data Sharing Software 206B571*c*4, and Individual Lock Log Data Displaying Software 206B571*c*5. 1st Device Location Data Producing Software 206B571*c*1 is the software program described hereinafter. Door Locking Software 206B571*c*3 is the software program described hereinafter. Door Lock Log Data Sharing Software 206B571*c*4 is the software program described hereinafter. Individual Lock Log Data Displaying Software 206B571*c*5 is the software program described hereinafter.

This paragraph illustrates the storage area included in RAM 206 (FIG. 1) of Device C. In this embodiment, RAM 206 includes Multiple Device Door Locking Information Storage Area 206C571*a* of which the data and the software program(s) stored therein are described hereinafter.

The data and/or the software program(s) necessary to implement the present function may be downloaded from Host H to Device C.

This paragraph illustrates the storage area(s) included in Multiple Device Door Locking Information Storage Area 206C571*a*. In this embodiment, Multiple Device Door Locking Information Storage Area 206C571*a* includes Multiple Device Door Locking Data Storage Area 206C571*b* and Multiple Device Door Locking Software Storage Area 206C571*c*. Multiple Device Door Locking Data Storage Area 206C571*b* stores the data necessary to implement the present function on the side of Device C, such as the one(s) described hereinafter.

Multiple Device Door Locking Software Storage Area 206C571c stores the software program(s) necessary to implement the present function on the side of Device C, such as the one(s) described hereinafter.

This paragraph illustrates the storage area(s) included in Multiple Device Door Locking Data Storage Area 206C571b. In this embodiment, Multiple Device Door Locking Data Storage Area 206C571b includes User Code Data Storage Area 206C571b1, All Device Code Data Storage Area 206C571b2, Door Locked Message Data Storage Area 206C571b3, All Device Location Data Storage Area 206C571b4, Map Data Storage Area 206C571b5, All Device Icon Data Storage Area 206C571b6, Door Lock Log Data Storage Area 206C571b7, and Work Area 206C571a8. User Code Data Storage Area 206C571b1 stores the user code data which is the code unique to the common user of both Device B and Device C. All Device Code Data Storage Area 206C571b2 stores the data described hereinafter. Door Locked Message Data Storage Area 206C571b3 stores the door locked message data which is the message indicating that the door is locked. All Device Location Data Storage Area 206C571b4 stores the data described hereinafter. Map Data Storage Area 206C571b5 stores the map data which is the image data indicating a map. All Device Icon Data Storage Area 206C571b6 stores the data described hereinafter. Door Lock Log Data Storage Area 206C571b7 stores the data described hereinafter. Work Area 206C571a8 is utilized as a work area to perform calculation and temporarily store data.

This paragraph illustrates the storage area(s) included in All Device Code Data Storage Area 206C571b2. In this embodiment, All Device Code Data Storage Area 206C571b2 includes 2nd Device Code Data Storage Area 206C571b2b. 2nd Device Code Data Storage Area 206C571b2b stores the 2nd device code data which indicates the code unique to Device C.

This paragraph illustrates the storage area(s) included in All Device Location Data Storage Area 206C571b4. In this embodiment, All Device Location Data Storage Area 206C571b4 includes 1st Device Location Data Storage Area 206C571b4a and 2nd Device Location Data Storage Area 206C571b4b. 1st Device Location Data Storage Area 206C571b4a stores the 1st device location data which indicates the current geographic location of Device B in (x,y,z) format. 2nd Device Location Data Storage Area 206C571b4b stores the 2nd device location data which indicates the current geographic location of Device C in (x,y,z) format.

This paragraph illustrates the storage area(s) included in All Device Icon Data Storage Area 206C571b6. In this embodiment, All Device Icon Data Storage Area 206C571b6 includes 1st Device Icon Data Storage Area 206C571b6a and 2nd Device Icon Data Storage Area 206C571b6b. 1st Device Icon Data Storage Area 206C571b6a stores the 1st device icon data which is the image of the icon utilized to indicate the geographic location of Device B on the map data. 2nd Device Icon Data Storage Area 206C571b6b stores the 2nd device icon data which is the image of the icon utilized to indicate the geographic location of Device C on the map data.

This paragraph illustrates the data stored in Door Lock Log Data Storage Area 206C571b7. In this embodiment, Door Lock Log Data Storage Area 206C571b7 comprises two columns, i.e., 'Door Lock Log ID' and 'Door Lock Log Data'. Column 'Door Lock Log ID' stores the door lock log IDs, and each door lock log ID is an identification of the corresponding door lock log data stored in column 'Door Lock Log Data'. Column 'Door Lock Log Data' stores the door lock log data, and each door lock log data is the log of locking the door. In this embodiment, Door Lock Log Data Storage Area 206C571b7 stores the following data: Door Lock Log#1' and the corresponding 'Door Lock Log Data#1'; Door Lock Log#2' and the corresponding 'Door Lock Log Data#2'; Door Lock Log#3' and the corresponding 'Door Lock Log Data#3'; and Door Lock Log#4' and the corresponding 'Door Lock Log Data#4'. Each of the door lock log data includes the door locked time data which indicates the time and date at which the door is locked, the device code data (either the 1st device code data or the 2nd device code data) by which the door is locked, and the 1st device location data and the 2nd device location data at the time the door is locked.

This paragraph illustrates the software program(s) stored in Multiple Device Door Locking Software Storage Area 206C571c. In this embodiment, Multiple Device Door Locking Software Storage Area 206C571c stores 2nd Device Location Data Producing Software 206C571c2, Door Locking Software 206C571c3, Door Lock Log Data Sharing Software 206C571c4, and Individual Lock Log Data Displaying Software 206C571c5. 2nd Device Location Data Producing Software 206C571c2 is the software program described hereinafter. Door Locking Software 206C571c3 is the software program described hereinafter. Door Lock Log Data Sharing Software 206C571c4 is the software program described hereinafter. Individual Lock Log Data Displaying Software 206C571c5 is the software program described hereinafter.

This paragraph illustrate(s) 1st Device Location Data Producing Software 206B571c1 of Device B, which produce(s) the 1st device location data. In this embodiment, CPU 211 (FIG. 1) of Device B identifies the current location of Device B (S1). CPU 211 (FIG. 1) of Device B produces the 1st device location data by referring to the current location identified in the previous step (S2). CPU 211 (FIG. 1) of Device B stores the 1st device location data produced in the previous step in 1st Device Location Data Storage Area 206B571b4a (S3). The foregoing sequence is repeated periodically.

This paragraph illustrate(s) 2nd Device Location Data Producing Software 206C571c2 of Device C, which produce(s) the 2nd device location data. In this embodiment, CPU 211 (FIG. 1) of Device C identifies the current location of Device C (S1). CPU 211 (FIG. 1) of Device C produces the 2nd device location data by referring to the current location identified in the previous step (S2). CPU 211 (FIG. 1) of Device C stores the 2nd device location data produced in the previous step in 2nd Device Location Data Storage Area 206C571b4b (S3). The foregoing sequence is repeated periodically.

This paragraph illustrate(s) Door Locking Software H571c3 of Host H, Door Locking Software 206A571c3 of Device A, Door Locking Software 206B571c3 of Device B, and Door Locking Software 206C571c3 of Device C, which lock(s) the door (not shown). Assuming that the door is locked by utilizing Device B. In this embodiment, the user inputs, by utilizing Input Device 210 (FIG. 1) or via voice recognition system, the door locking command (S1). Here, the door locking command is the command to lock the door (not shown). CPU 211 (FIG. 1) of Device B retrieves the user code data from User Code Data Storage Area 206B571b1 and sends the data to Host H in a wireless fashion (S2). Host H receives the user code data from Device B (S3). CPU 211 (FIG. 1) of Device B retrieves the 1st device code data from 1st Device Code Data Storage Area 206B571b2a and sends the data to Host H in a wireless fashion (S4). Host H receives the 1st device code data from Device B (S5). Host H retrieves the user code data from User Code Data Storage Area H571b1 (S6). If the user code data received in S3 and the user code data retrieved in the previous step matches, Host H proceeds to the next step (S7). Host H sends the door locking device activating command to Device A (S8). Here, the door locking device activating command is the command to activate Door Locking Device DLD571. CPU 211 (FIG. 1) of Device A receives the door locking device activating command from Host H in a wireless fashion (S9). CPU 211 (FIG. 1) of Device A activates Door Locking Device DLD571 (S10). Host H sends the 1st device location data transferring request to Device B (S11). Here, the 1st device location data transferring request is the request to transfer the 1st device location data. CPU 211 (FIG. 1) of Device B receives the 1st device location data transferring request from Host H in a wireless fashion (S12). CPU 211 (FIG. 1) of Device B retrieves the 1st device location data from 1st Device Location Data Storage Area 206B571b4a and sends the data to Host H in a wireless fashion (S13). Host H receives the 1st device location data from Device B and stores the data in 1st Device Location Data Storage Area H571b4a (S14). Host H sends the 2nd device location data transferring request to Device C (S15). Here, the 2nd device location data transferring request is the request to transfer the 2nd device location data. CPU 211 (FIG. 1) of Device C receives the 2nd device location data transferring request from Host H in a wireless fashion (S16). CPU 211 (FIG. 1) of Device C retrieves the 2nd device location data from 2nd Device Location Data Storage Area 206C571b4b and sends the data to Host H in a wireless fashion (S17). Host H receives the 2nd device location data from Device C and stores the data in 2nd Device Location Data Storage Area H571b4b (S18). Host H identifies the current time and date (S19). Host H produces the door locked time data by utilizing the current time and date identified in the previous step (S20). Host H produces the door lock log data (e.g., Door Lock Log Data#3) by utilizing the door locked time data produced in the previous step, the user code data received in S3, the 1st device code data received in S5, the 1st device location data received in S14, and the 2nd device location data received in S18 (S21). Host H stores the door lock log data (e.g., Door Lock Log Data#3) produced in the previous step in Door Lock Log Data Storage Area H571b7 (S22). Host H retrieves the door locked message data from Door Locked Message Data Storage Area H571b3 and sends the data to Device A (S23). CPU 211 (FIG. 1) of Device A receives the door locked message data from Host H in a wireless fashion and displays the data on LCD 201 (FIG. 1) of Device A (S24). Host H sends the door locked notice to Device B (S25). Here, the door locked notice indicates that the door is locked. CPU 211 (FIG. 1) of Device B receives the door locked notice from Host H in a wireless fashion (S26). CPU 211 (FIG. 1) of Device B retrieves the door locked message data from Door Locked Message Data Storage Area 206B571b3 and displays the data on LCD 201 (FIG. 1) of Device B (S27). Host H sends the door locked notice to Device C (S28). Here, the door locked notice indicates that the door is locked. CPU 211 (FIG. 1) of Device C receives the door locked notice from Host H in a wireless fashion (S29). CPU 211 (FIG. 1) of Device C retrieves the door locked message data from Door Locked Message Data Storage Area 206C571b3 and displays the data on LCD 201 (FIG. 1) of Device C (S30).

This paragraph illustrate(s) Door Locking Software H571c3 of Host H, Door Locking Software 206A571c3 of Device A, Door Locking Software 206B571c3 of Device B, and Door Locking Software 206C571c3 of Device C, which lock(s) the door (not shown). Assuming that the door is locked by utilizing Device C. In this embodiment, the user inputs, by utilizing Input Device 210 (FIG. 1) or via voice recognition system, the door locking command (S1). Here, the door locking command is the command to lock the door (not shown). CPU 211 (FIG. 1) of Device C retrieves the user code data from User Code Data Storage Area 206C571b1 and sends the data to Host H in a wireless fashion (S2). Host H receives the user code data from Device C (S3). CPU 211 (FIG. 1) of Device C retrieves the 2nd device code data from 2nd Device Code Data Storage Area 206C571b2b and sends the data to Host H in a wireless fashion (S4). Host H receives the 2nd device code data from Device C (S5). Host H retrieves the user code data from User Code Data Storage Area H571b1 (S6). If the user code data received in S3 and the user code data retrieved in the previous step matches, Host H proceeds to the next step (S7). Host H sends the door locking device activating command to Device A (S8). Here, the door locking device activating command is the command to activate Door Locking Device DLD571. CPU 211 (FIG. 1) of Device A receives the door locking device activating command from Host H in a wireless fashion (S9). CPU 211 (FIG. 1) of Device A activates Door Locking Device DLD571 (S10). Host H sends the 1st device location data transferring request to Device B (S11). Here, the 1st device location data transferring request is the request to transfer the 1st device location data. CPU 211 (FIG. 1) of Device B receives the 1st device location data transferring request from Host H in a wireless fashion (S12). CPU 211 (FIG. 1) of Device B retrieves the 1st device location data from 1st Device Location Data Storage Area 206B571b4a and sends the data to Host H in a wireless fashion (S13). Host H receives the 1st device location data from Device B and stores the data in 1st Device Location Data Storage Area H571b4a (S14). Host H sends the 2nd device location data transferring request to Device C (S15). Here, the 2nd device location data transferring request is the request to transfer the 2nd device location data. CPU 211 (FIG. 1) of Device C receives the 2nd device location data transferring request from Host H in a wireless fashion (S16). CPU 211 (FIG. 1) of Device C retrieves the 2nd device location data from 2nd Device Location Data Storage Area 206C571b4b and sends the data to Host H in a wireless fashion (S17). Host H receives the 2nd device location data from Device C and stores the data in 2nd Device Location Data Storage Area H571b4b (S18). Host H identifies the current time and date (S19). Host H produces the door locked time data by utilizing the current time and date identified in the previous step (S20). Host H produces the door lock log data (e.g., Door Lock Log Data#4) by utilizing the door locked time data produced in the previous step, the user code data received in S3, the 2nd device code data received in S5, the 1st device location data received in S14, and the 2nd device location data received in S18 (S21). Host H stores the door lock log data (e.g., Door Lock Log Data#4) produced in the previous step in Door Lock Log Data Storage Area H571b7 (S22). Host H retrieves the door locked message data from Door Locked Message Data Storage Area H571b3 and sends the data to Device A (S23). CPU 211 (FIG. 1) of Device A receives the door locked message data from Host H in a wireless fashion and displays the data on LCD 201 (FIG. 1) of Device A (S24). Host H sends the door locked notice to Device B (S25). Here, the door locked notice indicates that the door is locked. CPU 211 (FIG. 1) of Device B receives the door locked notice from Host H in a wireless fashion (S26). CPU 211 (FIG. 1) of Device B retrieves the door locked message data from Door Locked Message Data Storage Area 206B571b3 and displays the data on LCD 201 (FIG. 1) of Device B (S27). Host H sends the door locked notice to Device C (S28). Here, the door locked notice indicates that the door is locked. CPU 211 (FIG. 1) of Device C receives the door locked notice from Host H in a wireless fashion (S29). CPU 211 (FIG. 1) of Device C retrieves the door locked message data from Door Locked Message Data Storage Area 206C571b3 and displays the data on LCD 201 (FIG. 1) of Device C (S30).

This paragraph illustrate(s) Door Lock Log Data Sharing Software H571c4 of Host H and Door Lock Log Data Sharing Software 206B571c4 of Device B, which share(s) the door lock log data. In this embodiment, Host H retrieves all door lock log data (e.g., Door Lock Log Data#1 through #4) from Door Lock Log Data Storage Area H571b7 and sends the data to Device B (S1). CPU 211 (FIG. 1) of Device B receives the door lock log data (e.g., Door Lock Log Data#1 through #4) from Host H in a wireless fashion and stores the data in Door Lock Log Data Storage Area 206B571b7 (S2). The foregoing sequence is repeated periodically.

This paragraph illustrate(s) Door Lock Log Data Sharing Software H571c4 of Host H and Door Lock Log Data Sharing Software 206C571c4 of Device C, which share(s) the door lock log data. In this embodiment, Host H retrieves all door lock log data (e.g., Door Lock Log Data#1 through #4) from Door Lock Log Data Storage Area H571b7 and sends the data to Device C (S1). CPU 211 (FIG. 1) of Device C receives the door lock log data (e.g., Door Lock Log Data#1 through #4) from Host H in a wireless fashion and stores the data in Door Lock Log Data Storage Area 206C571b7 (S2). The foregoing sequence is repeated periodically.

This paragraph illustrate(s) Individual Lock Log Data Displaying Software H571c5 of Host H and Individual Lock Log Data Displaying Software 206A571c5 of Device A, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device A sends the door lock log data displaying command input in the previous step to Host H in a wireless fashion (S2). Host H receives the door lock log data displaying command from Device A (S3). Host H retrieves all door lock log IDs (e.g., Door Lock Log#1 through #4) from Door Lock Log Data Storage Area H571b7 and sends the data to Device A (S4). CPU 211 (FIG. 1) of Device A receives the door lock log IDs (e.g., Door Lock Log#1 through #4) from Host H in a wireless fashion and displays the data on LCD 201 (FIG. 1) of Device A (S5). The user selects, by utilizing Input Device 210 (FIG. 1) or via voice recognition system, a door lock log ID (e.g., Door Lock Log#1) (S6). Host H retrieves the door lock log data (e.g., Door Lock Log Data#1) corresponding to the door lock log ID (e.g., Door Lock Log#1) selected in the previous step from Door Lock Log Data Storage Area H571b7 (S7). Host H retrieves the door locked time data, the user code data, and the device code data (e.g., the 1st device code data) from the door lock log data (e.g., Door Lock Log Data#1) retrieved in the previous step and sends the data to Device A (S8). CPU 211 (FIG. 1) of Device A receives the door locked time data, the user code data, and the device code data (e.g., the 1st device code data) from Host H in a wireless fashion and displays the data on LCD 201 (FIG. 1) of Device A (S9). Host H retrieves the map data from Map Data Storage Area H571b5 and sends the data to Device A (S10). CPU 211 (FIG. 1) of Device A receives the map data from Host H in a wireless fashion and displays the data on LCD 201 (FIG. 1) of Device A (S11). Host H retrieves the 1st device location data from the door lock log data (e.g., Door Lock Log Data#1) retrieved in S7 and sends the data to Device A (S12). CPU 211 (FIG. 1) of Device A receives the 1st device location data from Host H in a wireless fashion (S13). Host H retrieves the 1st device icon data from 1st Device Icon Data Storage Area H571b6a and sends the data to Device A (S14). CPU 211 (FIG. 1) of Device A receives the 1st device icon data from Host H in a wireless fashion (S15). CPU 211 (FIG. 1) of Device A displays the 1st device icon data received in the previous step at the location corresponding to the 1st device location data received in S13 on the map data displayed in S11 (S16). Host H retrieves the 2nd device location data from the door lock log data (e.g., Door Lock Log Data#1) retrieved in S7 and sends the data to Device A (S17). CPU 211 (FIG. 1) of Device A receives the 2nd device location data from Host H in a wireless fashion (S18). Host H retrieves the 2nd device icon data from 2nd Device Icon Data Storage Area H571b6b and sends the data to Device A (S19). CPU 211 (FIG. 1) of Device A receives the 2nd device icon data from Host H in a wireless fashion (S20). CPU 211 (FIG. 1) of Device A displays the 2nd device icon data received in the previous step at the location corresponding to the 2nd device location data received in S18 on the map data displayed in S11 (S21). Thus, the geographic locations of Device B and Device C are displayed on the map data simultaneously.

This paragraph illustrate(s) Individual Lock Log Data Displaying Software 206B571c5 of Device B, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device B retrieves all door lock log IDs (e.g., Door Lock Log#1 through #4) from Door Lock Log Data Storage Area 206B571b7 (S2). CPU 211 (FIG. 1) of Device B displays the door lock log IDs (e.g., Door Lock Log#1 through #4) retrieved in the previous step on LCD 201 (FIG. 1) of Device B (S3). The user selects, by utilizing Input Device 210 (FIG. 1) or via voice recognition system, a door lock log ID (e.g., Door Lock Log#1) (S4). CPU 211 (FIG. 1) of Device B retrieves the door lock log data (e.g., Door Lock Log Data#1) corresponding to the door lock log ID (e.g., Door Lock Log#1) selected in the previous step from Door Lock Log Data Storage Area 206B571b7 (S5). CPU 211 (FIG. 1) of Device B retrieves the door locked time data, the user code data, and the device code data (e.g., the 1st device code data) from the door lock log data (e.g., Door Lock Log Data#1) retrieved in the previous step (S6). CPU 211 (FIG. 1) of Device B displays the door locked time data, the user code data, and the device code data (e.g., the 1st device code data) retrieved in the previous step on LCD 201 (FIG. 1) of Device B (S7). CPU 211 (FIG. 1) of Device B retrieves the map data from Map Data Storage Area 206B571b5 (S8). CPU 211 (FIG. 1) of Device B displays the map data retrieved in the previous step on LCD 201 (FIG. 1) of Device B (S9). CPU 211 (FIG. 1) of Device B retrieves the 1st device location data from the door lock log data (e.g., Door Lock Log Data#1) retrieved in S5 (S10). CPU 211 (FIG. 1) of Device B retrieves the 1st device icon data from 1st Device Icon Data Storage Area 206B571b6a (S11). CPU 211 (FIG. 1) of Device B displays the 1st device icon data retrieved in the previous step at the location corresponding to the 1st device location data retrieved in S10 on the map data displayed in S9 (S12). CPU 211 (FIG. 1) of Device B retrieves the 2nd device location data from the door lock log data (e.g., Door Lock Log Data#1) retrieved in S5 (S13). CPU 211 (FIG. 1) of Device B retrieves the 2nd device icon data from 2nd Device Icon Data Storage Area 206B571b6b (S14). CPU 211 (FIG. 1) of Device B displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Lock Log Data Displaying Software 206C571c5 of Device C, which display(s)

the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device C retrieves all door lock log IDs (e.g., Door Lock Log#1 through #4) from Door Lock Log Data Storage Area 206C571*b*7 (S2). CPU 211 (FIG. 1) of Device C displays the door lock log IDs (e.g., Door Lock Log#1 through #4) retrieved in the previous step on LCD 201 (FIG. 1) of Device C (S3). The user selects, by utilizing Input Device 210 (FIG. 1) or via voice recognition system, a door lock log ID (e.g., Door Lock Log#1) (S4). CPU 211 (FIG. 1) of Device C retrieves the door lock log data (e.g., Door Lock Log Data#1) corresponding to the door lock log ID (e.g., Door Lock Log#1) selected in the previous step from Door Lock Log Data Storage Area 206C571*b*7 (S5). CPU 211 (FIG. 1) of Device C retrieves the door locked time data, the user code data, and the device code data (e.g., the 2nd device code data) from the door lock log data (e.g., Door Lock Log Data#1) retrieved in the previous step (S6). CPU 211 (FIG. 1) of Device C displays the door locked time data, the user code data, and the device code data (e.g., the 2nd device code data) retrieved in the previous step on LCD 201 (FIG. 1) of Device C (S7). CPU 211 (FIG. 1) of Device C retrieves the map data from Map Data Storage Area 206C571*b*5 (S8). CPU 211 (FIG. 1) of Device C displays the map data retrieved in the previous step on LCD 201 (FIG. 1) of Device C (S9). CPU 211 (FIG. 1) of Device C retrieves the 1st device location data from the door lock log data (e.g., Door Lock Log Data#1) retrieved in S5 (S10). CPU 211 (FIG. 1) of Device C retrieves the 1st device icon data from 1st Device Icon Data Storage Area 206C571*b*6*a* (S11). CPU 211 (FIG. 1) of Device C displays the 1st device icon data retrieved in the previous step at the location corresponding to the 1st device location data retrieved in S10 on the map data displayed in S9 (S12). CPU 211 (FIG. 1) of Device C retrieves the 2nd device location data from the door lock log data (e.g., Door Lock Log Data#1) retrieved in S5 (S13). CPU 211 (FIG. 1) of Device C retrieves the 2nd device icon data from 2nd Device Icon Data Storage Area 206C571*b*6*b* (S14). CPU 211 (FIG. 1) of Device C displays the 2nd device icon data retrieved in the previous step at the location corresponding to the 2nd device location data retrieved in S13 on the map data displayed in S9 (S15). Thus, the geographic locations of Device C and Device C are displayed on the map data simultaneously.

The following paragraphs illustrate another embodiment wherein Device A plays the major role in implementing the present function.

This paragraph illustrate(s) 1st Device Location Data Producing Software 206B571*c*1 of Device B, which produce(s) the 1st device location data. In this embodiment, CPU 211 (FIG. 1) of Device B identifies the current location of Device B (S1). CPU 211 (FIG. 1) of Device B produces the 1st device location data by referring to the current location identified in the previous step (S2). CPU 211 (FIG. 1) of Device B stores the 1st device location data produced in the previous step in 1st Device Location Data Storage Area 206B571*b*4*a* (S3). The foregoing sequence is repeated periodically.

This paragraph illustrate(s) 2nd Device Location Data Producing Software 206C571*c*2 of Device C, which produce(s) the 2nd device location data. In this embodiment, CPU 211 (FIG. 1) of Device C identifies the current location of Device C (S1). CPU 211 (FIG. 1) of Device C produces the 2nd device location data by referring to the current location identified in the previous step (S2). CPU 211 (FIG. 1) of Device C stores the 2nd device location data produced in the previous step in 2nd Device Location Data Storage Area 206C571*b*4*b* (S3). The foregoing sequence is repeated periodically.

This paragraph illustrate(s) Door Locking Software 206A571*c*3 of Device A, Door Locking Software 206B571*c*3 of Device B, and Door Locking Software 206C571*c*3 of Device C, which lock(s) the door (not shown). Assuming that the door is locked by utilizing Device B. In this embodiment, the user inputs, by utilizing Input Device 210 (FIG. 1) or via voice recognition system, the door locking command (S1). Here, the door locking command is the command to lock the door (not shown). CPU 211 (FIG. 1) of Device B retrieves the user code data from User Code Data Storage Area 206B571*b*1 and sends the data to Device A in a wireless fashion (S2). CPU 211 (FIG. 1) of Device A receives the user code data from Device B in a wireless fashion (S3). CPU 211 (FIG. 1) of Device B retrieves the 1st device code data from 1st Device Code Data Storage Area 206B571*b*2*a* and sends the data to Device A in a wireless fashion (S4). CPU 211 (FIG. 1) of Device A receives the 1st device code data from Device B in a wireless fashion (S5). CPU 211 (FIG. 1) of Device A retrieves the user code data from User Code Data Storage Area 206A571*b*1 (S6). If the user code data received in S3 and the user code data retrieved in the previous step matches, CPU 211 (FIG. 1) of Device A proceeds to the next step (S7). CPU 211 (FIG. 1) of Device A activates Door Locking Device DLD571 (S8). CPU 211 (FIG. 1) of Device A sends the 1st device location data transferring request to Device B in a wireless fashion (S9). Here, the 1st device location data transferring request is the request to transfer the 1st device location data. CPU 211 (FIG. 1) of Device B receives the 1st device location data transferring request from Device A in a wireless fashion (S10). CPU 211 (FIG. 1) of Device B retrieves the 1st device location data from 1st Device Location Data Storage Area 206B571*b*4*a* and sends the data to Device A in a wireless fashion (S11). CPU 211 (FIG. 1) of Device A receives the 1st device location data from Device B in a wireless fashion and stores the data in 1st Device Location Data Storage Area 206A571*b*4*a* (S12). CPU 211 (FIG. 1) of Device A sends the 2nd device location data transferring request to Device C in a wireless fashion (S13). Here, the 2nd device location data transferring request is the request to transfer the 2nd device location data. CPU 211 (FIG. 1) of Device C receives the 2nd device location data transferring request from Device A in a wireless fashion (S14). CPU 211 (FIG. 1) of Device C retrieves the 2nd device location data from 2nd Device Location Data Storage Area 206C571*b*4*b* and sends the data to Device A in a wireless fashion (S15). CPU 211 (FIG. 1) of Device A receives the 2nd device location data from Device C in a wireless fashion and stores the data in 2nd Device Location Data Storage Area 206A571*b*4*b* (S16). CPU 211 (FIG. 1) of Device A identifies the current time and date (S17). CPU 211 (FIG. 1) of Device A produces the door locked time data by utilizing the current time and date identified in the previous step (S18). CPU 211 (FIG. 1) of Device A produces the door lock log data (e.g., Door Lock Log Data#3) by utilizing the door locked time data produced in the previous step, the user code data received in S3, the 1st device code data received in S5, the 1st device location data received in S12, and the 2nd device location data received in S16 (S19). CPU 211 (FIG. 1) of Device A stores the door lock log data (e.g., Door Lock Log Data#3) produced in the previous step in Door Lock Log Data Storage Area 206A571*b*7 (S20). CPU 211 (FIG. 1) of Device A retrieves the door locked message data from Door Locked Message Data Storage Area 206A571*b*3 (S21). CPU 211 (FIG. 1) of Device A displays the door locked message data retrieved in the previous step on LCD 201 (FIG. 1) of Device A (S22). CPU 211 (FIG. 1) of Device A sends the door locked notice to Device B in a wireless fashion (S23). Here, the door locked notice indicates that the door is locked. CPU 211 (FIG. 1) of Device B receives the door locked notice from Device A in a wireless fashion (S24). CPU 211 (FIG. 1) of Device B retrieves the door locked message data from Door Locked Message Data Storage Area 206B571b3 and displays the data on LCD 201 (FIG. 1) of Device B (S25). CPU 211 (FIG. 1) of Device A sends the door locked notice to Device C in a wireless fashion (S26). Here, the door locked notice indicates that the door is locked. CPU 211 (FIG. 1) of Device C receives the door locked notice from Device A in a wireless fashion (S27). CPU 211 (FIG. 1) of Device C retrieves the door locked message data from Door Locked Message Data Storage Area 206C571b3 and displays the data on LCD 201 (FIG. 1) of Device C (S28).

This paragraph illustrate(s) Door Locking Software 206A571c3 of Device A, Door Locking Software 206B571c3 of Device B, and Door Locking Software 206C571c3 of Device C, which lock(s) the door (not shown). Assuming that the door is locked by utilizing Device C. In this embodiment, the user inputs, by utilizing Input Device 210 (FIG. 1) or via voice recognition system, the door locking command (S1). Here, the door locking command is the command to lock the door (not shown). CPU 211 (FIG. 1) of Device C retrieves the user code data from User Code Data Storage Area 206C571b1 and sends the data to Device A in a wireless fashion (S2). CPU 211 (FIG. 1) of Device A receives the user code data from Device C in a wireless fashion (S3). CPU 211 (FIG. 1) of Device C retrieves the 2nd device code data from 2nd Device Code Data Storage Area 206C571b2b and sends the data to Device A in a wireless fashion (S4). CPU 211 (FIG. 1) of Device A receives the 2nd device code data from Device C in a wireless fashion (S5). CPU 211 (FIG. 1) of Device A retrieves the user code data from User Code Data Storage Area 206A571b1 (S6). If the user code data received in S3 and the user code data retrieved in the previous step matches, CPU 211 (FIG. 1) of Device A proceeds to the next step (S7). CPU 211 (FIG. 1) of Device A activates Door Locking Device DLD571 (S8). CPU 211 (FIG. 1) of Device A sends the 1st device location data transferring request to Device B in a wireless fashion (S9). Here, the 1st device location data transferring request is the request to transfer the 1st device location data. CPU 211 (FIG. 1) of Device B receives the 1st device location data transferring request from Device A in a wireless fashion (S10). CPU 211 (FIG. 1) of Device B retrieves the 1st device location data from 1st Device Location Data Storage Area 206B571b4a and sends the data to Device A in a wireless fashion (S11). CPU 211 (FIG. 1) of Device A receives the 1st device location data from Device B in a wireless fashion and stores the data in 1st Device Location Data Storage Area 206A571b4a (S12). CPU 211 (FIG. 1) of Device A sends the 2nd device location data transferring request to Device C in a wireless fashion (S13). Here, the 2nd device location data transferring request is the request to transfer the 2nd device location data. CPU 211 (FIG. 1) of Device C receives the 2nd device location data transferring request from Device A in a wireless fashion (S14). CPU 211 (FIG. 1) of Device C retrieves the 2nd device location data from 2nd Device Location Data Storage Area 206C571b4b and sends the data to Device A in a wireless fashion (S15). CPU 211 (FIG. 1) of Device A receives the 2nd device location data from Device C in a wireless fashion and stores the data in 2nd Device Location Data Storage Area 206A571b4b (S16). CPU 211 (FIG. 1) of Device A identifies the current time and date (S17). CPU 211 (FIG. 1) of Device A produces the door locked time data by utilizing the current time and date identified in the previous step (S18). CPU 211 (FIG. 1) of Device A produces the door lock log data (e.g., Door Lock Log Data#4) by utilizing the door locked time data produced in the previous step, the user code data received in S3, the 2nd device code data received in S5, the 1st device location data received in S12, and the 2nd device location data received in S16 (S19). CPU 211 (FIG. 1) of Device A stores the door lock log data (e.g., Door Lock Log Data#4) produced in the previous step in Door Lock Log Data Storage Area 206A571b7 (S20). CPU 211 (FIG. 1) of Device A retrieves the door locked message data from Door Locked Message Data Storage Area 206A571b3 (S21). CPU 211 (FIG. 1) of Device A displays the door locked message data retrieved in the previous step on LCD 201 (FIG. 1) of Device A (S22). CPU 211 (FIG. 1) of Device A sends the door locked notice to Device B in a wireless fashion (S23). Here, the door locked notice indicates that the door is locked. CPU 211 (FIG. 1) of Device B receives the door locked notice from Device A in a wireless fashion (S24). CPU 211 (FIG. 1) of Device B retrieves the door locked message data from Door Locked Message Data Storage Area 206B571b3 and displays the data on LCD 201 (FIG. 1) of Device B (S25). CPU 211 (FIG. 1) of Device A sends the door locked notice to Device C in a wireless fashion (S26). Here, the door locked notice indicates that the door is locked. CPU 211 (FIG. 1) of Device C receives the door locked notice from Device A in a wireless fashion (S27). CPU 211 (FIG. 1) of Device C retrieves the door locked message data from Door Locked Message Data Storage Area 206C571b3 and displays the data on LCD 201 (FIG. 1) of Device C (S28).

This paragraph illustrate(s) Door Lock Log Data Sharing Software 206A571c4 of Device A and Door Lock Log Data Sharing Software 206B571c4 of Device B, which share(s) the door lock log data. In this embodiment, CPU 211 (FIG. 1) of Device A retrieves all door lock log data (e.g., Door Lock Log Data#1 through #4) from Door Lock Log Data Storage Area 206A571b7 and sends the data to Device B in a wireless fashion (S1). CPU 211 (FIG. 1) of Device B receives the door lock log data (e.g., Door Lock Log Data#1 through #4) from Device A in a wireless fashion and stores the data in Door Lock Log Data Storage Area 206B571b7 (S2). The foregoing sequence is repeated periodically.

This paragraph illustrate(s) Door Lock Log Data Sharing Software 206A571c4 of Device A and Door Lock Log Data Sharing Software 206C571c4 of Device C, which share(s) the door lock log data. In this embodiment, CPU 211 (FIG. 1) of Device A retrieves all door lock log data (e.g., Door Lock Log Data#1 through #4) from Door Lock Log Data Storage Area 206A571b7 and sends the data to Device C in a wireless fashion (S1). CPU 211 (FIG. 1) of Device C receives the door lock log data (e.g., Door Lock Log Data#1 through #4) from Device A in a wireless fashion and stores the data in Door Lock Log Data Storage Area 206C571b7 (S2). The foregoing sequence is repeated periodically.

This paragraph illustrate(s) Individual Lock Log Data Displaying Software 206A571c5 of Device A, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device A retrieves all door lock log IDs (e.g., Door Lock Log#1 through #4) from Door Lock Log Data Storage Area 206A571b7 (S2). CPU 211 (FIG. 1) of Device A displays the door lock log IDs (e.g., Door Lock Log#1 through #4) retrieved in the previous step on LCD 201 (FIG. 1) of Device A (S3). The user selects, by utilizing Input Device 210 (FIG. 1) or via voice recognition system, a door lock log ID (e.g., Door Lock Log#1) (S4). CPU 211 (FIG. 1) of Device A retrieves the door lock log data (e.g., Door Lock Log Data#1) corresponding to the door lock log ID (e.g., Door Lock Log#1) selected in the previous step from Door Lock Log Data Storage Area 206A571b7 (S5). CPU 211 (FIG. 1) of Device A retrieves the door locked time data, the user code data, and the device code data (e.g., the 1st device code data) from the door lock log data (e.g., Door Lock Log Data#1) retrieved in the previous step (S6). CPU 211 (FIG. 1) of Device A displays the door locked time data, the user code data, and the device code data (e.g., the 1st device code data) retrieved in the previous step on LCD 201 (FIG. 1) of Device A (S7). CPU 211 (FIG. 1) of Device A retrieves the map data from Map Data Storage Area 206A571b5 (S8). CPU 211 (FIG. 1) of Device A displays the map data retrieved in the previous step on LCD 201 (FIG. 1) of Device A (S9). CPU 211 (FIG. 1) of Device A retrieves the 1st device location data from the door lock log data (e.g., Door Lock Log Data#1) retrieved in S5 (S10). CPU 211 (FIG. 1) of Device A retrieves the 1st device icon data from 1st Device Icon Data Storage Area 206A571b6a (S11). CPU 211 (FIG. 1) of Device A displays the 1st device icon data retrieved in the previous step at the location corresponding to the 1st device location data retrieved in S10 on the map data displayed in S9 (S12). CPU 211 (FIG. 1) of Device A retrieves the 2nd device location data from the door lock log data (e.g., Door Lock Log Data#1) retrieved in S5 (S13). CPU 211 (FIG. 1) of Device A retrieves the 2nd device icon data from 2nd Device Icon Data Storage Area 206A571b6b (S14). CPU 211 (FIG. 1) of Device A displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Lock Log Data Displaying Software 206B571c5 of Device B, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device B retrieves all door lock log IDs (e.g., Door Lock Log#1 through #4) from Door Lock Log Data Storage Area 206B571b7 (S2). CPU 211 (FIG. 1) of Device B displays the door lock log IDs (e.g., Door Lock Log#1 through #4) retrieved in the previous step on LCD 201 (FIG. 1) of Device B (S3). The user selects, by utilizing Input Device 210 (FIG. 1) or via voice recognition system, a door lock log ID (e.g., Door Lock Log#1) (S4). CPU 211 (FIG. 1) of Device B retrieves the door lock log data (e.g., Door Lock Log Data#1) corresponding to the door lock log ID (e.g., Door Lock Log#1) selected in the previous step from Door Lock Log Data Storage Area 206B571b7 (S5). CPU 211 (FIG. 1) of Device B retrieves the door locked time data, the user code data, and the device code data (e.g., the 1st device code data) from the door lock log data (e.g., Door Lock Log Data#1) retrieved in the previous step (S6). CPU 211 (FIG. 1) of Device B displays the door locked time data, the user code data, and the device code data (e.g., the 1st device code data) retrieved in the previous step on LCD 201 (FIG. 1) of Device B (S7). CPU 211 (FIG. 1) of Device B retrieves the map data from Map Data Storage Area 206B571b5 (S8). CPU 211 (FIG. 1) of Device B displays the map data retrieved in the previous step on LCD 201 (FIG. 1) of Device B (S9). CPU 211 (FIG. 1) of Device B retrieves the 1st device location data from the door lock log data (e.g., Door Lock Log Data#1) retrieved in S5 (S10). CPU 211 (FIG. 1) of Device B retrieves the 1st device icon data from 1st Device Icon Data Storage Area 206B571b6a (S11). CPU 211 (FIG. 1) of Device B displays the 1st device icon data retrieved in the previous step at the location corresponding to the 1st device location data retrieved in S10 on the map data displayed in S9 (S12). CPU 211 (FIG. 1) of Device B retrieves the 2nd device location data from the door lock log data (e.g., Door Lock Log Data#1) retrieved in S5 (S13). CPU 211 (FIG. 1) of Device B retrieves the 2nd device icon data from 2nd Device Icon Data Storage Area 206B571b6b (S14). CPU 211 (FIG. 1) of Device B displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Lock Log Data Displaying Software 206C571c5 of Device C, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device C retrieves all door lock log IDs (e.g., Door Lock Log#1 through #4) from Door Lock Log Data Storage Area 206C571b7 (S2). CPU 211 (FIG. 1) of Device C displays the door lock log IDs (e.g., Door Lock Log#1 through #4) retrieved in the previous step on LCD 201 (FIG. 1) of Device C (S3). The user selects, by utilizing Input Device 210 (FIG. 1) or via voice recognition system, a door lock log ID (e.g., Door Lock Log#1) (S4). CPU 211 (FIG. 1) of Device C retrieves the door lock log data (e.g., Door Lock Log Data#1) corresponding to the door lock log ID (e.g., Door Lock Log#1) selected in the previous step from Door Lock Log Data Storage Area 206C571b7 (S5). CPU 211 (FIG. 1) of Device C retrieves the door locked time data, the user code data, and the device code data (e.g., the 2nd device code data) from the door lock log data (e.g., Door Lock Log Data#1) retrieved in the previous step (S6). CPU 211 (FIG. 1) of Device C displays the door locked time data, the user code data, and the device code data (e.g., the 2nd device code data) retrieved in the previous step on LCD 201 (FIG. 1) of Device C (S7). CPU 211 (FIG. 1) of Device C retrieves the map data from Map Data Storage Area 206C571b5 (S8). CPU 211 (FIG. 1) of Device C displays the map data retrieved in the previous step on LCD 201 (FIG. 1) of Device C (S9). CPU 211 (FIG. 1) of Device C retrieves the 1st device location data from the door lock log data (e.g., Door Lock Log Data#1) retrieved in S5 (S10). CPU 211 (FIG. 1) of Device C retrieves the 1st device icon data from 1st Device Icon Data Storage Area 206C571b6a (S11). CPU 211 (FIG. 1) of Device C displays the 1st device icon data retrieved in the previous step at the location corresponding to the 1st device location data retrieved in S10 on the map data displayed in S9 (S12). CPU 211 (FIG. 1) of Device C retrieves the 2nd device location data from the door lock log data (e.g., Door Lock Log Data#1) retrieved in S5 (S13). CPU 211 (FIG. 1) of Device C retrieves the 2nd device icon data from 2nd Device Icon Data Storage Area 206C571b6b (S14). CPU 211 (FIG. 1) of Device C displays the 2nd device icon data retrieved in the previous step at the location corresponding to the 2nd device location data retrieved in S13 on the map data displayed in S9 (S15). Thus, the geographic locations of Device C and Device C are displayed on the map data simultaneously.

The following paragraphs illustrate another embodiment wherein Host H and Device B play the major role in implementing the present function.

This paragraph illustrate(s) 1st Device Location Data Producing Software H571c1 of Host H and 1st Device Location Data Producing Software 206B571c1 of Device B, which produce(s) the 1st device location data. In this embodiment, CPU 211 (FIG. 1) of Device B identifies the current location of Device B (S1). CPU 211 (FIG. 1) of Device B produces the 1st device location data by referring to the current location identified in the previous step and sends the data to Host H in a wireless fashion (S2). Host H receives the 1st device location data from Device B and stores the data in 1st Device Location Data Storage Area H571b4a (S3). The foregoing sequence is repeated periodically.

This paragraph illustrate(s) 2nd Device Location Data Producing Software 206C571c2 of Device C, which produce(s) the 2nd device location data. In this embodiment, CPU 211 (FIG. 1) of Device C identifies the current location of Device C (S1). CPU 211 (FIG. 1) of Device C produces the 2nd device location data by referring to the current location identified in the previous step (S2). CPU 211 (FIG. 1) of Device C stores the 2nd device location data produced in the previous step in 2nd Device Location Data Storage Area 206C571b4b (S3). The foregoing sequence is repeated periodically.

This paragraph illustrate(s) Door Locking Software H571c3 of Host H, Door Locking Software 206A571c3 of Device A, Door Locking Software 206B571c3 of Device B, and Door Locking Software 206C571c3 of Device C, which lock(s) the door (not shown). Assuming that the door is locked by utilizing the Host H. In this embodiment, the user inputs, by utilizing Input Device 210 (FIG. 1) or via voice recognition system, the door locking command (S1). Here, the door locking command is the command to lock the door (not shown). CPU 211 (FIG. 1) of Device B sends the door locking command input in the previous step to Host H in a wireless fashion (S2). Host H receives the door locking command from Device B (S3). Host H retrieves the user code data from User Code Data Storage Area H571b1 and sends the data to Device A (S4). CPU 211 (FIG. 1) of Device A receives the user code data from Host H in a wireless fashion (S5). Host H retrieves the 1st device code data from 1st Device Code Data Storage Area H571b2a and sends the data to Device A (S6). CPU 211 (FIG. 1) of Device A receives the 1st device code data from Host H in a wireless fashion (S7). CPU 211 (FIG. 1) of Device A retrieves the user code data from User Code Data Storage Area 206A571b1 (S8). If the user code data received in S5 and the user code data retrieved in the previous step matches, CPU 211 (FIG. 1) of Device A proceeds to the next step (S9). CPU 211 (FIG. 1) of Device A activates Door Locking Device DLD571 (S10). CPU 211 (FIG. 1) of Device A sends the 1st device location data transferring request to Host H in a wireless fashion (S11). Here, the 1st device location data transferring request is the request to transfer the 1st device location data. CPU 211 (FIG. 1) of Device B receives the 1st device location data transferring request from Device A (S12). CPU 211 (FIG. 1) of Device B retrieves the 1st device location data from 1st Device Location Data Storage Area H571b4a and sends the data to Device A (S13). CPU 211 (FIG. 1) of Device A receives the 1st device location data from Host H in a wireless fashion and stores the data in 1st Device Location Data Storage Area 206A571b4a (S14). CPU 211 (FIG. 1) of Device A sends the 2nd device location data transferring request to Device C in a wireless fashion (S15). Here, the 2nd device location data transferring request is the request to transfer the 2nd device location data. CPU 211 (FIG. 1) of Device C receives the 2nd device location data transferring request from Device A (S16). CPU 211 (FIG. 1) of Device C retrieves the 2nd device location data from 2nd Device Location Data Storage Area 206C571b4b and sends the data to Device A in a wireless fashion (S17). CPU 211 (FIG. 1) of Device A receives the 2nd device location data from Device C in a wireless fashion and stores the data in 2nd Device Location Data Storage Area 206A571b4b (S18). CPU 211 (FIG. 1) of Device A identifies the current time and date (S19). CPU 211 (FIG. 1) of Device A produces the door locked time data by utilizing the current time and date identified in the previous step (S20). CPU 211 (FIG. 1) of Device A produces the door lock log data (e.g., Door Lock Log Data#3) by utilizing the door locked time data produced in the previous step, the user code data received in S5, the 1st device code data received in S7, the 1st device location data received in S14, and the 2nd device location data received in S18 (S21). CPU 211 (FIG. 1) of Device A stores the door lock log data (e.g., Door Lock Log Data#3) produced in the previous step in Door Lock Log Data Storage Area 206A571b7 (S22). CPU 211 (FIG. 1) of Device A retrieves the door locked message data from Door Locked Message Data Storage Area 206A571b3 and displays the data on LCD 201 (FIG. 1) of Device A (S23). CPU 211 (FIG. 1) of Device A sends the door locked notice to Host H in a wireless fashion (S24). Here, the door locked notice indicates that the door is locked. Host H receives the door locked notice from Device A (S25). Host H retrieves the door locked message data from Door Locked Message Data Storage Area H571b3 and sends the data to Device B (S26). CPU 211 (FIG. 1) of Device B receives the door locked message data from Host H in a wireless fashion and displays the data on LCD 201 (FIG. 1) of Device B (S27). CPU 211 (FIG. 1) of Device A sends the door locked notice to Device C in a wireless fashion (S28). Here, the door locked notice indicates that the door is locked. CPU 211 (FIG. 1) of Device C receives the door locked notice from Device A in a wireless fashion (S29). CPU 211 (FIG. 1) of Device C retrieves the door locked message data from Door Locked Message Data Storage Area 206C571b3 and displays the data on LCD 201 (FIG. 1) of Device C (S30).

This paragraph illustrate(s) Door Locking Software H571c3 of Host H, Door Locking Software 206A571c3 of Device A, Door Locking Software 206B571c3 of Device B, and Door Locking Software 206C571c3 of Device C, which lock(s) the door (not shown). Assuming that the door is locked by utilizing Device C. In this embodiment, the user inputs, by utilizing Input Device 210 (FIG. 1) or via voice recognition system, the door locking command (S1). Here, the door locking command is the command to lock the door (not shown). CPU 211 (FIG. 1) of Device C retrieves the user code data from User Code Data Storage Area 206C571b1 and sends the data to Device A in a wireless fashion (S2). CPU 211 (FIG. 1) of Device A receives the user code data from Device C in a wireless fashion (S3). CPU 211 (FIG. 1) of Device C retrieves the 2nd device code data from 2nd Device Code Data Storage Area 206C571b2b and sends the data to Device A in a wireless fashion (S4). CPU 211 (FIG. 1) of Device A receives the 2nd device code data from Device C in a wireless fashion (S5). CPU 211 (FIG. 1) of Device A retrieves the user code data from User Code Data Storage Area 206A571b1 (S6). If the user code data received in S3 and the user code data retrieved in the previous step matches, CPU 211 (FIG. 1) of Device A proceeds to the next step (S7). CPU 211 (FIG. 1) of Device A activates Door Locking Device DLD571 (S8). CPU 211 (FIG. 1) of Device A sends the 1st device location data transferring request to Host H in a wireless fashion (S9). Here, the 1st device location data transferring request is the request to transfer the 1st device location data. Host H receives the 1st device location data transferring request from Device A (S10). Host H retrieves the 1st device location data from 1st Device Location Data Storage Area H571b4a and sends the data to Device A (S11). CPU 211 (FIG. 1) of Device A receives the 1st device location data from Host H in a wireless fashion and stores the data in 1st Device Location Data Storage Area 206A571b4a (S12). CPU 211 (FIG. 1) of Device A sends the 2nd device location data transferring request to Device C in a wireless fashion (S13). Here, the 2nd device location data transferring request is the request to transfer the 2nd device location data. CPU 211 (FIG. 1) of Device C receives the 2nd device location data transferring request from Device A in a wireless fashion (S14). CPU 211 (FIG. 1) of Device C retrieves the 2nd device location data from 2nd Device Location Data Storage Area 206C571b4b and sends the data to Device A in a wireless fashion (S15). CPU 211 (FIG. 1) of Device A receives the 2nd device location data from Device C in a wireless fashion and stores the data in 2nd Device Location Data Storage Area 206A571b4b (S16). CPU 211 (FIG. 1) of Device A identifies the current time and date (S17). CPU 211 (FIG. 1) of Device A produces the door locked time data by utilizing the current time and date identified in the previous step (S18). CPU 211 (FIG. 1) of Device A produces the door lock log data (e.g., Door Lock Log Data#4) by utilizing the door locked time data produced in the previous step, the user code data received in S3, the 2nd device code data received in S5, the 1st device location data received in S12, and the 2nd device location data received in S16 (S19). CPU 211 (FIG. 1) of Device A stores the door lock log data (e.g., Door Lock Log Data#4) produced in the previous step in Door Lock Log Data Storage Area 206A571b7 (S20). CPU 211 (FIG. 1) of Device A retrieves the door locked message data from Door Locked Message Data Storage Area 206A571b3 and displays the data on LCD 201 (FIG. 1) of Device A (S21). CPU 211 (FIG. 1) of Device A sends the door locked notice to Host H in a wireless fashion (S22). Here, the door locked notice indicates that the door is locked. Host H receives the door locked notice from Device A (S23). Host H retrieves the door locked message data from Door Locked Message Data Storage Area H571b3 and sends the data to Device B (S24). CPU 211 (FIG. 1) of Device B receives the door locked message data from Host H in a wireless fashion and displays the data on LCD 201 (FIG. 1) of Device B (S25). CPU 211 (FIG. 1) of Device A sends the door locked notice to Device C in a wireless fashion (S26). Here, the door locked notice indicates that the door is locked. CPU 211 (FIG. 1) of Device C receives the door locked notice from Device A in a wireless fashion (S27). CPU 211 (FIG. 1) of Device C retrieves the door locked message data from Door Locked Message Data Storage Area 206C571b3 and displays the data on LCD 201 (FIG. 1) of Device C (S28).

This paragraph illustrate(s) Door Lock Log Data Sharing Software H571c4 of Host H and Door Lock Log Data Sharing Software 206A571c4 of Device A, which share(s) the door lock log data. In this embodiment, CPU 211 (FIG. 1) of Device A retrieves all door lock log data (e.g., Door Lock Log Data#1 through #4) from Door Lock Log Data Storage Area 206A571b7 and sends the data to Host H in a wireless fashion (S1). Host H receives the door lock log data (e.g., Door Lock Log Data#1 through #4) from Device A and stores the data in Door Lock Log Data Storage Area H571b7 (S2). The foregoing sequence is repeated periodically.

This paragraph illustrate(s) Door Lock Log Data Sharing Software 206A571c4 of Device A and Door Lock Log Data Sharing Software 206C571c4 of Device C, which share(s) the door lock log data. In this embodiment, CPU 211 (FIG. 1) of Device A retrieves all door lock log data (e.g., Door Lock Log Data#1 through #4) from Door Lock Log Data Storage Area 206A571b7 and sends the data to Device C in a wireless fashion (S1). CPU 211 (FIG. 1) of Device C receives the door lock log data (e.g., Door Lock Log Data#1 through #4) from Device A and stores the data in Door Lock Log Data Storage Area 206C571b7 (S2). The foregoing sequence is repeated periodically.

This paragraph illustrate(s) Individual Lock Log Data Displaying Software 206A571c5 of Device A, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device A retrieves all door lock log IDs (e.g., Door Lock Log#1 through #4) from Door Lock Log Data Storage Area 206A571b7 (S2). CPU 211 (FIG. 1) of Device A displays the door lock log IDs (e.g., Door Lock Log#1 through #4) retrieved in the previous step on LCD 201 (FIG. 1) of Device A (S3). The user selects, by utilizing Input Device 210 (FIG. 1) or via voice recognition system, a door lock log ID (e.g., Door Lock Log#1) (S4). CPU 211 (FIG. 1) of Device A retrieves the door lock log data (e.g., Door Lock Log Data#1) corresponding to the door lock log ID (e.g., Door Lock Log#1) selected in the previous step from Door Lock Log Data Storage Area 206A571b7 (S5). CPU 211 (FIG. 1) of Device A retrieves the door locked time data, the user code data, and the device code data (e.g., the 1st device code data) from the door lock log data (e.g., Door Lock Log Data#1) retrieved in the previous step (S6). CPU 211 (FIG. 1) of Device A displays the door locked time data, the user code data, and the device code data (e.g., the 1st device code data) retrieved in the previous step on LCD 201 (FIG. 1) of Device A (S7). CPU 211 (FIG. 1) of Device A retrieves the map data from Map Data Storage Area 206A571b5 (S8). CPU 211 (FIG. 1) of Device A displays the map data retrieved in the previous step on LCD 201 (FIG. 1) of Device A (S9). CPU 211 (FIG. 1) of Device A retrieves the 1st device location data from the door lock log data (e.g., Door Lock Log Data#1) retrieved in S5 (S10). CPU 211 (FIG. 1) of Device A retrieves the 1st device icon data from 1st Device Icon Data Storage Area 206A571b6a (S11). CPU 211 (FIG. 1) of Device A displays the 1st device icon data retrieved in the previous step at the location corresponding to the 1st device location data retrieved in S10 on the map data displayed in S9 (S12). CPU 211 (FIG. 1) of Device A retrieves the 2nd device location data from the door lock log data (e.g., Door Lock Log Data#1) retrieved in S5 (S13). CPU 211 (FIG. 1) of Device A retrieves the 2nd device icon data from 2nd Device Icon Data Storage Area 206A571b6b (S14). CPU 211 (FIG. 1) of Device A displays the 2nd device icon data retrieved in the previous step at the location corresponding to the 2nd device location data retrieved in S13 on the map data displayed in S9 (S15). Thus, the geographic locations of Device B and Device C are displayed on the map data simultaneously.

This paragraph illustrate(s) Individual Lock Log Data Displaying Software H571c5 of Host H and Individual Lock Log Data Displaying Software 206B571c5 of Device B, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device B sends the door lock log data displaying command input in the previous step to Host H in a wireless fashion (S2). Host H receives the door lock log data displaying command from Device B (S3). Host H retrieves all door lock log IDs (e.g., Door Lock Log#1 through #4) from Door Lock Log Data Storage Area H571b7 and sends the data to Device B (S4). CPU 211 (FIG. 1) of Device B receives the door lock log IDs (e.g., Door Lock Log#1 through #4) from Host H in a wireless fashion and displays the data on LCD 201 (FIG. 1) of Device B (S5). The user selects, by utilizing Input Device 210 (FIG. 1) or via voice recognition system, a door lock log ID (e.g., Door Lock Log#1) (S6). CPU 211 (FIG. 1) of Device B sends the door lock log ID (e.g., Door Lock Log#1) selected in the previous step to Host H in a wireless fashion (S7). Host H receives the door lock log ID (e.g., Door Lock Log#1) from Device B (S8). Host H retrieves the door lock log data (e.g., Door Lock Log Data#1) corresponding to the door lock log ID (e.g., Door Lock Log#1) received in the previous step from Door Lock Log Data Storage Area H571*b*7 (S9). Host H retrieves the door locked time data, the user code data, and the device code data (e.g., the 1st device code data) from the door lock log data (e.g., Door Lock Log Data#1) retrieved in the previous step and sends the data to Device B (S10). CPU 211 (FIG. 1) of Device B receives the door locked time data, the user code data, and the device code data (e.g., the 1st device code data) from Host H in a wireless fashion and displays the data on LCD 201 (FIG. 1) of Device B (S11). Host H retrieves the map data from Map Data Storage Area H571*b*5 and sends the data to Device B (S12). CPU 211 (FIG. 1) of Device B receives the map data from Host H in a wireless fashion and displays the data on LCD 201 (FIG. 1) of Device B (S13). Host H retrieves the 1st device location data from the door lock log data (e.g., Door Lock Log Data#1) retrieved in S9 and sends the data to Device B (S14). CPU 211 (FIG. 1) of Device B receives the 1st device location data from Host H in a wireless fashion (S15). Host H retrieves the 1st device icon data from 1st Device Icon Data Storage Area H571*b*6*a* and sends the data to Device B (S16). CPU 211 (FIG. 1) of Device B receives the 1st device icon data from Host H in a wireless fashion (S17). CPU 211 (FIG. 1) of Device B displays the 1st device icon data received in the previous step at the location corresponding to the 1st device location data received in S15 on the map data displayed in S13 (S18). Host H retrieves the 2nd device location data from the door lock log data (e.g., Door Lock Log Data#1) retrieved in S9 and sends the data to Device B (S19). CPU 211 (FIG. 1) of Device B receives the 2nd device location data from Host H in a wireless fashion (S20). Host H retrieves the 2nd device icon data from 2nd Device Icon Data Storage Area H571*b*6*b* and sends the data to Device B (S21). CPU 211 (FIG. 1) of Device B receives the 2nd device icon data from Host H in a wireless fashion (S22). CPU 211 (FIG. 1) of Device B displays the 2nd device icon data received in the previous step at the location corresponding to the 2nd device location data received in S20 on the map data displayed in S13 (S23). Thus, the geographic locations of Device B and Device C are displayed on the map data simultaneously.

This paragraph illustrate(s) Individual Lock Log Data Displaying Software 206C571*c*5 of Device C, which display(s) the door lock log data individually. In this embodiment, the user inputs, by utilizing Input Device 210 (FIG. 1) or via voice recognition system, the door lock log data displaying command (S1). Here, the door lock log data displaying command is the command to display the door lock log data. CPU 211 (FIG. 1) of Device C retrieves all door lock log IDs (e.g., Door Lock Log#1 through #4) from Door Lock Log Data Storage Area 206C571*b*7 (S2). CPU 211 (FIG. 1) of Device C displays the door lock log IDs (e.g., Door Lock Log#1 through #4) retrieved in the previous step on LCD 201 (FIG. 1) of Device C (S3). The user selects, by utilizing Input Device 210 (FIG. 1) or via voice recognition system, a door lock log ID (e.g., Door Lock Log#1) (S4). CPU 211 (FIG. 1) of Device C retrieves the door lock log data (e.g., Door Lock Log Data#1) corresponding to the door lock log ID (e.g., Door Lock Log#1) selected in the previous step from Door Lock Log Data Storage Area 206C571*b*7 (S5). CPU 211 (FIG. 1) of Device C retrieves the door locked time data, the user code data, and the device code data (e.g., the 2nd device code data) from the door lock log data (e.g., Door Lock Log Data#1) retrieved in the previous step (S6). CPU 211 (FIG. 1) of Device C displays the door locked time data, the user code data, and the device code data (e.g., the 2nd device code data) retrieved in the previous step on LCD 201 (FIG. 1) of Device C (S7). CPU 211 (FIG. 1) of Device C retrieves the map data from Map Data Storage Area 206C571*b*5 (S8). CPU 211 (FIG. 1) of Device C displays the map data retrieved in the previous step on LCD 201 (FIG. 1) of Device C (S9). CPU 211 (FIG. 1) of Device C retrieves the 1st device location data from the door lock log data (e.g., Door Lock Log Data#1) retrieved in S5 (S10). CPU 211 (FIG. 1) of Device C retrieves the 1st device icon data from 1st Device Icon Data Storage Area 206C571*b*6*a* (S11). CPU 211 (FIG. 1) of Device C displays the 1st device icon data retrieved in the previous step at the location corresponding to the 1st device location data retrieved in S10 on the map data displayed in S9 (S12). CPU 211 (FIG. 1) of Device C retrieves the 2nd device location data from the door lock log data (e.g., Door Lock Log Data#1) retrieved in S5 (S13). CPU 211 (FIG. 1) of Device C retrieves the 2nd device icon data from 2nd Device Icon Data Storage Area 206C571*b*6*b* (S14). CPU 211 (FIG. 1) of Device C displays the 2nd device icon data retrieved in the previous step at the location corresponding to the 2nd device location data retrieved in S13 on the map data displayed in S9 (S15). Thus, the geographic locations of Device C and Device C are displayed on the map data simultaneously.

<<Caller's Information Displaying Function>>

The following paragraphs illustrate the Caller's Information displaying function which displays the Information regarding the caller (e.g., name, phone number, email address, and home address, etc.) on LCD 201 (FIG. 1) when Communication Device 200 is utilized as a 'TV phone'.

The first set of paragraphs hereinafter illustrate the data and software programs stored in RAM 206 (FIG. 1) of Caller's Device, a Communication Device 200, utilized by the caller.

The second set of paragraphs hereinafter illustrate the data and software programs stored in RAM 206 (FIG. 1) of Callee's Device, a Communication Device 200, utilized by the callee.

The third set of paragraphs hereinafter illustrate the data and software programs stored in Host H.

This paragraph illustrates the storage area included in RAM 206 (FIG. 1) of Caller's Device. In the present embodiment, RAM 206 of Caller's Device includes Caller's Information Displaying Information Storage Area 20655*a* of which the data and the software programs stored therein are described hereinafter.

This paragraph illustrates the storage areas included in Caller's Information Displaying Information Storage Area 20655*a*. In the present embodiment, Caller's Information Displaying Information Storage Area 20655*a* includes Caller's Information Displaying Data Storage Area 20655*b* and Caller's Information Displaying Software Storage Area 20655*c*. Caller's Information Displaying Data Storage Area 20655*b* stores the data necessary to implement the present function on the side of Caller's Device, such as the ones described hereinafter. Caller's Information Displaying Software Storage Area 20655*c* stores the software programs necessary to implement the present function on the side of Caller's Device, such as the ones described hereinafter.

This paragraph illustrates the storage areas included in Caller's Information Displaying Data Storage Area 20655*b*.

In the present embodiment, Caller's Information Displaying Data Storage Area 20655*b* includes Caller's Audiovisual Data Storage Area 20655*b*1, Callee's Audiovisual Data Storage Area 20655*b*2, Caller's Personal Data Storage Area 20655*b*3, Callee's Personal Data Storage Area 20655*b*4, Caller's Calculated GPS Data Storage Area 20655*b*5, Callee's Calculated GPS Data Storage Area 20655*b*6, Caller's Map Data Storage Area 20655*b*7, Callee's Map Data Storage Area 20655*b*8, and Work Area 20655*b*9. Caller's Audiovisual Data Storage Area 20655*b*1 stores the data described hereinafter. Callee's Audiovisual Data Storage Area 20655*b*2 stores the data described hereinafter. Caller's Personal Data Storage Area 20655*b*3 stores the data described hereinafter. Callee's Personal Data Storage Area 20655*b*4 stores the data described hereinafter. Caller's Calculated GPS Data Storage Area 20655*b*5 stores the caller's calculated GPS data which represents the current geographic location of Caller's Device in (x, y, z) format. Callee's Calculated GPS Data Storage Area 20655*b*6 stores the callee's calculated GPS data which represents the current geographic location of Callee's Device in (x, y, z) format. Caller's Map Data Storage Area 20655*b*7 stores the map data representing the surrounding area of the location indicated by the caller's calculated GPS data. Callee's Map Data Storage Area 20655*b*8 stores the map data representing the surrounding area of the location indicated by the callee's calculated GPS data. Work Area 20655*b*9 is a storage area utilized to perform calculation and to temporarily store data.

This paragraph illustrates the storage areas included in Caller's Audiovisual Data Storage Area 20655*b*1. In the present embodiment, Caller's Audiovisual Data Storage Area 20655*b*1 includes Caller's Audio Data Storage Area 20655*b*1*a* and Caller's Visual Data Storage Area 20655*b*1*b*. Caller's Audio Data Storage Area 20655*b*1*a* stores the caller's audio data which represents the audio data input via Microphone 215 (FIG. 1) of Caller's Device. Caller's Visual Data Storage Area 20655*b*1*b* stores the caller's visual data which represents the visual data input via CCD Unit 214 (FIG. 1) of Caller's Device.

This paragraph illustrates the storage areas included in Callee's Audiovisual Data Storage Area 20655*b*2. In the present embodiment, Callee's Audiovisual Data Storage Area 20655*b*2 includes Callee's Audio Data Storage Area 20655*b*2*a* and Callee's Visual Data Storage Area 20655*b*2*b*. Callee's Audio Data Storage Area 20655*b*2*a* stores the callee's audio data which represents the audio data sent from Callee's Device. Callee's Visual Data Storage Area 20655*b*2*b* stores the callee's visual data which represents the visual data sent from Callee's Device.

This paragraph illustrates the data stored in Caller's Personal Data Storage Area 20655*b*3. In the present embodiment, Caller's Personal Data Storage Area 20655*b*3 comprises two columns, i.e., 'Caller's Personal Data' and 'Permitted Caller's Personal Data Flag'. Column 'Caller's Personal Data' stores the caller's personal data which represent the personal data of the caller. Column 'Permitted Caller's Personal Data Flag' stores the permitted caller's personal data flag and each permitted caller's personal data flag represents whether the corresponding caller's personal data is permitted to be displayed on Callee's Device. The permitted caller's personal data flag is represented by either '1' or '0' wherein '1' indicates that the corresponding caller's personal data is permitted to be displayed on Callee's Device, and '0' indicates that the corresponding caller's personal data is not permitted to be displayed on Callee's Device. In the present embodiment, Caller's Personal Data Storage Area 20655*b*3 stores the following data: the caller's name and the corresponding permitted caller's personal data flag '1'; the caller's phone number and the corresponding permitted caller's personal data flag '1'; the caller's email address and the corresponding permitted caller's personal data flag '1'; the caller's home address and the corresponding permitted caller's personal data flag '1'; the caller's business address and the corresponding permitted caller's personal data flag '0'; the caller's title and the corresponding permitted caller's personal data flag '0'; the caller's hobby and the corresponding permitted caller's personal data flag '0'; the caller's blood type and the corresponding permitted caller's personal data flag '0'; the caller's gender and the corresponding permitted caller's personal data flag '0'; the caller's age and the corresponding permitted caller's personal data flag '0'; and caller's date of birth and the corresponding permitted caller's personal data flag '0'.

This paragraph illustrates the data stored in Callee's Personal Data Storage Area 20655*b*4. In the present embodiment, Callee's Personal Data Storage Area 20655*b*4 stores the callee's personal data which represent the personal data of the callee which are displayed on LCD 201 (FIG. 1) of Caller's Device. In the present embodiment, Callee's Personal Data Storage Area 20655*b*4 stores the callee's name and phone number.

This paragraph illustrates the software programs stored in Caller's Information Displaying Software Storage Area 20655*c*. In the present embodiment, Caller's Information Displaying Software Storage Area 20655*c* stores Permitted Caller's Personal Data Selecting Software 20655*c*1, Dialing Software 20655*c*2, Caller's Device Pin-pointing Software 20655*c*3, Map Data Sending/Receiving Software 20655*c*4, Caller's Audiovisual Data Collecting Software 20655*c*5, Caller's Information Sending/Receiving Software 20655*c*6, Callee's Information Sending/Receiving Software 20655*c*6*a*, Permitted Callee's Personal Data Displaying Software 20655*c*7, Map Displaying Software 20655*c*8, Callee's Audio Data Outputting Software 20655*c*9, and Callee's Visual Data Displaying Software 20655*c*10. Permitted Caller's Personal Data Selecting Software 20655*c*1 is the software program described hereinafter. Dialing Software 20655*c*2 is the software program described hereinafter. Caller's Device Pin-pointing Software 20655*c*3 is the software program described hereinafter. Map Data Sending/Receiving Software 20655*c*4 is the software program described hereinafter. Caller's Audiovisual Data Collecting Software 20655*c*5 is the software program described hereinafter. Caller's Information Sending/Receiving Software 20655*c*6 is the software program described hereinafter. Callee's Information Sending/Receiving Software 20655*c*6*a* is the software program described hereinafter. Permitted Callee's Personal Data Displaying Software 20655*c*7 is the software program described hereinafter. Map Displaying Software 20655*c*8 is the software program described hereinafter. Callee's Audio Data Outputting Software 20655*c*9 is the software program described hereinafter. Callee's Visual Data Displaying Software 20655*c*10 is the software program described hereinafter.

This paragraph illustrates the storage area included in RAM 206A (FIG. 1) of Callee's Device. In the present embodiment, RAM 206A of Callee's Device includes Callee's Information Displaying Information Storage Area 20655*a*A of which the data and the software programs stored therein are described hereinafter.

This paragraph illustrates the storage areas included in Callee's Information Displaying Information Storage Area 20655*a*A. In the present embodiment, Callee's Information Displaying Information Storage Area 20655*a*A includes Callee's Information Displaying Data Storage Area 20655*b*A and Callee's Information Displaying Software Storage Area 20655cA. Callee's Information Displaying Data Storage Area 20655bA stores the data necessary to implement the present function on the side of Callee's Device, such as the ones described hereinafter. Callee's Information Displaying Software Storage Area 20655cA stores the software programs necessary to implement the present function on the side of Callee's Device, such as the ones described hereinafter.

This paragraph illustrates the storage areas included in Callee's Information Displaying Data Storage Area 20655bA. In the present embodiment, Callee's Information Displaying Data Storage Area 20655bA includes Caller's Audiovisual Data Storage Area 20655b1A, Callee's Audiovisual Data Storage Area 20655b2A, Caller's Personal Data Storage Area 20655b3A, Callee's Personal Data Storage Area 20655b4A, Caller's Calculated GPS Data Storage Area 20655b5A, Callee's Calculated GPS Data Storage Area 20655b6A, Caller's Map Data Storage Area 20655b7A, Callee's Map Data Storage Area 20655b8A, and Work Area 20655b9A. Caller's Audiovisual Data Storage Area 20655b1A stores the data described hereinafter. Callee's Audiovisual Data Storage Area 20655b2A stores the data described hereinafter. Caller's Personal Data Storage Area 20655b3A stores the data described hereinafter. Callee's Personal Data Storage Area 20655b4A stores the data described hereinafter. Caller's Calculated GPS Data Storage Area 20655b5A stores the caller's calculated GPS data which represents the current geographic location of Caller's Device in (x, y, z) format. Callee's Calculated GPS Data Storage Area 20655b6A stores the callee's calculated GPS data which represents the current geographic location of Callee's Device in (x, y, z) format. Caller's Map Data Storage Area 20655b7A stores the map data representing the surrounding area of the location indicated by the caller's calculated GPS data. Callee's Map Data Storage Area 20655b8A stores the map data representing the surrounding area of the location indicated by the callee's calculated GPS data. Work Area 20655b9A is a storage area utilized to perform calculation and to temporarily store data.

This paragraph illustrates the storage areas included in Caller's Audiovisual Data Storage Area 20655b1A. In the present embodiment, Caller's Audiovisual Data Storage Area 20655b1A includes Caller's Audio Data Storage Area 20655b1aA and Caller's Visual Data Storage Area 20655b1bA. Caller's Audio Data Storage Area 20655b1aA stores the caller's audio data which represents the audio data sent from Caller's Device in a wireless fashion. Caller's Visual Data Storage Area 20655b1bA stores the caller's visual data which represents the visual data input sent from Caller's Device in a wireless fashion.

This paragraph illustrates the storage areas included in Callee's Audiovisual Data Storage Area 20655b2A. In the present embodiment, Callee's Audiovisual Data Storage Area 20655b2A includes Callee's Audio Data Storage Area 20655b2aA and Callee's Visual Data Storage Area 20655b2bA. Callee's Audio Data Storage Area 20655b2aA stores the callee's audio data which represents the audio data input via Microphone 215 (FIG. 1) of Callee's Device. Callee's Visual Data Storage Area 20655b2bA stores the callee's visual data which represents the visual data input via CCD Unit 214 (FIG. 1) of Callee's Device.

This paragraph illustrates the data stored in Caller's Personal Data Storage Area 20655b3A. In the present embodiment, Caller's Personal Data Storage Area 20655b3A stores the caller's personal data which represent the personal data of the caller which are displayed on LCD 201 (FIG. 1) of Caller's Device. In the present embodiment, Caller's Personal Data Storage Area 20655b3A stores the caller's name, phone number, email address, and home address.

This paragraph illustrates the data stored in Callee's Personal Data Storage Area 20655b4A. In the present embodiment, Callee's Personal Data Storage Area 20655b4A comprises two columns, i.e., 'Callee's Personal Data' and 'Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In the present embodiment, Callee's Personal Data Storage Area 20655b4A stores the following data: callee's name and the corresponding permitted callee's personal data flag '1'; the callee's phone number and the corresponding permitted callee's personal data flag '1'; the callee's email address and the corresponding permitted caller's personal data flag '0'; the callee's home address and the corresponding permitted callee's personal data flag '0'; the callee's business address and the corresponding permitted callee's personal data flag '0'; the callee's title and the corresponding permitted callee's personal data flag '0'; the callee's hobby and the corresponding permitted callee's personal data flag '0'; the callee's blood type and the corresponding permitted callee's personal data flag '0'; the callee's gender and the corresponding permitted callee's personal data flag '0'; the callee's age and the corresponding permitted callee's personal data flag '0'; and callee's date of birth and the corresponding permitted callee's personal data flag '0'.

This paragraph illustrates the software programs stored in Callee's Information Displaying Software Storage Area 20655cA. In the present embodiment, Callee's Information Displaying Software Storage Area 20655cA stores Permitted Callee's Personal Data Selecting Software 20655c1A, Dialing Software 20655c2A, Callee's Device Pin-pointing Software 20655c3A, Map Data Sending/Receiving Software 20655c4A, Callee's Audiovisual Data Collecting Software 20655c5A, Callee's Information Sending/Receiving Software 20655c6A, Caller's Information Sending/Receiving Software 20655c6aA, Permitted Caller's Personal Data Displaying Software 20655c7A, Map Displaying Software 20655c8A, Caller's Audio Data Outputting Software 20655c9A, and Caller's Visual Data Displaying Software 20655c10A. Permitted Callee's Personal Data Selecting Software 20655c1A is the software program described hereinafter. Dialing Software 20655c2A is the software program described hereinafter. Callee's Device Pin-pointing Software 20655c3A is the software program described hereinafter. Map Data Sending/Receiving Software 20655c4A is the software program described hereinafter. Callee's Audiovisual Data Collecting Software 20655c5A is the software program described hereinafter. Callee's Information Sending/Receiving Software 20655c6A is the software program described hereinafter. Caller's Information Sending/Receiving Software 20655c6aA is the software program described hereinafter. Permitted Caller's Personal Data Displaying Software 20655c7A is the software program described hereinafter. Map Displaying Software 20655c8A is the software program described hereinafter. Caller's Audio Data Outputting Software 20655c9A is the software program described hereinafter. Caller's Visual Data Displaying Software 20655c10A is the software program described hereinafter.

This paragraph illustrates the storage area included in Host H. In the present embodiment, Host H includes Caller/Callee Information Storage Area H55a of which the data and the software programs stored therein are described hereinafter.

This paragraph illustrates the storage areas included in Caller/Callee Information Storage Area H55a. In the present embodiment, Caller/Callee Information Storage Area H55a includes Caller/Callee Data Storage Area H55b and Caller/Callee Software Storage Area H55c. Caller/Callee Data Storage Area H55b stores the data necessary to implement the present function on the side of Host H, such as the ones described hereinafter. Caller/Callee Software Storage Area H55c stores the software programs necessary to implement the present function on the side of Host H, such as the ones described hereinafter.

This paragraph illustrates the storage areas included in Caller/Callee Data Storage Area H55b. In the present embodiment, Caller/Callee Data Storage Area H55b includes Caller's Information Storage Area H55b1, Callee's Information Storage Area H55b2, Map Data Storage Area H55b3, Work Area h55b4, Caller's Calculated GPS Data Storage Area H55b5, and Callee's Calculated GPS Data Storage Area H55b6. Caller's Information Storage Area H55b1 stores the Caller's Information received Caller's Device. Callee's Information Storage Area H55b2 stores the Callee's Information received Callee's Device. Map Data Storage Area H55b3 stores the map data received from Caller's Device and Callee's Device. Work Area H55b4 is a storage area utilized to perform calculation and to temporarily store data. Caller's Calculated GPS Data Storage Area H55b5 stores the caller's calculated GPS data. Callee's Calculated GPS Data Storage Area H55b6 stores the callee's calculated GPS data.

This paragraph illustrates the software programs stored in Caller/Callee Software Storage Area H55c. In the present embodiment, Caller/Callee Software Storage Area H55c stores Dialing Software H55c2, Caller's Device Pin-pointing Software H55c3, Callee's Device Pin-pointing Software H55c3a, Map Data Sending/Receiving Software H55c4, Caller's Information Sending/Receiving Software H55c6, and Callee's Information Sending/Receiving Software H55c6a. Dialing Software H55c2 is the software program described hereinafter. Caller's Device Pin-pointing Software H55c3 is the software program described hereinafter. Callee's Device Pin-pointing Software H55c3a is the software program described hereinafter. Map Data Sending/Receiving Software H55c4 is the software program described hereinafter. Caller's Information Sending/Receiving Software H55c6 is the software program described hereinafter. Callee's Information Sending/Receiving Software H55c6a is the software program described hereinafter.

The following paragraphs primarily illustrate the sequence to output the Caller's Information (which is defined hereinafter) from Callee's Device.

This paragraph illustrates Permitted Caller's Personal Data Selecting Software 20655c1 stored in Caller's Information Displaying Software Storage Area 20655c of Caller's Device, which selects the permitted caller's personal data to be displayed on LCD 201 (FIG. 1) of Callee's Device. In the present embodiment, CPU 211 (FIG. 1) of Caller's Device retrieves all of the caller's personal data from Caller's Personal Data Storage Area 20655b3 (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4).

This paragraph illustrates Dialing Software H55c2 stored in Caller/Callee Software Storage Area H55c of Host H, Dialing Software 20655c2 stored in Caller's Information Displaying Software Storage Area 20655c of Caller's Device, and Dialing Software 20655c2A stored in Callee's Information Displaying Software Storage Area 20655cA of Callee's Device, which enables to connect between Caller's Device and Callee's Device via Host H in a wireless fashion. In the present embodiment, a connection is established between Caller's Device and Host H (S1). Next, a connection is established between Host H and Callee's Device (S2). As a result, Caller's Device and Callee's Device are able to exchange audiovisual data, text data, and various types of data with each other. The connection is maintained until Caller's Device, Host H, or Callee's Device terminates the connection.

This paragraph illustrates Caller's Device Pin-pointing Software H55c3 stored in Caller/Callee Software Storage Area H55c of Host H and Caller's Device Pin-pointing Software 20655c3 stored in Caller's Information Displaying Software Storage Area 20655c of Caller's Device, which identifies the current geographic location of Caller's Device. In the present embodiment, CPU 211 (FIG. 1) of Caller's Device collects the GPS raw data from the near base stations (S1). CPU 211 sends the raw GPS data to Host H (S2). Upon receiving the raw GPS data (S3), Host H produces the caller's calculated GPS data by referring to the raw GPS data (S4). Host H stores the caller's calculated GPS data in Caller's Calculated GPS Data Storage Area H55b5 (S5). Host H then retrieves the caller's calculated GPS data from Caller's Calculated GPS Data Storage Area H55b5 (S6), and sends the data to Caller's Device (S7). Upon receiving the caller's calculated GPS data from Host H (S8), CPU 211 stores the data in Caller's Calculated GPS Data Storage Area 20655b5 (S9). Here, the GPS raw data are the primitive data utilized to produce the caller's calculated GPS data, and the caller's calculated GPS data is the data representing the location of Caller's Device in (x, y, z) format. The sequence described in the present paragraph is repeated periodically.

This paragraph illustrates another embodiment of the sequence described hereinbefore in which the entire process is performed solely by Caller's Device Pin-pointing Software 20655c3 stored in Caller's Information Displaying Software Storage Area 20655c of Caller's Device. In the present embodiment, CPU 211 (FIG. 1) of Caller's Device collects the raw GPS data from the near base stations (S1). CPU 211 then produces the caller's calculated GPS data by referring to the raw GPS data (S2), and stores the caller's calculated GPS data in Caller's Calculated GPS Data Storage Area 20655b5 (S3). The sequence described in the present paragraph is repeated periodically.

This paragraph illustrates Map Data Sending/Receiving Software H55c4 stored in Caller/Callee Software Storage Area H55c of Host H and Map Data Sending/Receiving Software 20655c4 stored in Caller's Information Displaying Software Storage Area 20655c of Caller's Device, which sends and receives the map data. In the present embodiment, CPU 211 (FIG. 1) of Caller's Device retrieves the caller's calculated GPS data from Caller's Calculated GPS Data Storage Area 20655b5 (S1), and sends the data to Host H (S2). Upon receiving the calculated GPS data from Caller's Device (S3), Host H identifies the map data in Map Data Storage Area H55b3 (S4). Here, the map data represents the surrounding area of the location indicated by the caller's calculated GPS data. Host H retrieves the map data from Map Data Storage Area H55b3 (S5), and sends the data to Caller's Device (S6). Upon receiving the map data from Host H (S7), Caller's Device stores the data in Caller's Map Data Storage Area 20655b7 (S8). The sequence described in the present paragraph is repeated periodically.

This paragraph illustrates Caller's Audiovisual Data Collecting Software 20655c5 stored in Caller's Information Displaying Software Storage Area 20655c of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655b1a (S2), and the caller's visual data in Caller's Visual Data Storage Area 20655b1b (S3). The sequence described in the present paragraph is repeated periodically.

This paragraph illustrates Caller's Information Sending/Receiving Software H55c6 stored in Caller/Callee Software Storage Area H55c of Host H and Caller's Information Sending/Receiving Software 20655c6 stored in Caller's Information Displaying Software Storage Area 20655c of Caller's Device, which sends and receives the Caller's Information (which is defined hereinafter) between Caller's Device and Host H. In the present embodiment, CPU 211 (FIG. 1) of Caller's Device retrieves the permitted caller's personal data from Caller's Personal Data Storage Area 20655b3 (S1). CPU 211 retrieves the caller's calculated GPS data from Caller's Calculated GPS Data Storage Area 20655b5 (S2). CPU 211 retrieves the map data from Caller's Map Data Storage Area 20655b7 (S3). CPU 211 retrieves the caller's audio data from Caller's Audio Data Storage Area 20655b1a (S4). CPU 211 retrieves the caller's visual data from Caller's Visual Data Storage Area 20655b1b (S5). CPU 211 then sends the data retrieved in S1 through S5 (collectively defined as the 'Caller's Information' hereinafter) to Host H (S6). Upon receiving the Caller's Information from Caller's Device (S7), Host H stores the Caller's Information in Caller's Information Storage Area H55b1 (S8). The sequence described in the present paragraph is repeated periodically.

This paragraph illustrates Caller's Information Sending/Receiving Software H55c6 stored in Caller/Callee Software Storage Area H55c of Host H and Caller's Information Sending/Receiving Software 20655c6aA stored in Caller's Information Displaying Software Storage Area 20655c of Caller's Device, which sends and receives the Caller's Information between Host H and Callee's Device. In the present embodiment, Host H retrieves the Caller's Information from Caller's Information Storage Area H55b1 (S1), and sends the Caller's Information to Callee's Device (S2). CPU 211 (FIG. 1) of Callee's Device receives the Caller's Information from Host H (S3). CPU 211 stores the permitted caller's personal data in Caller's Personal Data Storage Area 20655b3A (S4). CPU 211 stores the caller's calculated GPS data in Caller's Calculated GPS Data Storage Area 20655b5A (S5). CPU 211 stores the map data in Caller's Map Data Storage Area 20655b7A (S6). CPU 211 stores the caller's audio data in Caller's Audio Data Storage Area 20655b1aA (S7). CPU 211 stores the caller's visual data in Caller's Visual Data Storage Area 20655b1bA (S8). The sequence described in the present paragraph is repeated periodically.

This paragraph illustrates Permitted Caller's Personal Data Displaying Software 20655c7A stored in Callee's Information Displaying Software Storage Area 20655cA of Callee's Device, which displays the permitted caller's personal data on LCD 201 (FIG. 1) of Callee's Device. In the present embodiment, CPU 211 (FIG. 1) of Callee's Device retrieves the permitted caller's personal data from Caller's Personal Data Storage Area 20655b3A (S1). CPU 211 then displays the permitted caller's personal data on LCD 201 (FIG. 1) (S2). The sequence described in the present paragraph is repeated periodically.

This paragraph illustrates Map Displaying Software 20655c8A stored in Callee's Information Displaying Software Storage Area 20655cA of Callee's Device, which displays the map representing the surrounding area of the location indicated by the caller's calculated GPS data. In the present embodiment, CPU 211 (FIG. 1) of Callee's Device retrieves the caller's calculated GPS data from Caller's Calculated GPS Data Storage Area 20655b5A (S1). CPU 211 then retrieves the map data from Caller's Map Data Storage Area 20655b7A (S2), and arranges on the map data the caller's current location icon in accordance with the caller's calculated GPS data (S3). Here, the caller's current location icon is an icon which represents the location of Caller's Device in the map data. The map with the caller's current location icon is displayed on LCD 201 (FIG. 1) (S4). The sequence described in the present paragraph is repeated periodically.

This paragraph illustrates Caller's Audio Data Outputting Software 20655c9A stored in Caller's Information Displaying Software Storage Area 20655c of Caller's Device, which outputs the caller's audio data from Speaker 216 (FIG. 1) of Callee's Device. In the present embodiment, CPU 211 (FIG. 1) of Callee's Device retrieves the caller's audio data from Caller's Audio Data Storage Area 20655b1aA (S1). CPU 211 then outputs the caller's audio data from Speaker 216 (FIG. 1) (S2). The sequence described in the present paragraph is repeated periodically.

This paragraph illustrates Caller's Visual Data Displaying Software 20655c10A stored in Callee's Information Displaying Software Storage Area 20655cA of Callee's Device, which displays the caller's visual data on LCD 201 (FIG. 1) of Callee's Device. In the present embodiment, CPU 211 (FIG. 1) of Callee's Device retrieves the caller's visual data from Caller's Visual Data Storage Area 20655b1bA (S1). CPU 211 then displays the caller's visual data on LCD 201 (FIG. 1) (S2). The sequence described in the present paragraph is repeated periodically.

The following paragraphs primarily illustrate the sequence to output the Callee's Information (which is defined hereinafter) from Caller's Device.

This paragraph illustrates Permitted Callee's Personal Data Selecting Software 20655c1A stored in Callee's Information Displaying Software Storage Area 20655cA of Callee's Device, which selects the permitted callee's personal data to be displayed on LCD 201 (FIG. 1) of Caller's Device. In the present embodiment, CPU 211 (FIG. 1) of Callee's Device retrieves all of the callee's personal data from Callee's Personal Data Storage Area 20655b4A (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4).

This paragraph illustrates Dialing Software H55c2 stored in Caller/Callee Software Storage Area H55c of Host H, Dialing Software 20655c2A stored in Callee's Information Displaying Software Storage Area 20655cA of Callee's Device, and Dialing Software 20655c2 stored in Caller's Information Displaying Software Storage Area 20655c of Caller's Device, which enables to connect between Callee's Device and Caller's Device via Host H in a wireless fashion.

In the present embodiment, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present paragraph is not necessarily implemented if the connection between Caller's Device and Callee's Device is established as described hereinbefore. The sequence described in the present paragraph may be implemented if the connection is accidentally terminated by Callee's Device and the connection process is initiated by Callee's Device.

This paragraph illustrates Callee's Device Pin-pointing Software H55c3a stored in Caller/Callee Software Storage Area H55c of Host H and Callee's Device Pin-pointing Software 20655c3A stored in Callee's Information Displaying Software Storage Area 20655cA of Callee's Device, which identifies the current geographic location of Callee's Device. In the present embodiment, CPU 211 (FIG. 1) of Callee's Device collects the GPS raw data from the near base stations (S1). CPU 211 sends the raw GPS data to Host H (S2). Upon receiving the raw GPS data (S3), Host H produces the callee's calculated GPS data by referring to the raw GPS data (S4). Host H stores the callee's calculated GPS data in Callee's Calculated GPS Data Storage Area H55b6 (S5). Host H then retrieves the callee's calculated GPS data from Callee's Calculated GPS Data Storage Area H55b6 (S6), and sends the data to Callee's Device (S7). Upon receiving the callee's calculated GPS data from Host H (S8), CPU 211 stores the data in Callee's Calculated GPS Data Storage Area 20655b6A (S9). Here, the GPS raw data are the primitive data utilized to produce the callee's calculated GPS data, and the callee's calculated GPS data is the data representing the location of Callee's Device in (x, y, z) format. The sequence described in the present paragraph is repeated periodically.

This paragraph illustrates another embodiment of the sequence described hereinbefore in which the entire process is performed solely by Callee's Device Pin-pointing Software 20655c3A stored in Callee's Information Displaying Software Storage Area 20655cA of Callee's Device. In the present embodiment, CPU 211 (FIG. 1) of Callee's Device collects the raw GPS data from the near base stations (S1). CPU 211 then produces the callee's calculated GPS data by referring to the raw GPS data (S2), and stores the callee's calculated GPS data in Callee's Calculated GPS Data Storage Area 20655b6A (S3). The sequence described in the present paragraph is repeated periodically.

This paragraph illustrates Map Data Sending/Receiving Software H55c4 stored in Caller/Callee Software Storage Area H55c of Host H and Map Data Sending/Receiving Software 20655c4A stored in Callee's Information Displaying Software Storage Area 20655cA of Callee's Device, which sends and receives the map data. In the present embodiment, CPU 211 (FIG. 1) of Callee's Device retrieves the callee's calculated GPS data from Callee's Calculated GPS Data Storage Area 20655b6A (S1), and sends the data to Host H (S2). Upon receiving the calculated GPS data from Callee's Device (S3), Host H identifies the map data in Map Data Storage Area H55b3 (S4). Here, the map data represents the surrounding area of the location indicated by the callee's calculated GPS data. Host H retrieves the map data from Map Data Storage Area H55b3 (S5), and sends the data to Callee's Device (S6). Upon receiving the map data from Host H (S7), Callee's Device stores the data in Callee's Map Data Storage Area 20655b8A (S8). The sequence described in the present paragraph is repeated periodically.

This paragraph illustrates Callee's Audiovisual Data Collecting Software 20655c5A stored in Callee's Information Displaying Software Storage Area 20655cA of Callee's Device, which collects the audiovisual data of the callee to be sent to Caller's Device via Antenna 218 (FIG. 1) thereof. CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655b2aA (S2), and the callee's visual data in Callee's Visual Data Storage Area 20655b2bA (S3). The sequence described in the present paragraph is repeated periodically.

This paragraph illustrates Callee's Information Sending/Receiving Software H55c6a stored in Caller/Callee Software Storage Area H55c of Host H and Callee's Information Sending/Receiving Software 20655c6A stored in Callee's Information Displaying Software Storage Area 20655cA of Callee's Device, which sends and receives the Callee's Information (which is defined hereinafter) between Callee's Device and Host H. In the present embodiment, CPU 211 (FIG. 1) of Callee's Device retrieves the permitted callee's personal data from Callee's Personal Data Storage Area 20655b4A (S1). CPU 211 retrieves the callee's calculated GPS data from Callee's Calculated GPS Data Storage Area 20655b6A (S2). CPU 211 retrieves the map data from Callee's Map Data Storage Area 20655b8A (S3). CPU 211 retrieves the callee's audio data from Callee's Audio Data Storage Area 20655b2aA (S4). CPU 211 retrieves the callee's visual data from Callee's Visual Data Storage Area 20655b2bA (S5). CPU 211 then sends the data retrieved in S1 through S5 (collectively defined as the 'Callee's Information' hereinafter) to Host H (S6). Upon receiving the Callee's Information from Callee's Device (S7), Host H stores the Callee's Information in Callee's Information Storage Area H55b2 (S8). The sequence described in the present paragraph is repeated periodically.

This paragraph illustrates Callee's Information Sending/Receiving Software H55c6a stored in Caller/Callee Software Storage Area H55c of Host H and Callee's Information Sending/Receiving Software 20655c6a stored in Caller's Information Displaying Software Storage Area 20655c of Caller's Device, which sends and receives the Callee's Information between Host H and Caller's Device. In the present embodiment, Host H retrieves the Callee's Information from Callee's Information Storage Area H55b2 (S1), and sends the Callee's Information to Caller's Device (S2). CPU 211 (FIG. 1) of Caller's Device receives the Callee's Information from Host H (S3). CPU 211 stores the permitted callee's personal data in Callee's Personal Data Storage Area 20655b4 (S4). CPU 211 stores the callee's calculated GPS data in Callee's Calculated GPS Data Storage Area 20655b6 (S5). CPU 211 stores the map data in Callee's Map Data Storage Area 20655b8 (S6). CPU 211 stores the callee's audio data in Callee's Audio Data Storage Area 20655b2a (S7). CPU 211 stores the callee's visual data in Callee's Visual Data Storage Area 20655b2b (S8). The sequence described in the present paragraph is repeated periodically.

This paragraph illustrates Permitted Callee's Personal Data Displaying Software 20655c7 stored in Caller's Information Displaying Software Storage Area 20655c of Caller's Device, which displays the permitted callee's personal data on LCD 201 (FIG. 1) of Caller's Device. In the present embodiment, CPU 211 (FIG. 1) of Caller's Device retrieves the permitted callee's personal data from Callee's Personal Data Storage Area 20655b4 (S1). CPU 211 then displays the permitted callee's personal data on LCD 201 (FIG. 1) (S2). The sequence described in the present paragraph is repeated periodically.

This paragraph illustrates Map Displaying Software 20655c8 stored in Caller's Information Displaying Software Storage Area 20655c of Caller's Device, which displays the map representing the surrounding area of the location indicated by the callee's calculated GPS data. In the present embodiment, CPU 211 (FIG. 1) of Caller's Device retrieves the callee's calculated GPS data from Callee's Calculated GPS Data Storage Area 20655b6 (S1). CPU 211 then retrieves the map data from Callee's Map Data Storage Area 20655b8 (S2), and arranges on the map data the callee's current location icon in accordance with the callee's calculated GPS data (S3). Here, the callee's current location icon is an icon which represents the location of Callee's Device in the map data. The map with the callee's current location icon is displayed on LCD 201 (FIG. 1) (S4). The sequence described in the present paragraph is repeated periodically.

This paragraph illustrates Callee's Audio Data Outputting Software 20655c9 stored in Caller's Information Displaying Software Storage Area 20655c of Caller's Device, which outputs the callee's audio data from Speaker 216 (FIG. 1) of Caller's Device. In the present embodiment, CPU 211 (FIG. 1) of Caller's Device retrieves the callee's audio data from Callee's Audio Data Storage Area 20655b2a (S1). CPU 211 then outputs the caller's audio data from Speaker 216 (FIG. 1) (S2). The sequence described in the present paragraph is repeated periodically.

This paragraph illustrates Callee's Visual Data Displaying Software 20655c10 stored in Caller's Information Displaying Software Storage Area 20655c of Caller's Device, which displays the callee's visual data on LCD 201 (FIG. 1) of Caller's Device. In the present embodiment, CPU 211 (FIG. 1) of Caller's Device retrieves the callee's visual data from Callee's Visual Data Storage Area 20655b2b (S1). CPU 211 then displays the callee's visual data on LCD 201 (FIG. 1) (S2). The sequence described in the present paragraph is repeated periodically.

<<Multiple Mode Implementing Function>>

The following paragraphs illustrate the multiple mode implementing function of Communication Device 200 which enables to activate and implement a plurality of modes, functions, and/or systems described in this specification simultaneously.

This paragraph illustrates the software programs stored in RAM 206 (FIG. 1) to implement the multiple mode implementing function (FIG. 1). RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained hereinafter. Mode Selecting Software 20690d selects a certain amount or all modes, functions, and/or systems explained in this specification of which the sequence is explained hereinafter. Mode Activating Software 20690e activates a certain amount or all modes, functions, and/or systems selected by the Mode Selecting Software 20690d of which the sequence is explained hereinafter. Mode Implementation Repeater 20690f executes Multiple Mode Implementer 20690b which reactivates Mode List Displaying Software 20690c, Mode Selecting Software 20690d, Mode Activating Software 20690e of which the sequence is explained hereinafter.

This paragraph illustrates the sequence of Mode List Displaying Software 20690c. CPU 211 (FIG. 1), under the command of Mode List Displaying Software 20690c, displays a list of a certain amount or all modes, functions, and/or systems described in this specification on LCD 201 (FIG. 1).

This paragraph illustrates the sequence of Mode Selecting Software 20690d. The user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph illustrates the sequence of Mode Activating Software 20690e. CPU 211 (FIG. 1), under the command of Mode Activating Software 20690e, activates the mode, function, or, system selected in S2 described hereinbefore. CPU 211 thereafter implements the activated mode, function, or system as described in the relevant section of this specification.

This paragraph illustrates the sequence of Mode Implementation Repeater 20690f. The user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b, which reactivates Mode List Displaying Software 20690c, Mode Selecting Software 20690d, and Mode Activating Software 20690e to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690b, Mode List Displaying Software 20690c, Mode Selecting Software 20690d, Mode Activating Software 20690e, and Mode Implementation Repeater 20690f described hereinbefore may be integrated into one software program, Multiple Mode Implementer 20690b. CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3).

CPU 211 activates the mode, function, or system selected in S3, and thereafter implements the activated mode, function, or system as described in the relevant section of this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function (s)'. Therefore, even only mode(s) is expressly utilized in this specification, it impliedly includes function(s) and/or system (s) by its definition.

INCORPORATION BY REFERENCE

The following paragraphs and drawings described in U.S. Ser. No. 11/423,432 filed 2006 Jun. 10 are incorporated to this application by reference: the preamble described in paragraph [2149](no drawings); Communication Device 200 (Voice Communication Mode) described in paragraphs [2150] through [2155](FIGS. 1 through 2c); Voice Recognition System described in paragraphs [2156] through [2188] (FIGS. 3 through 19); Positioning System described in paragraphs [2189] through [2220](FIGS. 20a through 32e); Auto Backup System described in paragraphs [2221] through [2230](FIGS. 33 through 37); Signal Amplifier described in paragraphs [2231] through [2236](FIG. 38); Audio/Video Data Capturing System described in paragraphs [2237] through [2249](FIGS. 39 through 44b); Digital Mirror Function (1) described in paragraphs [2250] through [2258](FIGS. 44c through 44e); Caller ID System described in paragraphs [2259] through [2266](FIGS. 45 through 47); Stock Purchasing Function described in paragraphs [2267] through [2276] (FIGS. 48 through 52); Timer Email Function described in paragraphs [2277] through [2283](FIGS. 53a and 53b); Call Blocking Function described in paragraphs [2284] through [2297] (FIGS. 54 through 59); Online Payment Function described in paragraphs [2298] through [2307](FIGS. 60 through 64); Navigation System described in paragraphs [2308] through [2330](FIGS. 65 through 74a); Remote Controlling System described in paragraphs [2331] through [2349](FIGS. 75 through 85); Auto Emergency Calling System described in paragraphs [2350] through [2358](FIGS. 86 and 87); Cellular TV Function described in paragraphs [2359] through [2443](FIGS. 88 through 135); 3D Video Game Function described in paragraphs [2444] through [2456](FIGS. 136 through 144); Digital Mirror Function (2) described in paragraphs [2457] through [2466](FIGS. 145 through 155); Voice Recognition Sys—E-mail (2) described in paragraphs [2467] through [2475](FIGS. 156 through 160); Positioning System—GPS Search Engine described in paragraphs [2476] through [2518](FIGS. 161 through 182); Mobile Ignition Key Function described in paragraphs [2519] through [2541](FIGS. 183 through 201); Voice Print Authentication System described in paragraphs [2542] through [2552](FIGS. 202 through 211); Fingerprint Authentication System described in paragraphs [2553] through [2565](FIGS. 212 through 221); Auto Time Adjust Function described in paragraphs [2566] through [2570](FIGS. 222 through 224); Video/Photo Mode described in paragraphs [2571] through [2599](FIGS. 225 through 242); Call Taxi Function described in paragraphs [2600] through [2640](FIGS. 243 through 269); Shooting Video Game Function described in paragraphs [2641] through [2657](FIGS. 270 through 283); Driving Video Game Function described in paragraphs [2658] through [2671](FIGS. 284 through 294); Address Book Updating Function described in paragraphs [2672] through [2692](FIGS. 295 through 312); Batch Address Book Updating Function—With Host described in paragraphs [2693] through [2714](FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743](FIGS. 330 through 350); Batch Scheduler Updating Function—Peer-To-Peer Connection described in paragraphs [2744] through [2748](FIGS. 351 and 352); Calculator Function described in paragraphs [2749] through [2754](FIGS. 353 through 356); Spreadsheet Function described in paragraphs [2755] through [2762](FIGS. 357 through 360); Word Processing Function described in paragraphs [2763] through [2778](FIGS. 361 through 373); TV Remote Controller Function described in paragraphs [2779] through [2801](FIGS. 374 through 394); CD/PC Inter-communicating Function described in paragraphs [2802] through [2826] (FIGS. 413 through 427); PDWR Sound Selecting Function described in paragraphs [2827] through [2863](FIGS. 428 through 456); Start Up Software Function described in paragraphs [2864] through [2880](FIGS. 457 through 466); Another Embodiment Of Communication Device 200 described in paragraphs [2881] through [2885](FIGS. 467a through 467d); [3032] Stereo Audio Data Output Function described in paragraphs [2886] through [2905](FIGS. 468 through 479); Stereo Visual Data Output Function described in paragraphs [2906] through [2925](FIGS. 480 through 491); Multiple Signal Processing Function described in paragraphs [2926] through [2998](FIGS. 492 through 529); Positioning System—Pin-pointing Function described in paragraphs [2999] through [3032] (FIGS. 530 through 553); Artificial Satellite Host described in paragraphs [3033] through [3051](FIGS. 554 through 567); CCD Bar Code Reader Function described in paragraphs [3052] through [3073](FIGS. 568 through 579); Online Renting Function described in paragraphs [3074] through [3151](FIGS. 580 through 633); SOS Calling Function described in paragraphs [3152] through [3172](FIGS. 634 through 645); Input Device described in paragraphs [3173] through [3178](FIGS. 646 through 650); PC Remote Controlling Function described in paragraphs [3179] through [3214](FIGS. 651 through 670); PC Remote Downloading Function described in paragraphs [3215] through [3264](FIGS. 671 through 701); Audiovisual Playback Function described in paragraphs [3265] through

[3290](FIGS. 702 through 716); Audio Playback Function described in paragraphs [3291] through [3315](FIGS. 717 through 731); Ticket Purchasing Function described in paragraphs [3316] through [3345](FIGS. 732 through 753); Remote Data Erasing Function described in paragraphs [3346] through [3375](FIGS. 754 through 774); Business Card Function described in paragraphs [3376] through [3392] (FIGS. 775 through 783); Game Vibrating Function described in paragraphs [3393] through [3403](FIGS. 784 through 786); Part-time Job Finding Function described in paragraphs [3404] through [3424](FIGS. 787 through 801); Parking Lot Finding Function described in paragraphs [3425] through [3464](FIGS. 802 through 832); Parts Upgradable Communication Device described in paragraphs [3465] through [3490](FIGS. 833a through 833x); On Demand TV Function described in paragraphs [3491] through [3521](FIGS. 834 through 855); Inter-communicating TV Function described in paragraphs [3522] through [3556](FIGS. 856 through 882); Display Controlling Function described in paragraphs [3557] through [3574](FIGS. 883 through 894); Multiple Party Communicating Function described in paragraphs [3575] through [3608](FIGS. 894a through 917); Display Brightness Controlling Function described in paragraphs [3609] through [3618](FIGS. 918 through 923); Multiple Party Pin-pointing Function described in paragraphs [3619] through [3666](FIGS. 924 through 950f); Digital Camera Function described in paragraphs [3667] through [3694](FIGS. 951 through 968); Phone Number Linking Function described in paragraphs [3695] through [3718](FIGS. 968a through 983); Multiple Window Displaying Function described in paragraphs [3719] through [3737](FIGS. 984 through 995); Mouse Pointer Displaying Function described in paragraphs [3738] through [3775](FIGS. 996 through 1021); House Item Pin-pointing Function described in paragraphs [3776] through [3935](FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112](FIGS. 1255 through 1288); Multiple Language Displaying Function described in paragraphs [4113] through [4170](FIGS. 1289 through 1331); Caller's Information Displaying Function described in paragraphs [4171] through [4224](FIGS. 1332 through 1375); Communication Device Remote Controlling Function (By Phone) described in paragraphs [4225] through [4265](FIGS. 1394 through 1415); Communication Device Remote Controlling Function (By Web) described in paragraphs [4266] through [4306](FIGS. 1416 through 1437); Shortcut Icon Displaying Function described in paragraphs [4307] through [4334](FIGS. 1438 through 1455); Task Tray Icon Displaying Function described in paragraphs [4335] through [4357](FIGS. 1456 through 1470); Multiple Channel Processing Function described in paragraphs [4358] through [4405](FIGS. 1471 through 1498); Solar Battery Charging Function described in paragraphs [4406] through [4419](FIGS. 1499 through 1509); OS Updating Function described in paragraphs [4420] through [4487](FIGS. 1510 through 1575); Device Managing Function described in paragraphs [4488] through [4505] (FIGS. 1576 through 1587); Automobile Controlling Function described in paragraphs [4506] through [4554](FIGS. 1588 through 1627); OCR Function described in paragraphs [4555] through [4590](FIGS. 1628 through 1652); Real-time GPS Function described in paragraphs [4591] through [4660] (FIGS. 1653 through 1712); CCD Video Stabilizing Function described in paragraphs [4661] through [4692](FIGS. 1713 through 1736); DVD Remote Controlling Function described in paragraphs [4693] through [4731](FIGS. 1737 through 1757); Dual Frame Buffer Implementing Function described in paragraphs [4732] through [4748](FIGS. 1758 through 1767); Mouse Pointer Image Auto Changing Function described in paragraphs [4749] through [4762](FIGS. 1768 through 1774); Dual CCD Camera Function described in paragraphs [4763] through [4783](FIGS. 1775a through 1786); Radio Tuner Function described in paragraphs [4784] through [4814](FIGS. 1787 through 1812); Registered Voice Recognizing Function described in paragraphs [4815] through [4854](FIGS. 1813 through 1842); Host's TV Resolution Converting Function described in paragraphs [4855] through [4884](FIGS. 1843 through 1864); Voice Shortcut Recognizing Function described in paragraphs [4885] through [4919](FIGS. 1865 through 1889); Vital Sign Monitoring Function described in paragraphs [4920] through [5009](FIGS. 1890a through 1954); Three-Dimensional Map described in (FIGS. 2 and 3); Auto Collision Avoiding Function described in (FIGS. 4 through 7); Remote Controlling System described in (FIG. 8a through FIG. 10); Emergency Landing System described in (FIG. 11 through FIG. 12b); Connection Between Host H And Carrier 300 described in (FIG. 13); 3D Map Data Updating Function described in (FIGS. 16 through 30); Auto Collision Avoiding Function— Other Embodiments described in (FIGS. 31 through 34); Satellite TV Function described in (FIGS. 35 through 50); Wireless Communication Facilitating System described in (FIGS. 51 through 64b); Three-Dimensional Map described in (??); Attached File Emailing Function described in paragraphs [5009.1] through [5009.13](FIGS. 1955 through 1961); Movie eTicket Function described in paragraphs [5009.14] through [5009.66](FIGS. 1962 through 2002); Carrier Prepaid eCard Function described in paragraphs [5009.67] through [5009.104](FIGS. 2003 through 2032); Carrier ePass Function described in paragraphs [5009.105] through [5009.144](FIGS. 2033 through 2061b); Communication Device 200 Installed In Carrier described in paragraphs [5009.145] and (FIG. 2062); Wireless Communication Facilitating System described in paragraphs [5009.147] through [5009.176](FIGS. 2063 through 2076b); In-Carrier Notifying Function described in paragraphs [5009.177] through [5009.207](FIGS. 2077 through 2093); Station Name Notifying Function described in paragraphs [5009.208] through [5009.237](FIGS. 2094 through 2110); Restaurant eMenu Function described in paragraphs [5009.238] through [5009.280](FIGS. 2111 through 2144); Geographic Location Recording Function described in paragraphs [5009.281] through [5009.322](FIGS. 2145 through 2176b); CCD Dictionary Function described in paragraphs [5009.323] through [5009.347](FIGS. 2177 through 2195b); Schedule Notifying Function described in paragraphs [5009.348] through [5009.374](FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446](FIGS. 2251 through 2274); Multiple TV Screen Displaying Function described in paragraphs [5009.447] through [5009.478](FIGS. 2275 through 2297); Touch Panel Function described in paragraphs [5009.479] through [5009.504](FIGS. 2298 through 2315); Communication Device Finding Function described in paragraphs [5009.505] through [5009.516](FIGS. 2316 through 2322); Carrier Safety Measure Controlling Function described in paragraphs [5009.517] through [5009.551](FIGS. 2323 through 2342); Product Information Retrieving Function (CCD) described in paragraphs [5009.552] through [5009.580](FIGS. 2343 through 2360); Product Information Stored Chip Function described in paragraphs [5009.581] through [5009.618](FIGS. 2361 through 2385); Karaoke Playing Function described in paragraphs [5009.619] through [5009.647](FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693](FIGS. 2422 through 2436); Resume Enabled Video Game Function described in paragraphs [5009.694] through [5009.716](FIGS. 2437 through 2451); Signal Forwarding Function described in paragraphs [5009.717] through [5009.745](FIGS. 2452 through 2472); In-Carrier Auto Implementing Mode Function described in paragraphs [5009.746] through [5009.775](FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814](FIGS. 2504 through 2521); Wrinkles/Muscles Displaying Function described in paragraphs [5009.815] through [5009.856](FIGS. 2522a through 2552e); Protruded Body Part Displaying Function described in paragraphs [5009.857] through [5009.876](FIGS. 2553 through 2566b); Satellite TV Program Displaying Function described in paragraphs [5009.877] through [5009.921](FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035](FIGS. 2683 through 2695); Multiple Phone Number Function described in paragraphs [5009.1036] through [5009.1055](FIGS. 2696 through 2709); TV Commercial Customizing Function described in paragraphs [5009.1056] through [5009.1085](FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246](FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318](FIGS. 2896 through 2909); Bookmark Displaying Function described in paragraphs [5009.1319] through [5009.1374](FIGS. 2910 through 2955); CCD/LCD Function described in paragraphs [5009.1375] through [5009.1387](FIGS. 2956 through 2959b); Pop Up Window Blocking Function described in paragraphs [5009.1388] through [5009.1401](FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457](FIGS. 2992 through 2998); Folder Sharing Function described in paragraphs [5009.1458] through [5009.1508](FIGS. 2999 through 3038c); Email Folder Managing Function described in paragraphs [5009.1509] through [5009.1577](FIGS. 3039 through 3092e); Power On Auto Software Executing Function described in paragraphs [5009.1578] through [5009.1594](FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660](FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518f); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495e); Hybrid Carrier Function described in paragraphs [5009.5073] through [5009.5105] (FIGS. 5496 through 5522b); Carrier Current Condition Monitoring Function described in paragraphs [5009.5106] through [5009.5141] (FIGS. 5523 through 5546c); Memory Defragmenting Function described in paragraphs [5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294] (FIGS. 5630 through 5648c); Alternative TV Program Receiving Function described in paragraphs [5009.5295] through [5009.5325] (FIGS. 5649 through 5670c); Alternative Radio Program Receiving Function described in paragraphs [5009.5326] through [5009.5356] (FIGS. 5671 through 5692c); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747b); Pre-Installed Item Purchasing Function described in paragraphs [5009.5432] through [5009.5470] (FIGS. 5748 through 5775b); Multiple CPU Function described in paragraphs [5009.5471] through [5009.5476] (FIGS. 5776 and 5777); Radio Music Downloading Function described in paragraphs [5009.5477] through [5009.5516] (FIGS. 5778 through 5807); File Auto Saving Function described in paragraphs [5009.5517] through [5009.5559] (FIGS. 5808 through 5837b); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884b); Remote Room Light Controlling Function described in paragraphs [5009.5630] through [5009.5662] (FIGS. 5885 through 5906b); Remote Kitchen Stove Controlling Function described in paragraphs [5009.5663] through [5009.5695] (FIGS. 5907 through 5928b); Remote Refrigerator Controlling Function described in paragraphs [5009.5696] through [5009.5728] (FIGS. 5929 through 5950b); Remote Washing Machine Controlling Function described in paragraphs [5009.5729] through [5009.5761] (FIGS. 5951 through 5972b); Remote Faucet Controlling Function described in paragraphs [5009.5762] through [5009.5794] (FIGS. 5973 through 5994b); Remote Door Lock Controlling Function described in paragraphs [5009.5795] through [5009.5827] (FIGS. 5995 through 6016b); Remote Air Conditioner Controlling Function described in paragraphs [5009.5828] through [5009.5860] (FIGS. 6017 through 6038b); Remote Vending Machine Controlling Function described in paragraphs [5009.5861] through [5009.5893] (FIGS. 6039 through 6060b); Remote Video Recorder Controlling Function described in paragraphs [5009.5894] through [5009.5926] (FIGS. 6061 through 6082b); Remote Printer Controlling Function described in paragraphs [5009.5927] through [5009.5959] (FIGS. 6083 through 6104b); Remote Camera Controlling Function described in paragraphs [5009.5960] through [5009.5992] (FIGS. 6105 through 6126b); Remote TV Tuner Controlling Function described in paragraphs [5009.5993] through [5009.6025] (FIGS. 6127 through 6148b); Remote Radio Tuner Controlling Function described in paragraphs [5009.6026] through [5009.6058] (FIGS. 6149 through 6170b); Remote Computer Controlling Function described in paragraphs [5009.6059] through [5009.6091] (FIGS. 6171 through 6192b); Remote Carrier Controlling Function described in paragraphs [5009.6092] through [5009.6124] (FIGS. 6193 through 6214b); Remote Food Processor Controlling Function described in paragraphs [5009.6125] through [5009.6157] (FIGS. 6215 and 6236b); Remote Dryer Controlling Function described in paragraphs [5009.6158] through [5009.6190] (FIGS. 6237 and 6258b); Remote Rice Cooker Controlling Function described in paragraphs [5009.6191] through [5009.6223] (FIGS. 6259 and 6280b); Remote Sound Outputting Device Controlling Function described in paragraphs [5009.6224] through [5009.6256] (FIGS. 6281 and 6302b); Remote Vacuum Cleaner Controlling Function described in paragraphs [5009.6257] through [5009.6289] (FIGS. 6303 and 6324b); Remote FAX Machine Controlling Function described in paragraphs [5009.6290] through [5009.6322] (FIGS. 6325 and 6346b); Remote Copying Machine Controlling Function described in paragraphs [5009.6323] through [5009.6355] (FIGS. 6347 and 6368b); Remote Coffee Maker Controlling Function described in paragraphs [5009.6356] through [5009.6388] (FIGS. 6369 and 6390b); Remote Scanner Controlling Function described in paragraphs [5009.6389] through [5009.6421] (FIGS. 6391 and 6412b); Remote Clothes Iron Controlling Function described in paragraphs [5009.6422] through [5009.6454] (FIGS. 6413 and 6434b); Remote Escalator Controlling Function described in paragraphs [5009.6455] through [5009.6487] (FIGS. 6435 and 6456b); Vending Machine Accessing Function described in paragraphs [5009.6488] through [5009.6527] (FIGS. 6457 through 6485d); Audiovisual Data Shuffling Function described in paragraphs [5009.6528] through [5009.6551] (FIGS. 6486 through 6503b); Unknown File Icon Displaying Function described in paragraphs [5009.6552] through [5009.6575] (FIGS. 6504 through 6521c); Audiovisual Document Producing Function described in paragraphs [5009.6576] through [5009.6601] (FIGS. 6522 through 6539b); Audiovisual Data Searching Function described in paragraphs [5009.6602] through [5009.6626] (FIGS. 6540 through 6558b); Finger Print Log-on Function described in paragraphs [5009.6627] through [5009.6645] (FIGS. 6559 through 6571c); Voice Print Log-on Function described in paragraphs [5009.6646] through [5009.6663] (FIGS. 6572 through 6583c); Finger Print Screen Saver Deactivating Function described in paragraphs [5009.6664] through [5009.6682] (FIGS. 6584 through 6596c); Voice Print Screen Saver Deactivating Function described in paragraphs [5009.6683] through [5009.6700] (FIGS. 6597 through 6608c); Finger Print Folder Accessing Function described in paragraphs [5009.6701] through [5009.6719] (FIGS. 6609 through 6621c); Voice Print Folder Accessing Function described in paragraphs [5009.6720] through [5009.6737] (FIGS. 6622 through 6633c); Finger Print File Accessing Function described in paragraphs [5009.6738] through [5009.6756] (FIGS. 6634 through 6646c); Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs [5009.7024] through [5009.7050] (FIGS. 6840 through 6859b); Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs [5009.7134] through [5009.7157] (FIGS. 6917 through 6932b); Audiovisual Data Downloading Function described in paragraphs [5009.7158] through [5009.7218] (FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536] through [5009.7585] (FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8098] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [5009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448] (FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [5009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695] (FIGS. 8036 through 8050b); Electric Cable Networking Function described in paragraphs [5009.8696] through [5009.8707] (FIGS. 8051 through 8057); Shoe Sole Pressure Adjusting Function described in paragraphs [5009.8708] through [5009.8741] (FIGS. 8058 through 8080b); Finger Print Removal Media Accessing Function described in paragraphs [5009.8742] through [5009.8762] (FIGS. 8081 through 8095b); Voice Print Removal Media Accessing Function described in paragraphs [5009.8763] through [5009.8783] (FIGS. 8096 through 8110b); Vein Print Removal Media Accessing Function described in paragraphs [5009.8784] through [5009.8804] (FIGS. 8111 through 8125b); Finger Print PC Removal Media Accessing Function described in paragraphs [5009.8805] through [5009.8833] (FIGS. 8126 through 8145b); Voice Print PC Removal Media Accessing Function described in paragraphs [5009.8834] through [5009.8862] (FIGS. 8146 through 8165b); Vein Print PC Removal Media Accessing Function described in paragraphs [5009.8863] through [5009.8891] (FIGS. 8166 through 8185b); Printer Function described in paragraphs [5009.8892] through [5009.8967] (FIGS. 8186 through 8245f); Scanner Function described in paragraphs [5009.8968] through [5009.9016] (FIGS. 8246 through 8284b); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504b); Noise Reversing Function described in paragraphs [5009.9274] through [5009.9291] (FIGS. 8505 through 8516); Door Status Sensing Function described in paragraphs [5009.9292] through [5009.9345] (FIGS. 8517 through 8557); Drawer Status Sensing Function described in paragraphs [5009.9346] through [5009.9399] (FIGS. 8558 through 8598); Window Status Sensing Function described in paragraphs [5009.9400] through [5009.9453] (FIGS. 8599 through 8639); Curtain Status Sensing Function described in paragraphs [5009.9454] through [5009.9509] (FIGS. 8640 through 8680); Gate Status Sensing Function described in paragraphs [5009.9510] through [5009.9563] (FIGS. 8681 through 8721); Stop Watch Function described in paragraphs [5009.9564] through [5009.9584] (FIGS. 8722 through 8736b); Decrementing Time Function described in paragraphs [5009.9585] through [5009.9607] (FIGS. 8737 through 8753b); Energy Efficient Multiple CPU Function described in paragraphs [5009.9608] through [5009.9636] (FIGS. 8754 through 8776b); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958b); Advertisement Auto Outputting Function described in paragraphs [5009.9868] through [5009.9905] (FIGS. 8959 through 8990b); Online RPG Function described in paragraphs [5009.9906] through [5009.10028] (FIGS. 8991 through 9098b); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171c); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258b); Face Feature Log-on Function described in paragraphs [5009.10256] through [5009.10273] (FIGS. 9259 through 9270c); Face Feature Screen Saver Deactivating Function described in paragraphs [5009.10274] through [5009.10291] (FIGS. 9271 through 9282c); Face Feature Folder Accessing Function described in paragraphs [5009.10292] through [5009.10309] (FIGS. 9283 through 9294c); Face Feature File Accessing Function described in paragraphs [5009.10310] through [5009.10327] (FIGS. 9295 through 9306c); Face Feature Internet Accessing Function described in paragraphs [5009.10328] through [5009.10345] (FIGS. 9307 through 9318c); Face Feature PC Log-on Function described in paragraphs [5009.10346] through [5009.10371] (FIGS. 9319 through 9337b); Face Feature PC Screen Saver Deactivating Function described in paragraphs [5009.10372] through [5009.10397] (FIGS. 9338 through 9356b); Face Feature PC Folder Accessing Function described in paragraphs [5009.10398] through [5009.10423] (FIGS. 9357 through 9375b); Face Feature PC File Accessing Function described in paragraphs [5009.10424] through [5009.10449] (FIGS. 9376 through 9394b); Face Feature PC Internet Accessing Function described in paragraphs [5009.10450] through [5009.10475] (FIGS. 9395 through 9413b); Face Feature Removal Media Accessing Function described in paragraphs [5009.10476] through [5009.10496] (FIGS. 9414 through 9428b); Face Feature PC Removal Media Accessing Function described in paragraphs [5009.10497] through [5009.10524] (FIGS. 9429 through 9448b); Security Formatted Removal Media Function described in paragraphs [5009.10525] through [5009.10545] (FIGS. 9449 through 9463b); Lite Security Formatted Removal Media Function described in paragraphs [5009.10546] through [5009.10568] (FIGS. 9464 through 9480b); Security Formatted Folder Function described in paragraphs [5009.10569] through [5009.10605] (FIGS. 9481 through 9509b); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557b); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577 through 9599c); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629b); Secured Email Opening Function described in paragraphs [5009.10771] through [5009.10793] (FIGS. 9630 through 9645b); Secured Email Attached File Opening Function described in paragraphs [5009.10794] through [5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275] through

[5009.13320] (FIGS. 11587 through 11622b); QR Code News Clip Communicating Function described in paragraphs [5009.13321] through [5009.13366] (FIGS. 11623 through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs [5009.13809] through [5009.13858] (FIGS. 12011 through 12050b); RFID Visual Clip Communicating Function described in paragraphs [5009.13859] through [5009.13908] (FIGS. 12051 through 12090b); RFID Weather Forecast Communicating Function described in paragraphs [5009.13909] through [5009.13958] (FIGS. 12091 through 12130b); RFID News Clip Communicating Function described in paragraphs [5009.13959] through [5009.14008] (FIGS. 12131 through 12170b); RFID Map Clip Communicating Function described in paragraphs [5009.14009] through [5009.14058] (FIGS. 12171 through 12210b); RFID Software Activating Function described in paragraphs [5009.14059] through [5009.14108] (FIGS. 12211 through 12250b); RFID Software Auto Activating Function described in paragraphs [5009.14109] through [5009.14158] (FIGS. 12251 through 12290b); Carrier Arrival Time Displaying Function described in paragraphs [5009.14159] through [5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559b); Caller Answering Machine Activating Function described in paragraphs [5009.14475] through [5009.14513] (FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721b); Road Map Displaying Function described in paragraphs [5009.14680] through [5009.14752] (FIGS. 12722 through 12785b); Email Reading Function described in paragraphs [5009.14753] through [5009.14781] (FIGS. 12786 through 12805c); Stand Alone Email Function described in paragraphs [5009.14782] through [5009.14850] (FIGS. 12806 through 12857b); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231c); Lost Com Device Beaconing Function described in paragraphs [5009.15276] through [5009.15353] (FIGS. 13232 through 13296); Area&Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497b); Virtual Folder Displaying Function described in paragraphs [5009.15587] through [5009.15647] (FIGS. 13498 through 13548b); In-carrier Location Notifying Function described in paragraphs [5009.15648] through [5009.15703] (FIGS. 13549 through 13595c); Address Map Auto Displaying Function described in paragraphs [5009.15704] through [5009.15771] (FIGS. 13596 through 13650c); Brain Wave Device Controlling Function described in paragraphs [5009.15772] through [5009.15806] (FIGS. 13651 through 13679b); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through [5009.15952] (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985c); Brain Wave Carrier Controlling Function described in paragraphs [5009.16167] through [5009.16202] (FIGS. 13986 through 14015b); Electronic Billboard Controlling Function described in paragraphs [5009.16203] through [5009.16323] (FIGS. 14016 through 14123e); Common Phone Number Function described in paragraphs [5009.16324] through [5009.16424] (FIGS. 14124 through 14212c); Hybrid Common Phone Number Function described in paragraphs [5009.16425] through [5009.16525] (FIGS. 14213 through 14301c); Ringtone Volume Auto Adjusting Function described in paragraphs [5009.16526] through [5009.16547] (FIGS. 14302 through 14317b); Ringtone Type Auto Selecting Function described in paragraphs [5009.16548] through [5009.16575] (FIGS. 14318 through 14339b); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471b); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878g); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072b); Event Triggered Auto Audio Recording Function described in paragraphs [5009.17403] through [5009.17449] (FIGS. 15073 through 15108b); Audiovisual Message Bulk Transferring Function described in paragraphs [5009.17450] through [5009.17501] (FIGS. 15109 through 15150b); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321b); Window Status Monitoring Function described in paragraphs [5009.17701] through [5009.17730] (FIGS. 15322 through 15343b); Door Monitoring Function described in paragraphs [5009.17731] through [5009.17760] (FIGS. 15344 through 15365b); Door Monitoring Function described in paragraphs [5009.17761] through [5009.17790] (FIGS. 15366 through 15387b); Push-To-Talk Function described in paragraphs [5009.17791] through [5009.18008] (FIGS. 15388 through 15586c Push-To-T); Door Open Monitoring Function described in paragraphs [5009.18009] through [5009.18065] (FIGS. 15587 through 15633b); Window Open Monitoring Function described in paragraphs [5009.18066] through [5009.18122] (FIGS. 15634 through 15680b); Lock Open Monitoring Function described in paragraphs [5009.18123] through [5009.18179] (FIGS. 15681 through 15727b); Destination Proceeding Function described in paragraphs [5009.18180] through [5009.18265] (FIGS. 15728 through 15803d); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932b); Curtain Open Monitoring Function described in paragraphs [5009.18423] through [5009.18479] (FIGS. 15933 through 15979b); Gate Open Monitoring Function described in paragraphs [5009.18480] through [5009.18536] (FIGS. 15980 through 16026b); Faucet Open Monitoring Function described in paragraphs [5009.18537] through [5009.18593] (FIGS. 16027 through 16073b); Hybrid Refrigerator Function described in paragraphs [5009.18594] through [5009.18695] (FIGS. 16074 through 16159b); Multiple Purpose Chamber Function described in paragraphs [5009.18696] through [5009.18869] (FIGS. 16160 through 16312c); Audiovisual Quality Auto Adjusting Function described in paragraphs [5009.18870] through [5009.18930] (FIGS. 16313 through 16363b); Audio Quality Auto Adjusting Function described in paragraphs [5009.18931] through [5009.18991] (FIGS. 16364 through 16414b); TV Phone Quality Auto Adjusting Function described in paragraphs [5009.18992] through [5009.19100] (FIGS. 16415 through 16512); Voice Phone Quality Auto Adjusting Function described in paragraphs [5009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390] through [5009.19464] (FIG. 16765 through FIG. 16826b); Footer Displaying Function described in paragraphs [5009.19465] through [5009.19539] (FIG. 16827 through FIG. 16888b); Location Scheduled Notifying Function described in paragraphs [5009.19540] through [5009.19602] (FIG. 16889 through FIG. 16941e); Zone Leaving Notifying Function described in paragraphs [5009.19603] through [5009.19675] (FIG. 16942 through FIG. 17005d); Zone Entering Notifying Function described in paragraphs [5009.19676] through [5009.19748] (FIG. 17006 through FIG. 17069d); Power Off Notifying Function described in paragraphs [5009.19749] through [5009.19794] (FIG. 17070 through FIG. 17106d); Power On Notifying Function described in paragraphs [5009.19795] through [5009.19840] (FIG. 17107 through FIG. 17143d); Security Alarm On Notifying Function described in paragraphs [5009.19841] through [5009.19886] (FIG. 17144 through FIG. 17180d); Security Alarm Off Notifying Function described in paragraphs [5009.19887] through [5009.19932] (FIG. 17181 through FIG. 17217d); Email Transfer Notifying Function described in paragraphs [5009.19933] through [5009.19978] (FIG. 17218 through FIG. 17254d); Email Reception Notifying Function described in paragraphs [5009.19979] through [5009.20024] (FIG. 17255 through FIG. 17291d); Making Phone Call Notifying Function described in paragraphs [5009.20025] through [5009.20070] (FIG. 17292 through FIG. 17328d); Phone Call Reception Notifying Function described in paragraphs [5009.20071] through [5009.20116] (FIG. 17329 through FIG. 17365d); Key Pressed Notifying Function described in paragraphs [5009.20117] through [5009.20162] (FIG. 17366 through FIG. 17402d); Software Activation Notifying Function described in paragraphs [5009.20163] through [5009.20208] (FIG. 17403 through FIG. 17439d); Document Opening Notifying Function described in paragraphs [5009.20209] through [5009.20254] (FIG. 17440 through FIG. 17476d); Specified Event Notifying Function described in paragraphs [5009.20255] through [5009.20315] (FIG. 17477 through FIG. 17527d); Television Phone Auto Backup Function described in paragraphs [5009.20316] through [5009.20447] (FIG. 17528 through FIG. 17645b); File Auto Saving Function described in paragraphs [5009.20448] through [5009.20495] (FIG. 17646 through FIG. 17678b); File Compressing Function described in paragraphs [5009.20496] through [5009.20559] (FIG. 17679 through FIG. 17727e); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685] (FIG. 17772 through FIG. 17832c); Multiple Device Door Locking Function described in paragraphs [5009.20686] through [5009.20761] (FIG. 17833 through FIG. 17893c); Phone Call Making Log Recording Function described in paragraphs [5009.20762] through [5009.20815] (FIG. 17894 through FIG. 17938d); Phone Call Receiving Log Recording Function described in paragraphs [5009.20816] through [5009.20867] (FIG. 17939 through FIG. 17981d); Phone Call Making Log Exporting Function described in paragraphs [5009.20868] through [5009.20917] (FIG. 17982 through FIG. 18022d); Phone Call Receiving Log Exporting Function described in paragraphs [5009.20918] through [5009.20967] (FIG. 18023 through FIG. 18063d); Phone Call Making Log Synchronizing Function described in paragraphs [5009.20968] through [5009.21021] (FIG. 18064 through FIG. 18106f); Phone Call Receiving Log Synchronizing Function described in paragraphs [5009.21022] through [5009.21075] (FIG. 18107 through FIG. 181490; 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325c); Location Audio Notifying Function described in paragraphs [5009.21277] through [5009.21319] (FIG. 18326 through FIG. 18359b); Answering Machine Location Recording Function described in paragraphs [5009.21320] through [5009.21388] (FIG. 18360 through FIG. 18417e); Visual Phone File Sharing Function described in paragraphs [5009.21389] through [5009.21526] (FIG. 18418 through FIG. 18540b); Visual Phone Magnifying Function described in paragraphs [5009.21527] through [5009.21629] (FIG. 18541 through FIG. 18631); Multiple Home Page Displaying Function described in paragraphs [5009.21630] through [5009.21700] (FIG. 18632 through FIG. 18632 through FIG. 18693b); Multiple Visual Phone Party Location Identifying Function described in paragraphs [5009.21701] through [5009.21796] (FIG. 18694 through FIG. 18778g); Individual Party Conversation Replaying Function described in paragraphs [5009.21797] through [5009.21962] (FIG. 18779 through FIG. 18929d); Multiple Phone Notifying Function described in paragraphs [5009.21963] through [5009.22050] (FIG. 18930 through FIG. 19004i); Multiple Phone Dial Tone Function described in paragraphs [5009.22051] through [5009.22160] (FIG. 19005 through FIG. 19101f); Multiple Phone New Party Joining Function described in paragraphs [5009.22161] through [5009.22276] (FIG. 19102 through FIG. 19206j); and Music Property Setting Function described in paragraphs [5009.22277] through [5009.22302] (FIG. 19207 through FIG. 19226b).

The invention claimed is:

1. A system comprising:
a first communication device; and
a second communication device;
wherein a door is operable to be locked or unlocked by said first communication device, wherein said door is the door included in an artificial structure or carrier, wherein said artificial structure is a house or building and said carrier is a vehicle designed to carry passenger(s);
wherein when said door is locked by said first communication device, a door locked message is retrieved and displayed on said first communication device and/or said second communication device, wherein a door locking log is operable to be retrieved and displayed on said first communication device and/or said second communication device, wherein said door locking log includes the time and date at which said door is locked and the identification of said first communication device which locked said door, and wherein the location data indicating the geographic locations of said first communication device and/or said second communication device at which said door is locked is operable to be retrieved and displayed on said first communication device and/or said second communication device;
wherein when said door is unlocked by said first communication device, a door unlocked message is retrieved and displayed on said first communication device and/or said second communication device, wherein a door unlocking log is operable to be retrieved and displayed on said first communication device and/or said second communication device, wherein said door unlocking log includes the time and date at which said door is unlocked and the identification of said first communication device which unlocked said door, and wherein the location data indicating the geographic locations of said first communication device and/or said second communication device at which said door is unlocked is operable to be retrieved and displayed on said first communication device and/or said second communication device; and
wherein said first communication device comprises:
an input device;
a display;
an antenna; and
a moving picture replaying implementer, wherein a moving picture stored in said first communication device is processed to be replayed.

2. The system of claim 1, wherein said first communication device is a handheld device.

3. The system of claim 1, wherein said second communication device is a handheld device.

4. The system of claim 1, wherein said first communication device further includes a camera.

5. The system of claim 1, wherein said second communication device is a handheld device which includes a camera.

6. The system of claim 1, wherein said first communication device and said second communication device are operable to implement voice communication with each other.

7. A system comprising:
a first communication device; and
a second communication device;
wherein a door is operable to be locked or unlocked by said first communication device, wherein said door is the door included in an artificial structure or carrier, wherein said artificial structure is a house or building and said carrier is a vehicle designed to carry passenger(s);
wherein when said door is locked by said first communication device, a door locked message is retrieved and displayed on said first communication device and/or said second communication device, wherein a door locking log is operable to be retrieved and displayed on said first communication device and/or said second communication device, wherein said door locking log includes the time and date at which said door is locked and/or the identification of said first communication device which locked said door, and wherein the location data indicating the geographic locations of said first communication device and/or said second communication device at which said door is locked is operable to be retrieved and displayed on said first communication device and/or said second communication device;
wherein when said door is unlocked by said first communication device, a door unlocked message is retrieved and displayed on said first communication device and/or said second communication device, wherein a door unlocking log is operable to be retrieved and displayed on said first communication device and/or said second communication device, wherein said door unlocking log includes the time and date at which said door is unlocked and/or the identification of said first communication device which unlocked said door, and wherein the location data indicating the geographic locations of said first communication device and/or said second communication device at which said door is unlocked is operable to be retrieved and displayed on said first communication device and/or said second communication device; and wherein said first communication device comprises:
an input device;
a display;
an antenna; and
a moving picture replaying implementer, wherein a moving picture stored in said first communication device is processed to be replayed.

8. The system of claim 7, wherein said first communication device is a handheld device.

9. The system of claim 7, wherein said second communication device is a handheld device.

10. The system of claim 7, wherein said first communication device further includes a camera.

11. The system of claim 7, wherein said second communication device is a handheld device which includes a camera.

12. The system of claim 7, wherein said first communication device and said second communication device are operable to implement voice communication with each other.

13. A system comprising:
a first communication device; and
a second communication device;
wherein a door is operable to be locked or unlocked by said first communication device, wherein said door is the door included in an artificial structure or carrier, wherein said artificial structure is a house or building and said carrier is a vehicle designed to carry passenger(s);
wherein when said door is locked by said first communication device, a door locked message is retrieved and displayed on said first communication device and/or said second communication device, and wherein a door locking log is operable to be retrieved and displayed on said first communication device and/or said second communication device, wherein said door locking log includes the time and date at which said door is locked and the identification of said first communication device which locked said door;
wherein when said door is unlocked by said first communication device, a door unlocked message is retrieved and displayed on said first communication device and/or said second communication device, and wherein a door unlocking log is operable to be retrieved and displayed on said first communication device and/or said second communication device, wherein said door unlocking log includes the time and date at which said door is unlocked and the identification of said first communication device which unlocked said door; and
wherein said first communication device comprises:
an input device;
a display;
an antenna; and
a moving picture replaying implementer, wherein a moving picture stored in said first communication device is processed to be replayed.

14. The system of claim 13, wherein said first communication device is a handheld device.

15. The system of claim 13, wherein said second communication device is a handheld device.

16. The system of claim 13, wherein said first communication device further includes a camera.

17. The system of claim 13, wherein said second communication device is a handheld device which includes a camera.

18. The system of claim 13, wherein said first communication device and said second communication device are operable to implement voice communication with each other.

* * * * *